United States Patent [19]

Aten et al.

[11] Patent Number: 4,823,982

[45] Date of Patent: Apr. 25, 1989

[54] MULTIPLE CARTRIDGE DISPENSING SYSTEM

[75] Inventors: Edward M. Aten, Hazelwood, Mo.; Larry E. Parkhurst, Boulder, Colo.

[73] Assignee: Medical Microsystems, Inc., Boulder, Colo.

[21] Appl. No.: 67,323

[22] Filed: Jun. 29, 1987

Related U.S. Application Data

[63] Continuation-in-part of Ser. No. 722,073, Apr. 11, 1985, Pat. No. 4,674,652.

[51] Int. Cl.$^4$ ........................ B65B 59/00; G06F 15/20

[52] U.S. Cl. .......................................... 221/3; 221/15; 221/74; 221/129

[58] Field of Search ................. 364/479; 221/3, 5, 15, 221/69-74, 129, 131, 133, 197, 263, 277; 206/531, 534.1, 539, DIG. 820

[56] References Cited

U.S. PATENT DOCUMENTS

| | | | |
|---|---|---|---|
| 3,917,045 | 11/1975 | Williams et al. | 221/71 X |
| 3,984,030 | 10/1976 | Morini | 221/74 X |
| 4,473,884 | 9/1984 | Behl | 364/479 |
| 4,615,169 | 10/1986 | Wurmli | 221/277 X |
| 4,616,316 | 10/1986 | Hanpeter | 221/5 X |
| 4,664,289 | 5/1987 | Shimizu et al. | 221/197 X |
| 4,695,954 | 9/1987 | Rose et al. | 221/3 X |
| 4,717,042 | 1/1988 | McLaughlin | 221/3 |
| 4,733,797 | 3/1988 | Haber | 221/8 |
| 4,763,810 | 8/1988 | Christiansen | 221/3 |

*Primary Examiner*—Michael S. Huppert

*Attorney, Agent, or Firm*—Cushman, Darby & Cushman

[57] ABSTRACT

The invention provides a portable and positionally insensitive dispensing device and system for dispensing several types of articles, packaged on strips and loaded into separate cartridges, from a single device. Dispensing is controlled from more than one cartridge by means of special clutch mechanisms acting on a common drive shaft. The dispensing device has a control system that is capable of coordinating the dispensing operations of all the cartridge stations. A host computer system permits efficient definition of dispensing schedules and control options for each cartridge station, loads those dispensing parameters into the dispensing device control system, unloads dispensing data from the dispensing device at the end of a dispensing period, and analyzes the degree of compliance of the actual dispensing operations to the dispensing schedule.

85 Claims, 15 Drawing Sheets

DISPENSING BLOCK DIAGRAM

TYPICAL HOST SYSTEM HARDWARE

MULTIPLE CARTRIDGE DISPENSING SYSTEM

RELATED APPLICATIONS

This application is a continuation in part (CIP) of U.S. application Ser. No. 06/722,073 which was filed on Apr. 11, 1985 and now U.S. Pat. No. 4,674,652. The information contained in that patent is hereby incorporated by reference as if fully set forth herein.

BACKGROUND OF THE INVENTION (a) Field of the Invention

This invention relates to automated medication dispensing apparatus.

(b) Description of the Prior Art

Known automated dispensing devices, such as described in U.S. patent application Ser. No. 06/722,073, filed Apr. 11, 1985 and now issued as U.S. Pat. No. 4,674,652 offer reliable dispensing of medication that is stored in vials which are strip packaged. The information set forth in that patent is hereby incorporated herein by reference as is fully reproduced. It utilizes special storage volume designs in which the strip packaging is stored, and a sprocket drive mechanism that accommodates the special strip packaging. These features provide an extremely reliable dispensing device that is portable and can be operated in any positional orientation. However, as with most "first generation" devices, improvements can be made. Loading of th strip packaging into the first generation device requires that the strip packaging be fed into the storage volume and folded in a zig zag manner, and it dispenses only a single strip of vials.

SUMMARY OF THE INVENTION

The present invention provides a multiple cartridge dispensing system that improves on the "first generation" of such devices in several ways. These improvements are both mechanical and electronic. One of theses ways relates to the strip packaging of medication. The present invention provides an arrangement wherein the cartridge container for the strip packaging allows the strip packaging to be preloaded, preferably by mass loading machinery. The cartridges are specially dimensioned to preserve dispensing operation reliability. Preloaded cartridges can be stored for future rapid and simple loading into a more mechanically simple dispensing device housing.

The first generation dispenser also was designed to dispensing only one group of articles contained in a single strip package. However, there are many situations where a patient is on a regimen that includes taking two or more different types of medications at overlapping times. Therefore, another object of the present invention is to provide, in a single unit, for the dispensing of articles from more than one strip package.

This new generation of dispenser not only offers more compact dimensions when multiple strips are needed, but it also employs a unique dispensing control system that can dispense articles from the individual strips independently or coordinate the dispensing of multiple groups of articles. Whereas the first generation devices would require separate housings and drive mechanisms to dispense multiple strips, the present invention uses just one drive shaft and an unique clutch mechanism on the ejector elements to allow selective engagement. Another object of the present invention is to motorize the dispensing drive mechanism for improved reliability and ease of use by the infirm.

DETAILED DESCRIPTION OF THE PREFERRED EMBODIMENTS

The arrangement and functions of the multiple cartridge dispensing system according to the present invention are probably best described in terms of a specific medical dispensing application, even though the invention is not limited to such an application. At present, the preferred embodiment of the invention is utilized as a medication dispenser. The multiple cartridge dispensing system according to the invention helps patients take oral medications per a prescribed schedule and evaluates the patient's actual compliance to the regimen. Compliance is an indication of how closely the patient followed the prescribed schedule.

Figure 1:
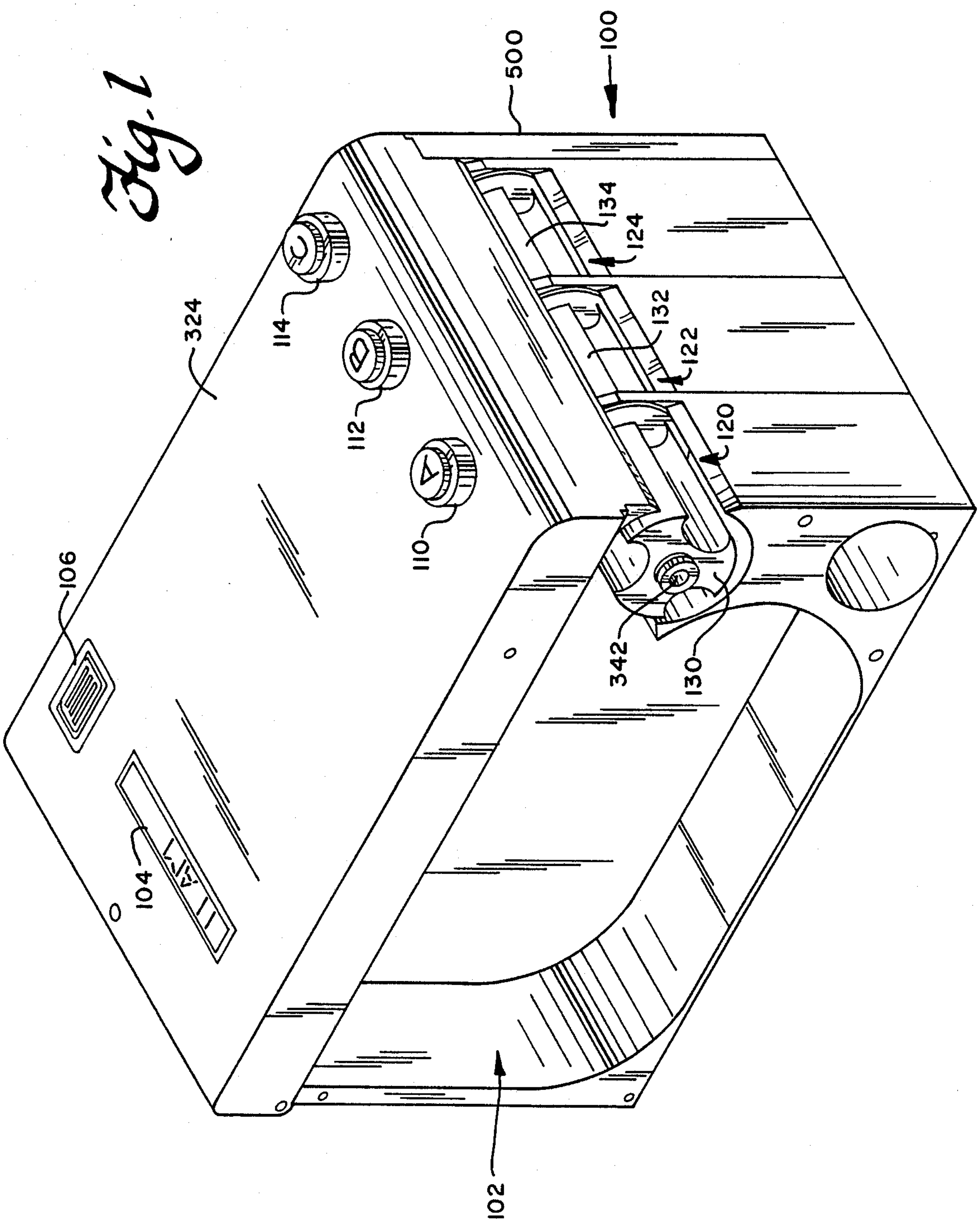
FIG. 1 is a perspective view of a dispensing unit 100 into which medication is loaded and from which it is dispensed to the patient.

FIG. 1 is a perspective view of a dispensing unit 100 into which medication is loaded and from which it is dispensed to the patient. The multiple cartridge dispensing system according to the present invention includes dispensing unit 100 including software stored therein, a host computer (hardware block diagram shown in FIG. 21), host computer software (flow chart shown in FIGS. 22(*a*) and 22(*b*) and software listing in appendix), and an interface unit for coupling dispensing unit 100 to the host computer.

A drug therapist, usually a pharmacist or physician, loads dispensing unit 100 with medication containing cartridges. In FIG. 1, the left side of dispensing unit 100 is removed to reveal a cartridge cavity 102 into which medication loaded cartridges can be placed. The therapist then uses a host computer system to input dispensing schedules and instructions for each of the medications loaded. The host computer then transmits a computer language version of that information to the dispensing device. The prepared dispensing unit 100 (loaded with medication and schedule information) is then given to the patient to use.

During the medicating period, the patient is reminded both visually and audibly when a medication is due to be administered. Visual reminding is via a display 104 and audible reminding is via an alarm 106. Display 104 and alarm 106 are located on a lid portion 324 of dispensing unit 100. Access to any of the medications may be restricted to a specified period before and after prescribed dosing times so that inadvertent or intentional drug abuse is prevented. The patient is told which medication to dispense by messages appearing on display 104 which can display a scrolling alphanumeric message. When a patient is ready to dispense a medication, he simply pushes button "A" 110, button "B" 112, or button "C" 114 which are associated with three medication cartridges, respectively. Dispensing unit 100 operates either ejector 120, ejector 122, or ejector 124 to dispense a medication vial from just the selected cartridge and thereby dispense the proper medication. To operate ejector 120, a ejector sprocket segment 130 associated therewith is rotated. Similarly, to operate ejector 122, its ejector sprocket segment 132 is rotated and to operate ejector 124, its ejector sprocket segment 134 is rotated. The sprocket segments are rotated automatically after the associated button "A" 110, button "B" 112, or button "C" 114 are pressed, assuming that the button is pressed within a time window specified for medication dispensing.

Instructions for use of that particular medication are immediately shown on display 104 to further simplify the patient's medication therapy. By these means a patient may be given several medications for use during the same period without the usual concern with patient inability or unwillingness to understand and follow such a complicated regimen. The time of day and date when each dose is dispensed are recorded in the dispenser's memory for later retrieval and analysis by the host system.

When the dispenser is returned to the therapist at the end of the medication period, the therapist may use the host computer to "debrief" dispensing unit 100 to retrieve dispensing data and analyze the level of patient compliance to the regimen. Both summary and detailed analyses are provided, allowing the therapist to adjust the regimen and/or counsel the patient with confidence that comes from knowing to what extent the medications were properly taken.

The special strip packaging and associated sprocket drive developed for the first generation device are detailed in parent U.S. patent application Ser. No. 06/722,073 which was filed on Apr. 11, 1985 which issued as U.S. Pat. No. 4,674,652 on 6/87. Articles, or containers enclosing articles, are mounted at intervals along the strip such that the articles or containers are engaged by depressions on ejector sprocket segments 130, 132 and 134 and moved to the dispensed position by rotation of the sprocket. The circumferential spacing of the depressions around the sprocket matches the interarticle spacing along the strip and provides a flexible rack and pinion type drive mechanism.

Figure 2:
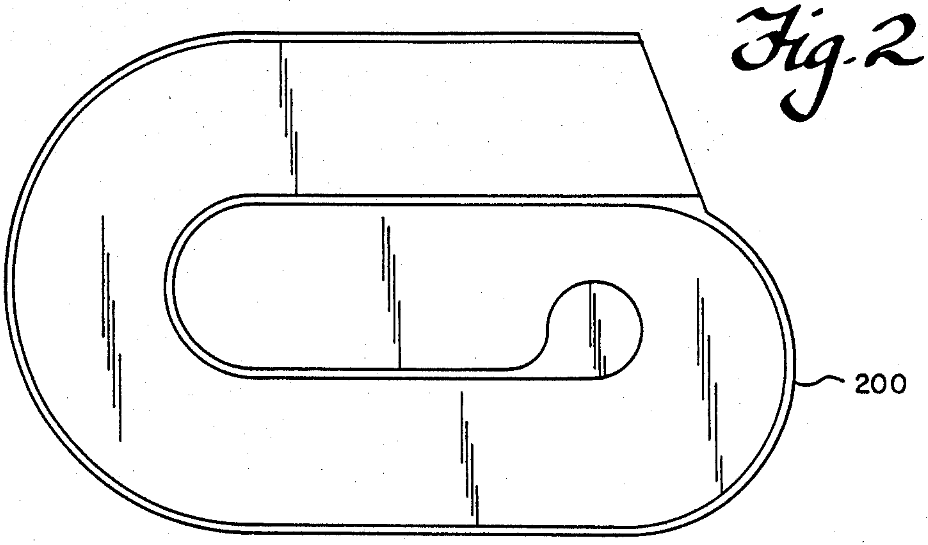
FIG. 2 is a front view of an empty cartridge 200 into which medication can be loaded.

FIG. 2 is a front view of an empty cartridge 200 into which medication can be loaded. Cartridge 200 is intended to be fitted into cartridge cavity 102 or 320 or 322 (cartridge cavities 320 and 322 are visible in FIG. 5) when dispensing unit 100 is loaded by the pharmacist or physician. Cartridge 200 utilizes the same dimensional standards as the first generation device, that is, all passageways are less than two and greater than one article diameter in width. However, cartridge 200 is a separate and distinct element that is easily loaded into and removed from dispensing unit 100, rather than being a part of the device as in the first generation unit. Thus, the unique dimensions need only be incorporated into the cartridges, and the dispenser housing need only simple, non-critical storage volume dimensions necessary to properly position the cartridges such that the leading end of the packaging strips are next to the dispensing sprocket segments.

Figure 3:
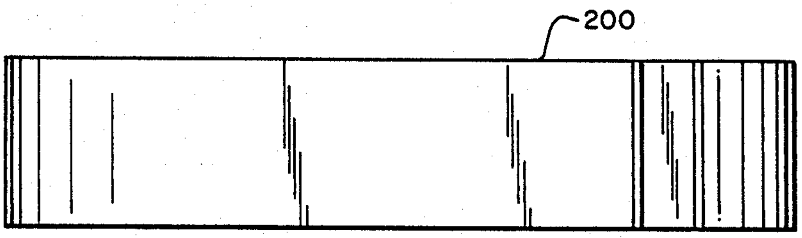
FIG. 3 is a side view of a cartridge 200.
Figure 4:
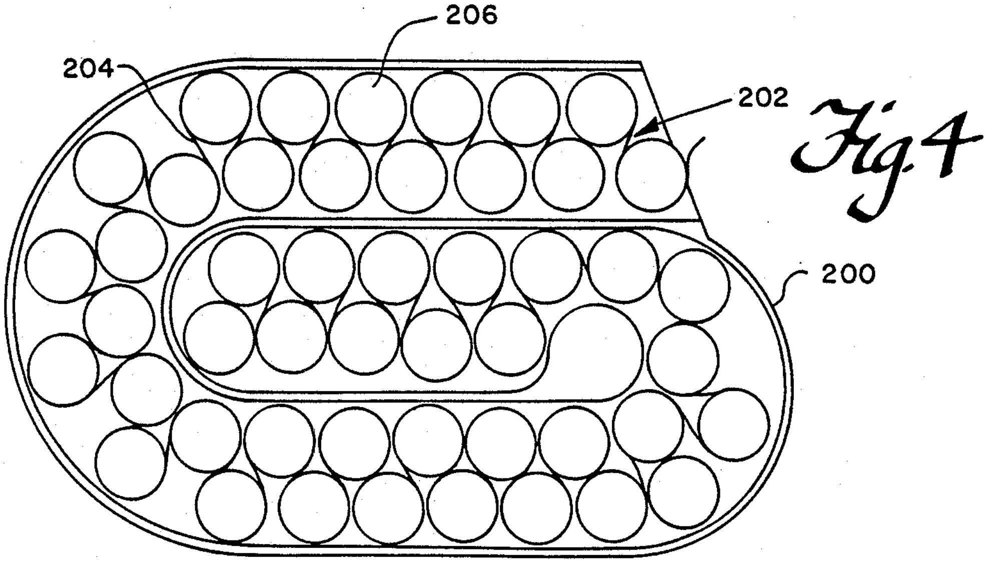
FIG. 4 is a front view of an cartridge 200 loaded with a packaging strip 202.

FIG. 3 is a side view of a cartridge 200 and FIG. 4 is a front view of an cartridge 200 loaded with a packaging strip 202. Packaging strip 20 includes the actual sleeved strip 204 and medication containers 206.

Figure 5:
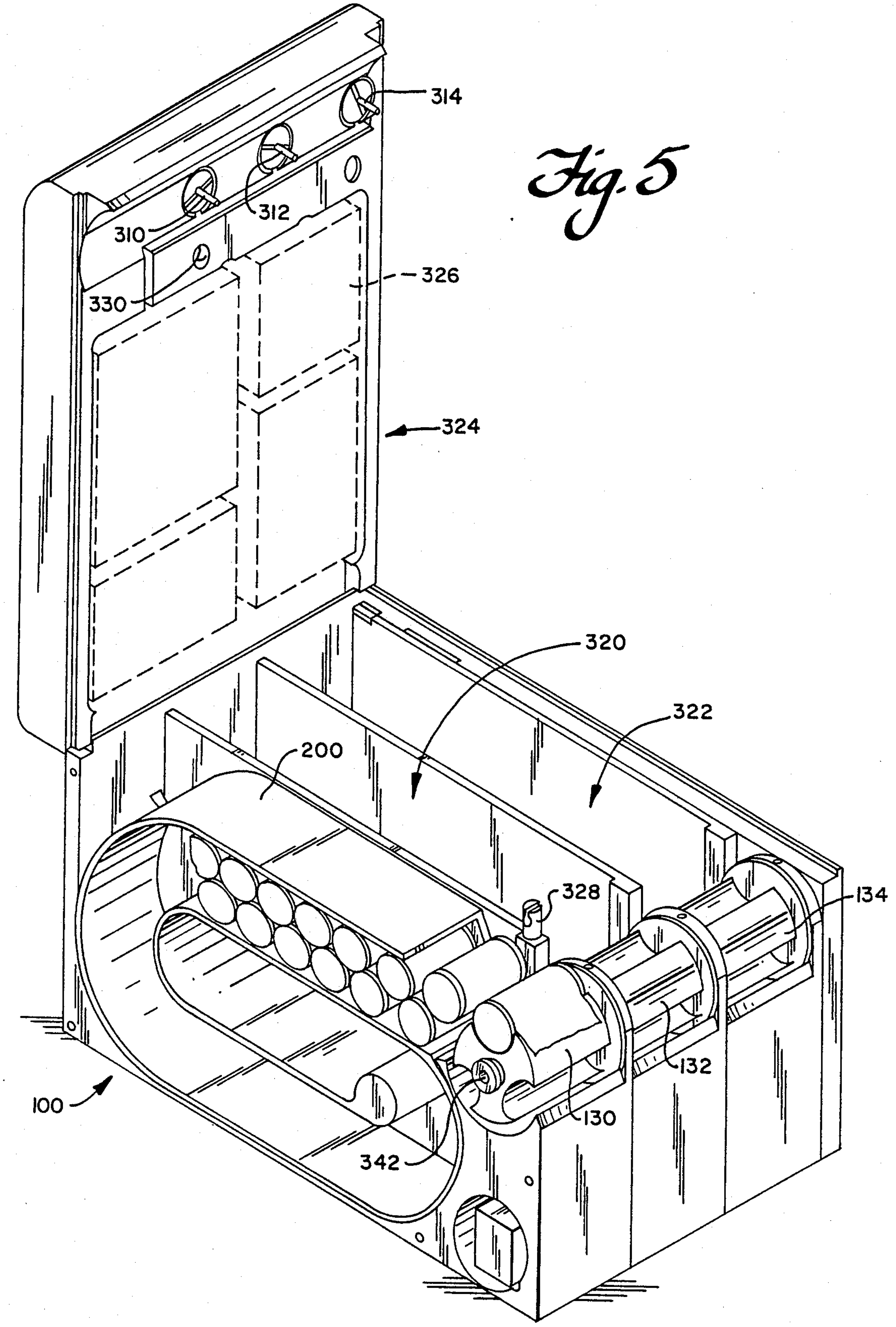
FIG. 5 is a perspective view of dispensing unit 100 with the left side removed and the top flipped open.

FIG. 5 is a perspective view of dispensing unit 100 with the left side removed and the top flipped open. A cartridge 200 has been inserted into a cartridge cavity 102. This drawing shows the proper relationship of packaging strip 202 and its component parts to the sprocket drive mechanism of dispensing unit 100. Several such cartridge dispensing stations may be placed side by side to make a multiple strip dispenser.

As shown in FIGS. 1 and 5, the presently preferred embodiment of dispensing unit 100 includes three dispensing stations. I is anticipated that packaging strips 202 would be loaded into cartridges such as cartridge 200 automatically or semi-automatically by specially designed machines. These loaded cartridges would then be available for later use when they could be quickly loaded into dispensing unit 100 without need of any special tools or skills. A loaded cartridge is simply slipped into an appropriate cartridge cavity such as cavities 102, 320 or 322 of dispensing unit 100 and the first medication container 206 a the end of packaging strip 202 is pulled out of the cartridge and placed into the ejector sprocket segment associated with that cartridge such as, for example, ejector sprocket segment 130, ejector sprocket segment 132, or ejector sprocket segment 134, so that, upon the next rotation of the sprocket, the article is moved out of the dispenser and made available to the patient. In this manner a cartridge is loaded into each of the available cartridge cavities.

In FIG. 5, with the top of dispensing unit 100 flipped up, plunger pins 310, 312, and 314, are associated with button "A" 110, button "B" 112, and button "C" 114, respectively. It will be further explained below how these plunger pins interact with the ejector sprocket segments to initiate and permit dispensing. Additional cartridge cavities, namely cartridge cavity 320 and cartridge cavity 322 are also visible in this drawing. Electronic control system 326 is located in lid portion 324 of dispensing unit 100.

A locking pin 328 mates with a locking mechanism 330 located in the lid portion 324 of dispensing unit 100. The pharmacist or physician who is programming dispensing unit 100 can unlock it. However, from the patients point of view, dispensing unit 100 appears as an integral unit that can not be opened.

Figure 6:
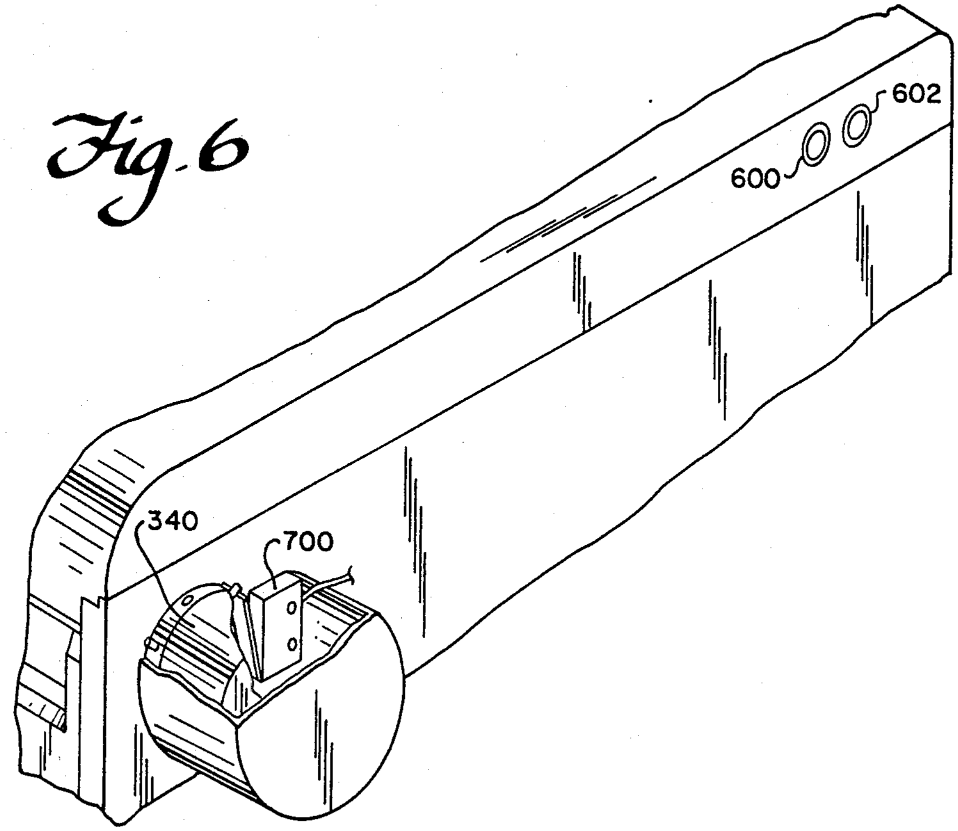
FIG. 6 is a perspective view of the right side of dispensing unit 100.

FIG. 6 is a perspective view of the right side of dispensing unit 100. Driving power for the dispensing mechanism may be supplied by a gear motor 340. Although manual operation is also possible, use of gear motor 340 to drive the ejectors simplifies operation for the patient and eliminates the force needed to turn the shaft. Reliability is also improved since all of the dispensing operations are then under the precise control of the dispenser control systems. Improper sequencing, purposeful or inadvertent misdirection of the driving shaft, binding, and overrotation are avoided. Power can be provided through an AC adapter port 600 and communications with the host system can be carried out via a communication port 602.

The driving force may be directly coupled to the drive shaft as shown in FIG. 6, or the transmission linkage may be made more compact by using gears, pulleys and belts or other common transmission elements. The common drive shaft 342 is a special rod that extends across the front of all of the storage cartridges. Ejector sprocket segments 130, 132 and 134 are slipped over this shaft and held in place in front of respective cartridge openings by means of spacers. These sprockets normally are not engaged by the drive shaft and remain motionless as the drive shaft rotates inside them.

Figure 8:
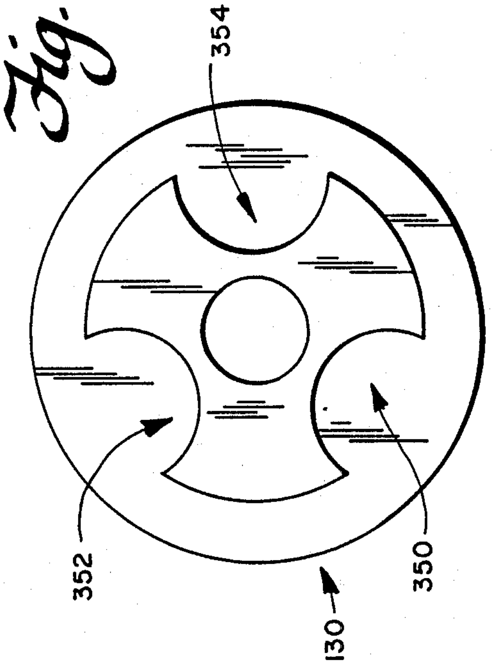
FIG. 8 is a front view of ejector sprocket segment 130.
Figure 7:
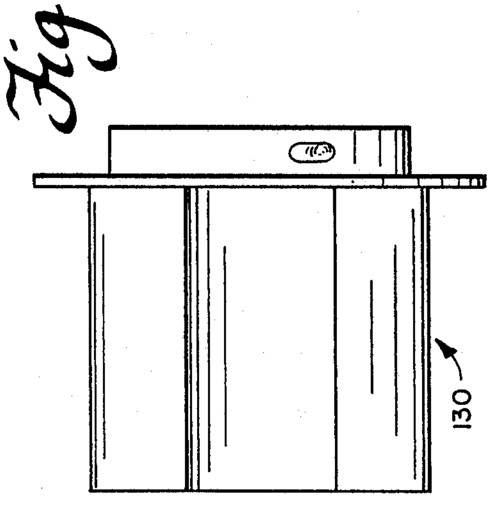
FIG. 7 is a side view of ejector sprocket segment 130. All three ejector sprocket segments are the same, so only ejector sprocket segment 130 is shown.

FIG. 7 is a side view and FIG. 8 is a front view of ejector sprocket segment 130. All three ejector sprocket segments are the same, so only ejector sprocket segment 130 is shown. Ejector sprocket segment 130 is shown as having three article engaging depressions evenly spaced around its periphery, i.e. depression 350, depression 352, and depression 354. Sprockets having fewer or more depressions on correspondingly smaller or larger diameters could be used as an alternative embodiment as long as the spacing between depressions matches that between articles along the strip. The angle through which the sprocket must turn in order to bring the article from the secure ready position to the accessible dispensed position would also have to be adjusted.

Thus, there is a separate ejector sprocket segment, i.e. ejector sprocket segment 130, ejector sprocket segment 132, and ejector sprocket segment 134, for each dispensing station. When a particular cartridge containing station is selected by the patient to dispense another of its medication containing containers, the ejector sprocket segment associated with that station is connected to the drive shaft and then rotates with the drive shaft until the article is clear of dispensing unit 100 and accessible t the patient. Once the dispensing action is complete, the selected ejector sprocket segment automatically disengages from the drive shaft and is locked in place until properly selected again. In this manner any of the stations may be selected individually for dispensing and that station's ejector sprocket segment may rotate to dispense without the other dispensing ejector sprocket segments operating. Thus, articles of a particular type may be selectively dispensed from a dispenser containing many other articles of other types by means of clutches acting on a common driving shaft driven by a common driving force.

Figure 9:
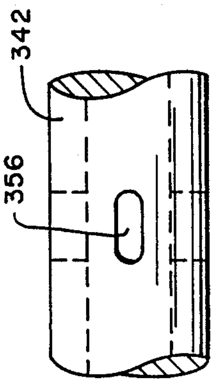
FIG. 9 shows drive shaft 342 as having a passages 356 therein.

A clutch system is incorporated into each sprocket to allow it to engage and then automatically disengage the common drive shaft 342. FIG. 9 shows drive shaft 342 as having a passage 356 therein. Actually, there are three such passages in drive shaft 342 for each ejector sprocket segment.

Figure 10:
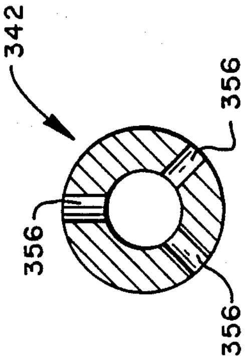
FIG. 10 is a cut away side view of drive shaft 342 showing passages 356 associated with one of the ejector sprocket segments.

FIG. 10 is a cut away side view of drive shaft 342 showing passages 356 associated with one of the ejector sprocket segments.

Figure 11:
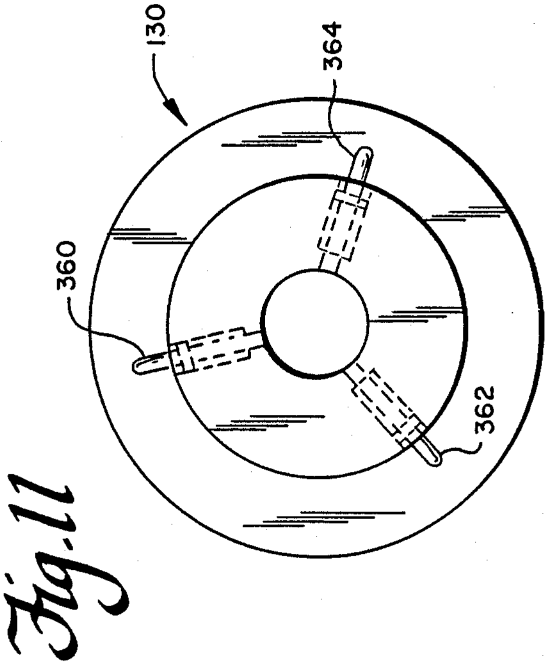
FIG. 11 is a cross section of ejector sprocket segment 130.
Figure 14:
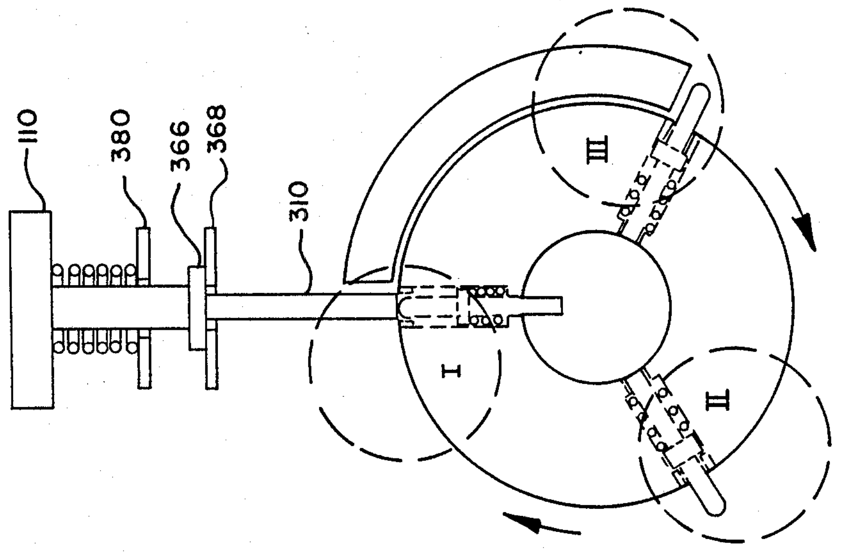
FIGS. 13, 14, 15, and 16 are a series of drawings showing the operation of an ejector at various points in time.

FIG. 11 is a cross section of ejector sprocket segment 130. Spring loaded pins, i.e. spring loaded pin 360, spring loaded pin 362, and spring loaded pin 364, one for each depression of ejector sprocket segment 130, are mounted such that they normally extend beyond the outside diameter of a hub at the end of ejector sprocket segment 130.

Figure 12:
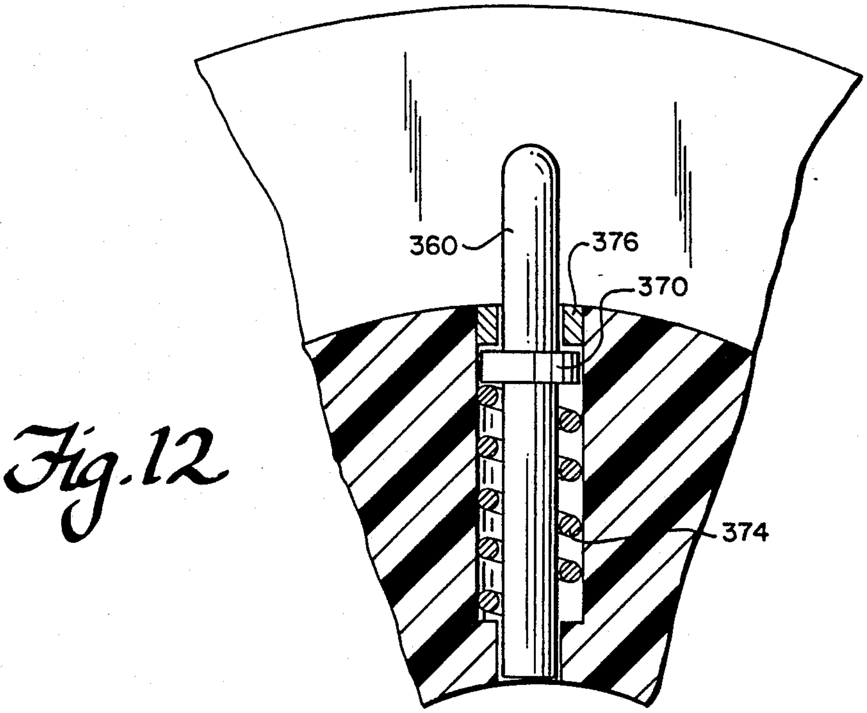
FIG. 12 is another cross section of ejector sprocket segment 130 showing the arrangement of spring loaded pin 360 in greater detail.

FIG. 12 is another cross section of ejector sprocket segment 130 showing the arrangement of spring loaded pin 360 in greater detail. Spring loaded pin 360 has a collar portion 370 that rests on a ring 376. Spring loaded pin 360 is biased by a spring 374.

FIGS. 13, 14, 15, and 16 are a series of drawings showing the operation of an ejector at various points in time. The sprocket hub rotates within a collar which incorporates a forward motion stop 500 that interferes with one of the sprocket pins when the sprocket is in its ready position. Another collar stop 502 prevents another of the three sprocket pins from moving in the reverse direction. Thus, in its ready position (FIGS. 13 and 16), a sprocket cannot rotate because pins prevent either its forward or reverse rotation and the drive shaft is free to turn within the ejector sprocket segment without engagement.

Figure 13:
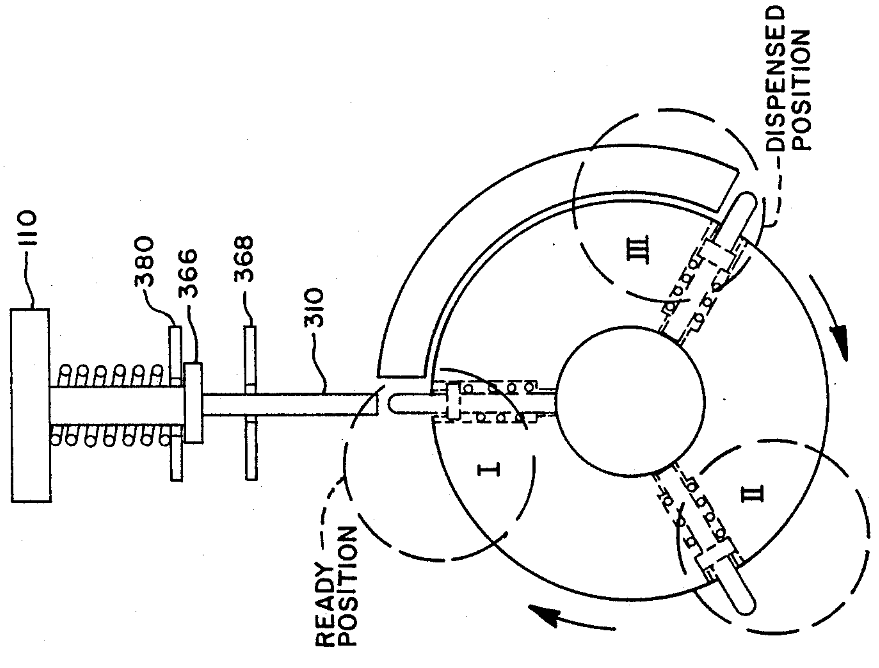
Figure 16:
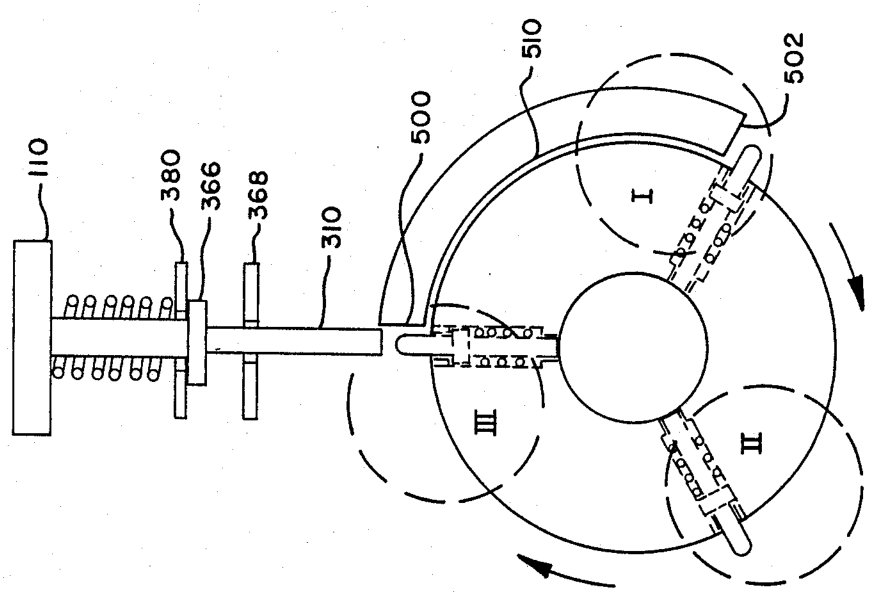
Figure 15:
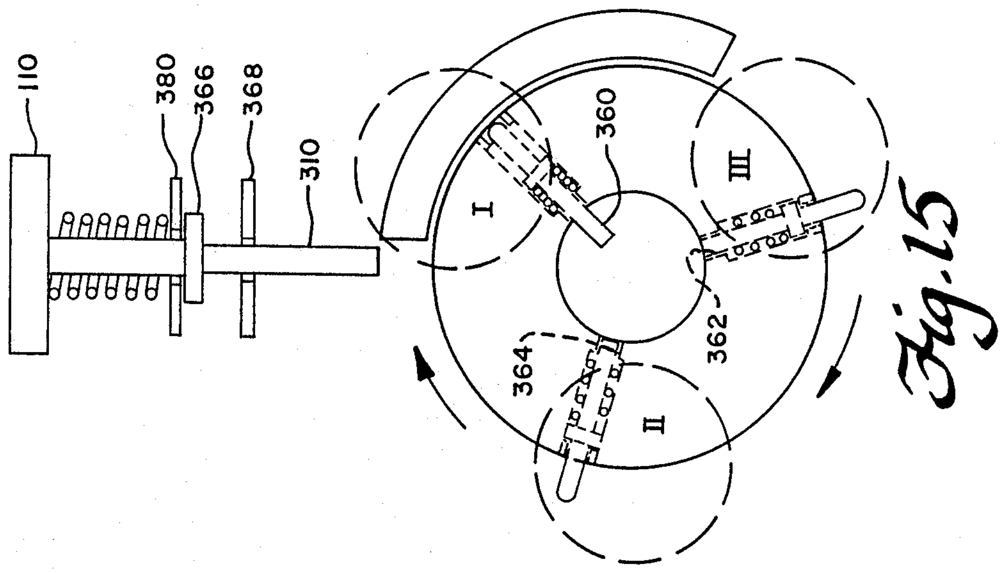

The lower end of each of the spring loaded sprocket pins 360, 362 and 364 normally rests just outside the inside diameter of the ejector sprocket segment and avoids interference with the drive shaft. However, when the selector pushbutton (button "A" 110, button "B" 112, or button "C" 114) for that particular ejector sprocket segment is depressed, the plunger pin, for example, plunger pin 310 engages the top of a spring loaded pin such as, for example, spring loaded pin 360 and pushes it downward (FIG. 14) so that the opposite end of the spring loaded pin enters a passage such as passage 356 in drive shaft 342. Passage 356 in drive shaft 342 has a chamfered opening for ease of spring loaded pin entry even when slightly misaligned and a close fitting diameter to firmly engage the depressed spring loaded pin. The depressed selector pushbutton, such as for example, button "A" 110, also acts as a switch that activates the driving mechanism only when the pin has been fully depressed. The switch function is provided by electrical contact 366, electrical contact 368, and electrical contact 380 which are shown in FIGS. 13-16. In FIGS. 13, 15 and 16, the switch is in its "standby" position and in FIG. 14, the switch is in its "dispense" position. Once fully depressed and engaged with the drive shaft, spring loaded pin 360 is then clear of forward motion stop 500 in the collar.

If the request to dispense is proper, the control system will then activate gear motor 340 causing drive shaft 342 to rotate in the forward direction. Since the selected ejector sprocket segment is engaged by the spring loaded pin extending into drive shaft 342, the selected ejector sprocket segment also rotates forward (FIG. 15) and dispenses the next article from th packaging strip associated with that sprocket. Once drive shaft 42 and the ejector sprocket segment have rotated approximately 120 degrees (for a sprocket with three depressions), the spring loaded pin that has engaged drive shaft 342 and has been kept depressed by a cam 510 on the collar, reaches a point where it can spring outward again. This outward movement causes the lower end of the pin to disengage the drive shaft and stop sprocket rotation at the proper position for a completed dispensing movement (FIG. 16). Another spring loaded pin is now against the forward motion stop 500 thereby preventing any sprocket coasting in the forward direction. Stop 500 also prevents the patient from pulling the strip beyond the dispensed position. The pin that was providing sprocket drive now interferes with reverse motion stop 502 if the patient should attempt to push the sprocket backwards.

Thus, the cartridge selector pushbuttons and spring loaded pins act as a clutch system that can individually engage any of the sprockets for dispensing their associated strip held articles and that automatically disengages at the completion of a dispensing cycle. The selector pushbutton serves to both mechanically activate the spring loaded pin clutch mechanism and electrically signal when the pin has been fully depressed and gear motor 340 action may begin. The dispenser's control circuit and programming checks to see that only one selector pushbutton has been depressed before activating the gear motor. The circuits and software also check to verify that the selector pushbutton has been released before the gear motor cycle is completed. A switch 700 (shown in FIG. 6) activated by a cam on the drive shaft signals when a dispensing cycle is complete. Thus, a mechanically simple and reliable segmented sprocket drive system with compact mechanical clutches is used to avoid the expense and size of separate dispensers, or single dispensers with a motor for each cartridge, or expensive and bulky standard clutch mechanisms.

Figure 17:
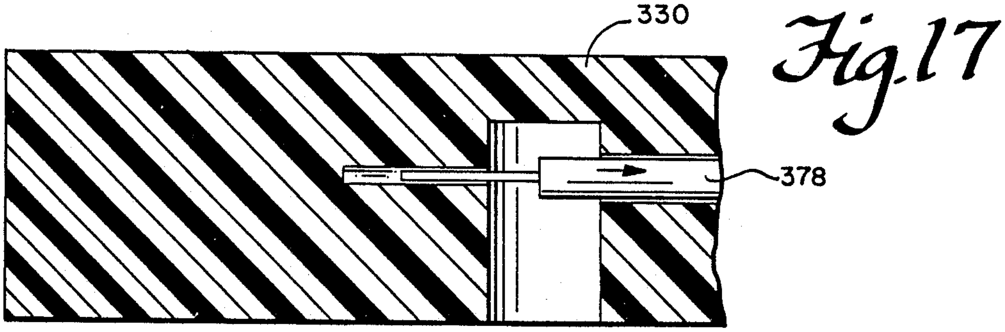
FIGS. 17 and 18 are cross sections showing locking pin 328 and its interaction with locking mechanism 330.
Figure 18:
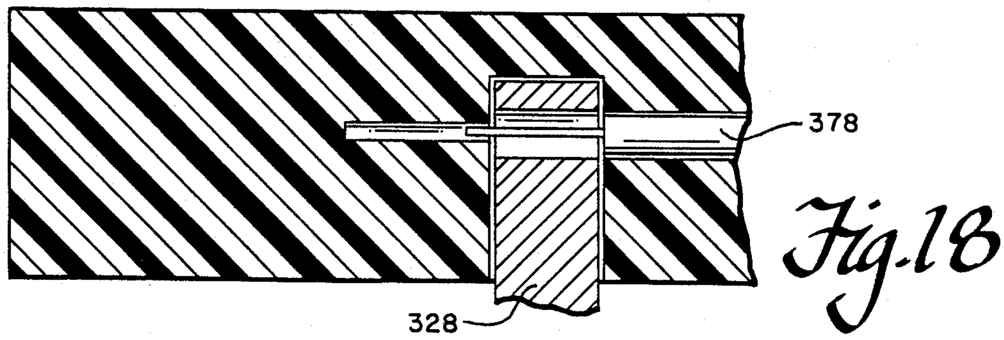

FIGS. 17 and 18 are cross sections showing locking pin 328 and its interaction with locking mechanism 330. Locking mechanism 330 includes a solenoid, not shown, that controls the movement of a bar 378 which interacts with locking pin 328 to lock or unlock lid portion 324 of dispensing unit 100 from its lower portion. When the solenoid has pulled bar 378 to the unlock position a smaller diameter portion of bar 378 will pass through a slot in pin 328.

Figure 19A:
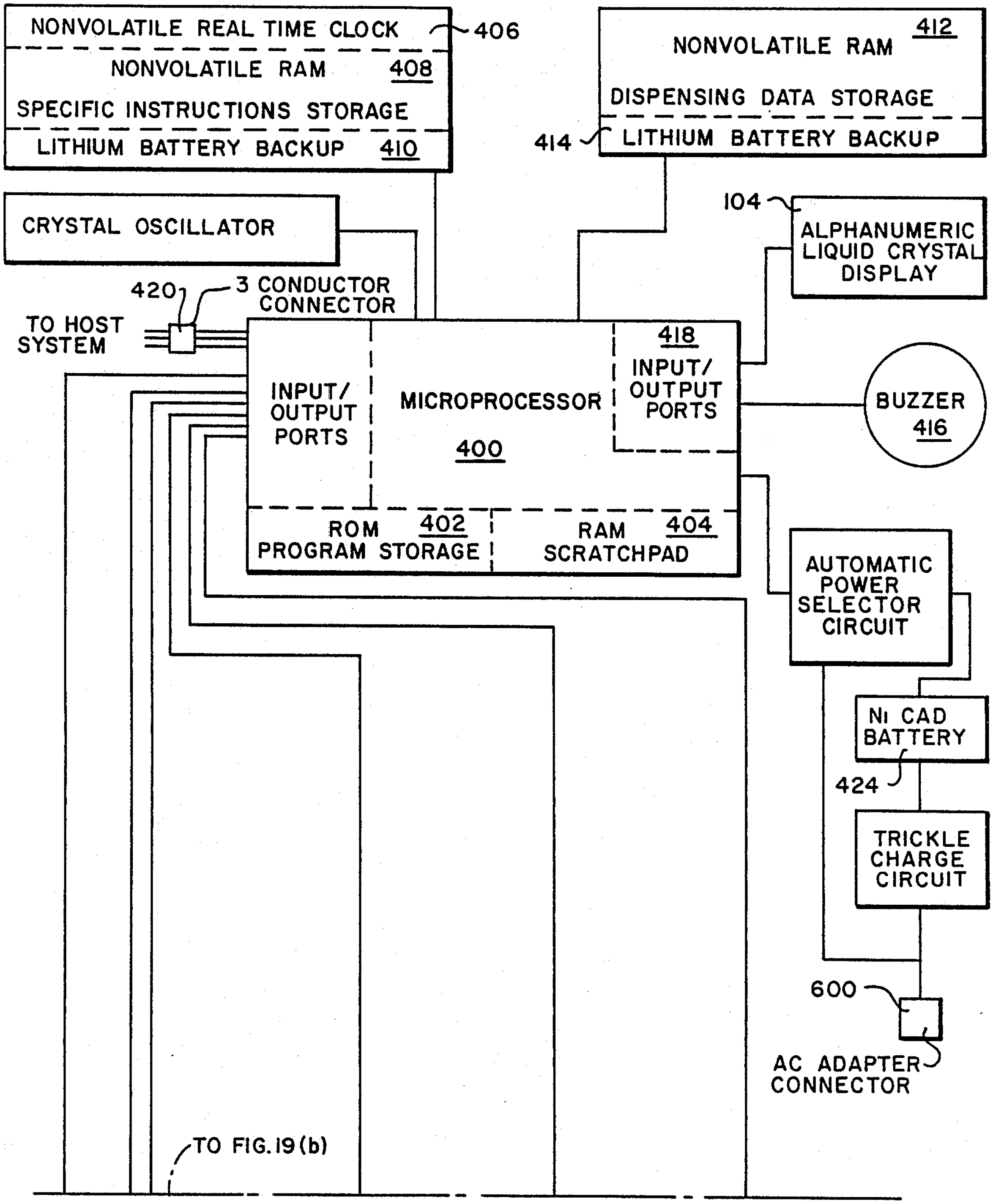
FIGS. 19(*a*) and 19(*b*) together form a block diagram of the microprocessor based dispenser electronic control system 326.
Figure 19B:
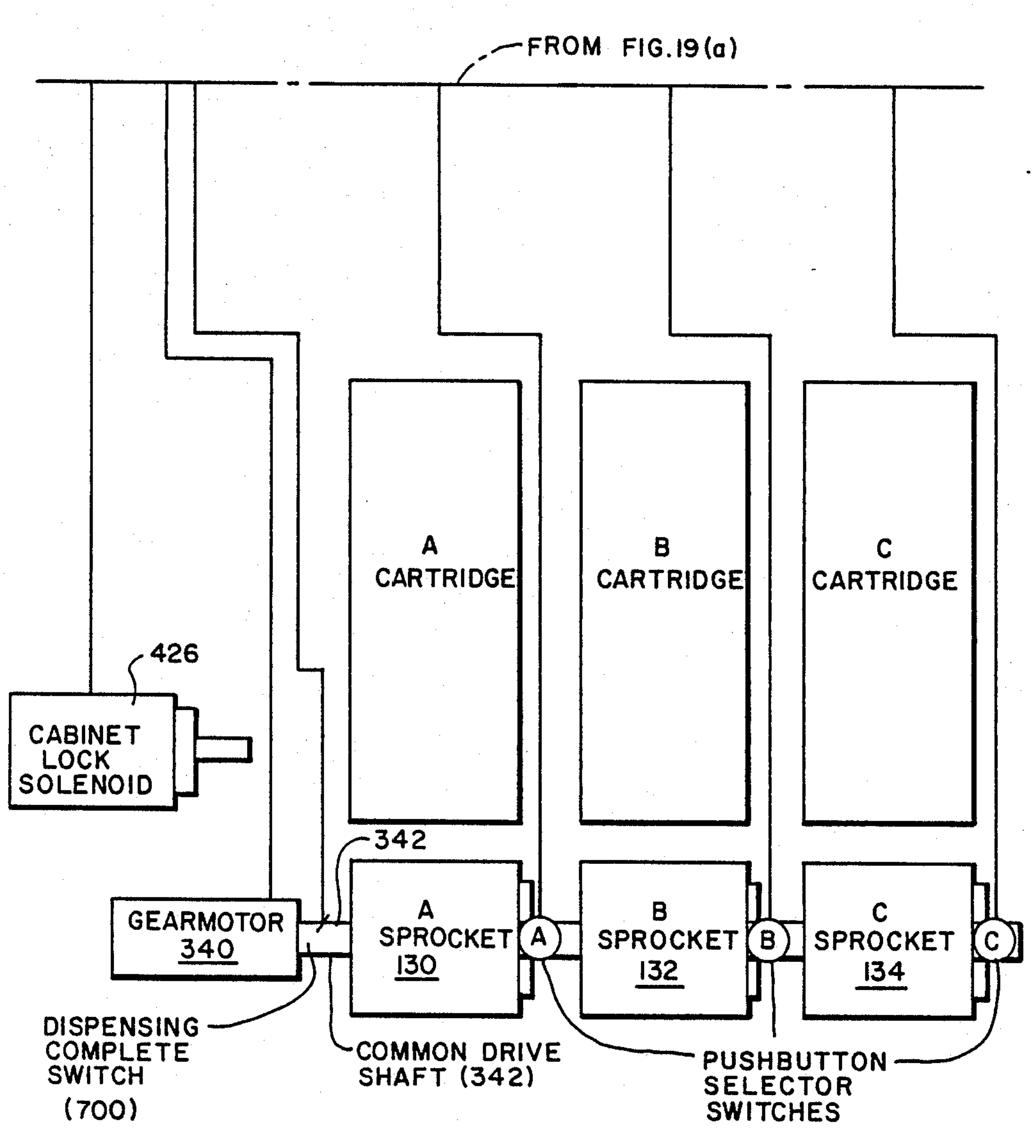

FIGS. 19(*a*) and 19(*b*) together form a block diagram of the microprocessor based dispenser electronic control system 326. The microprocessor 400 has mask programmed, on-board read only memory (ROM) 402 that stores the basic operating program without the need for external ROM that would require additional space and power. Microprocessor 400 also has associated therewith volatile random access memory RAM 404 for scratchpad storage of intermediate results. A wait mode is available that reduces power consumption during standby periods.

A combination real time clock 406 and random access memory 408 provide time of day and date information, periodic one minute alarm signals to wake the microprocessor out of its wait mode, and storage locations for the medication specific dispensing instructions supplied from a host system. A lithium battery 410 provides backup power for clock 406 and RAM 408. In this manner the dispenser never loses track of time or dispensing instructions even if the unit's power is interrupted. This on-board battery can power this section of the circuitry for up to ten years.

Another battery backed up device, the nonvolatile random access memory 412, backed up by a second lithium battery 414 is used for nonvolatile storage of data that may be used to determine when the dispenser actually dispensed articles. Like real time clock 406, the nonvolatile random access memory's 412 on-board battery 414 will protect the dispensing data for up to ten years in the absence of any other power.

An eight character alphanumeric liquid crystal display 104 (see also FIG. 1) supplies the patient with a wide variety of information. The time of day when the next dispensing operation for any of the dispensing stations is due is the normally displayed information. If no doses are due to be dispensed for the remainder of the day, the display will read "TOMORROW". As a dispensing operation is being completed, the display may provide a message that instructs the patient on how to administer the dispensed medication. Usually these messages will be longer than eight characters and will be scrolled across the display. Thus, almost any length message may be accommodated. If the patient attempts to dispense a medication at an improper time or otherwise attempts to use the dispenser in an improper manner, an appropriate and complete error message may be displayed. Not only doe the patient learn that the attempted operation is not appropriate, but he is also given the information needed to correctly use the device. The display can also provide prompting and status labels that aid the physician or pharmacist in loading and debriefing the dispenser. A buzzer 416 functioning as alarm 106 (see FIG. 1) is included to provide audible signalling. These signals are used to bring the patient's attention to the device when a dispensing operation is overdue. Proper and improper use of the dispenser can be indicated by the pitch and duration of the tone as controlled by the microprocessor. Alarms of various and/or multiple frequencies may be employed to match the hearing deficiencies of a particular patient.

The dispenser's electronics includes means to communicate with a host system for the purpose of receiving dispensing instructions and sending records of actual dispensing operations for analysis. These communication means include input and output ports 418 on the microprocessor that are connected to terminals in the housing walls. Only three leads are required for these purposes, making possible the use of small, simple connectors. RS-232 level conversion devices may be used to interface the microprocessor level signals to those of standard serial ports on host systems. Although data is transferred at the rate of 1200 baud in the preferred embodiment, almost any baud rate could be chosen. Error checking routines in the microprocessor and host system software help insure error free data transmissions. Special socket terminals on the dispenser housing may be used in place of the standard three conductor connector 420. Spring loaded connector pins on a communication interface device are then able to make rapid connection. The special sockets on the dispenser are blind holes that do not allow an opening into the electronics housing as a standard connector would.

Power for the portable dispenser is normally supplied from an AC adapter plugged into connector 600 on the side of the dispenser. AC line power is converted to low voltage DC power for use by the dispenser. A self contained nickel cadmium battery 424, continuously trickle charged while AC adapter 422 is connected, provides full operating power for up to seven days or more during portable use and other AC power interruptions. The lithium batteries in the real time clock and nonvolatile random access memory described above can preserve the essential data stored within their memories for as long as ten years.

The dispenser housing 500 (see FIG. 1) would usually be built of engineering plastics that can provide the lightweight strength required for reliable portable use. Three essentially identical cartridge cavities 102, 320 and 322 are arranged side by side so that the cartridges may be easily loaded from the top. Ejector sprocket segment 130, ejector sprocket segment 132, and ejector sprocket segment 134 are installed on drive shaft 342 and rest in collars at the front of each dispensing station. Thus, when the cartridges are loaded from the top into the cartridge holders, it becomes easy to pull the first article in the strip packaging forward and lay it into the sprocket depression that is in the ready position. The hinged lid portion 324 of dispensing unit 1? ? is lowered and latched thereby simultaneously securing all of the cartridges and all of the first strip articles into their respective sprockets.

A locking mechanism 330, operated by a solenoid 426 locks lid portion 324 of dispensing unit 100, thereby preventing unauthorized entry. Solenoid 426 can only be actuated by the proper command sent by the host system during loading and debriefing operations. Although a simple keyed cabinet latch could have been used instead, the hidden solenoid latch provides a more friendly and tamper proof design.

The hinged lid portion 324 of dispensing unit 100 contains electronic control system 326. Connections for three conductor connector 420 and AC adapter 422 may be located in any convenient location.

A cradle (not shown) may be used to support the open lid of the dispenser during loading and unloading and to provide convenient connection to the host computer system communication port. One integrated circuit is sufficient to interface the dispenser to a RS-232 host computer serial port and may be located in the cradle or more simply in the connector housing used to connect to the serial port of the host computer.

Figure 20A:
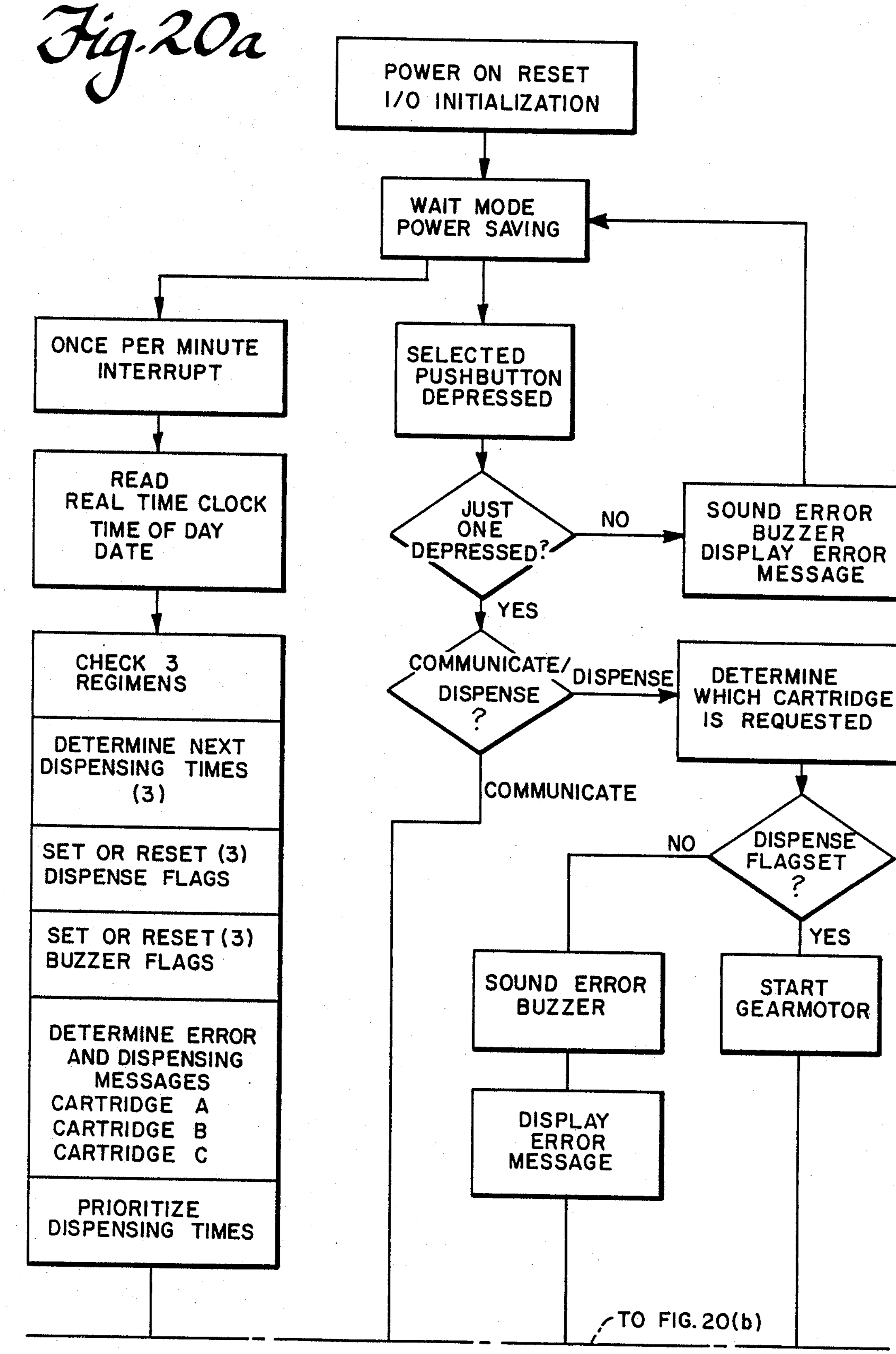
FIGS. 20(*a*) and 20(i b) together constitute a flowchart of the dispenser firmware.
Figure 20B:
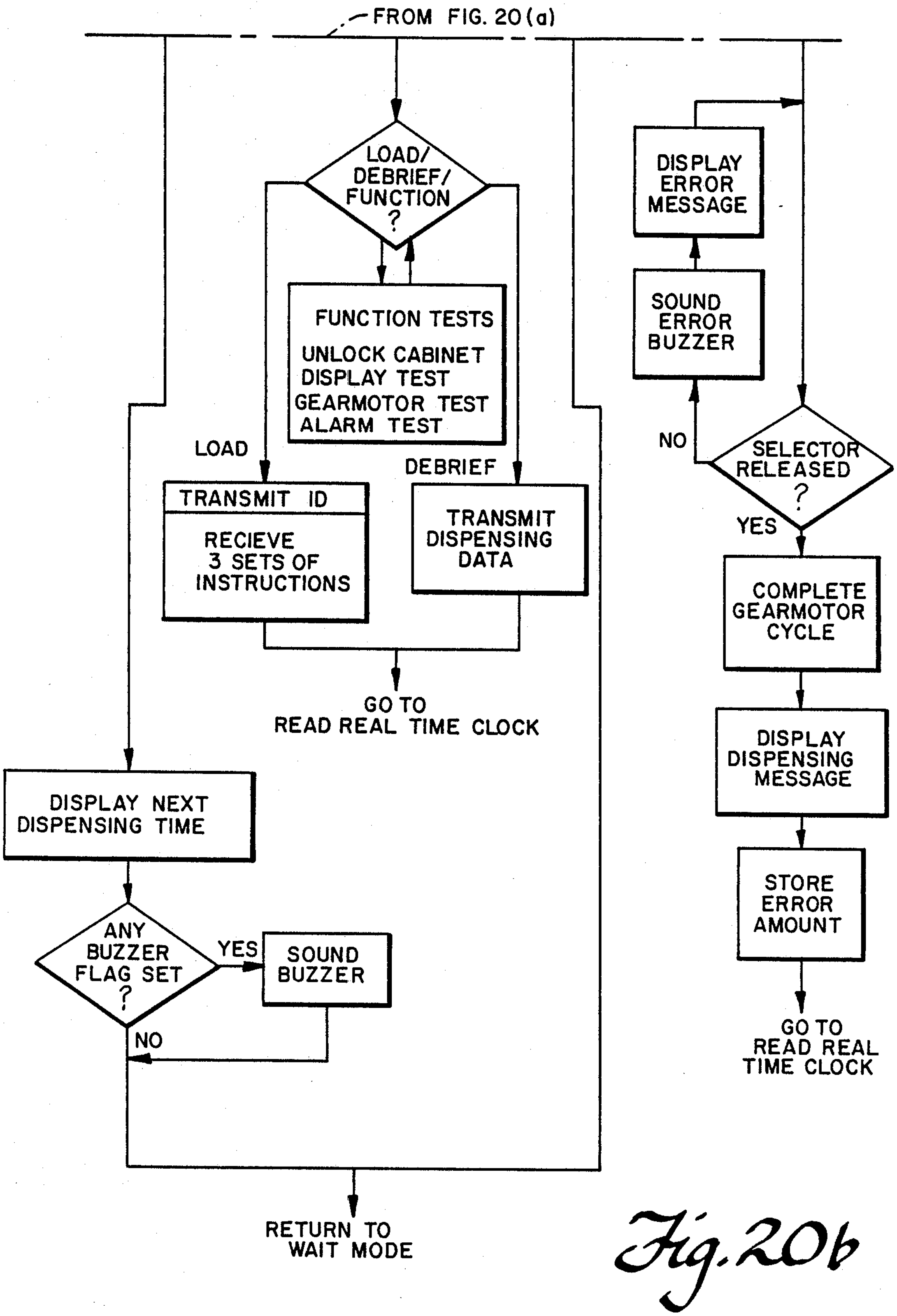

FIGS. 20(*a*) and 20(*b*) together constitute a flowchart of the dispenser firmware. The dispenser is normally in its wait mode in order to conserve power. During this approximately 59 second standby period each minute, the system is inactive except for a message displayed on the liquid crystal clock and the operation of the real time clock. Once a minute the real time clock generates an alarm signal that interrupts the microprocessor and wakes it from the wait mode. The microprocessor then proceeds to check the time of day and date against the schedules for each of the three dispensing stations. If any of the stations is overdue for dispensing, the microprocessor generates two one second alarm signals on the buzzer to get the patient's attention. The microprocessor then prioritizes the next dispensing times for the three dispensing stations and displays the next upcoming time on the display. Flags are set or reset for each of the dispensing stations to indicate whether a dispensing operation will be allowed if requested. The microprocessor then returns to the wait mode to conserve power and await the passage of another minute when the process would be repeated using updated time of day and date information. Thus, the patient always knows which medication to take and when, without the effort of understanding and remembering several simultaneous schedules.

The microprocessor is also awakened from the wait mode when any of the selector pushbuttons is depressed for a dispensing request. The program first checks to see if the dispense flag has been set for that particular dispensing station. If the request to dispense that particular medication is proper, the microprocessor actuates the gear motor. The dispense flags were set during the once a minute regimen checks so that the decision to dispense can be made quickly while the pushbutton is still depressed. Since the sprocket clutch is ready to engage only while the pushbutton is depressed, the gear motor 340 must be activated before the pushbutton is released. The engaged sprocket then moves the next medication dosage out of the dispenser for use by the patient. Instructions for use of that particular drug are then shown on the display so that the patient need not be confused when using multiple medications. If the once a minute alarm had been sounding for an overdue dose, the alarm will cease when dispensing is complete or if the dose is so late that it is considered missed. The program then rechecks the stored dispensing schedules and displays the next prioritized dispensing time and sounds the alarm if it is overdue. Finally, the program returns to the wait mode.

If the selected dispensing station is not properly available when its selector pushbutton is depressed, an appropriate error message, which was determined at the previous once per minute regimen check, will be displayed and an error alarm sounded.

An advantage of using an alphanumeric display and scrolling message software is apparent when long dispensing instructions and error messages need to be used to improve patient understanding of dispenser operations. The dispenser's instruction manual is thus included in its software and always automatically available to the patient. Instructions for taking each of the drugs are also always available, are applied to the appropriate drug automatically, and cannot be lost or forgotten. The patient is always presented with the appropriate instructions no matter how many medications are simultaneously prescribed.

The three selector pushbuttons, i.e. button "A" 110, button "B" 112, and button "C" 114 serve multiple functions. Not only do they signal a request from the patient to dispense from the three dispensing stations, they also provide the drug therapy supervisor with means to select particular functions while loading and debriefing the dispenser. The dispenser control system can distinguish between a dispensing request and a communications request because a signal is present on the communication lines that is not present during normal dispensing operations. Thus, these same three selector pushbuttons that allow the patient to select a dispensing operation also allow the drug therapy supervisor to select a loading, debriefing, or demonstration function. Multiple use of these few switches saves space, weight, and cost and decreases hardware complexity thereby improving reliability.

Figure 21:
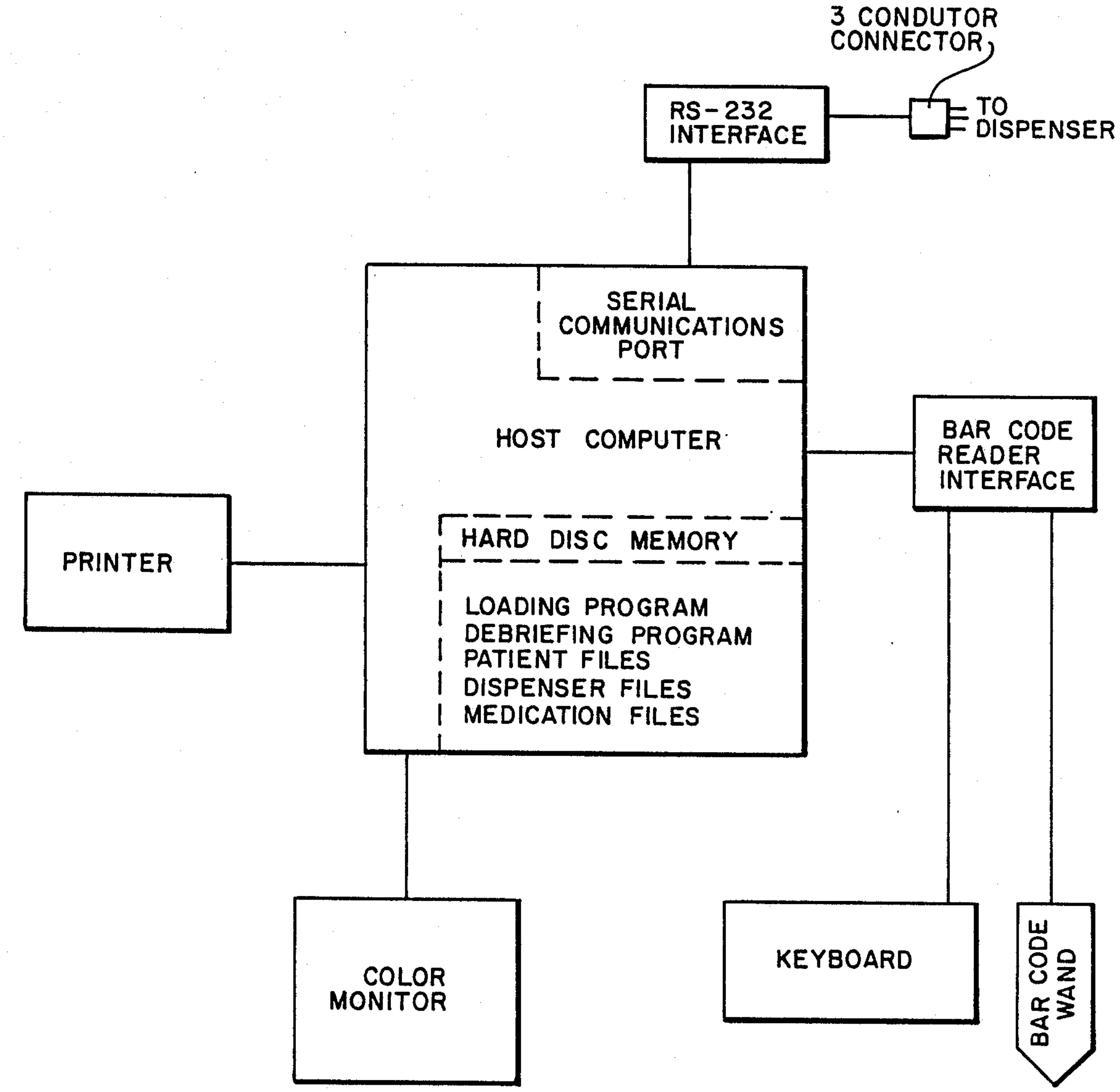
FIG. 21 is a block diagram of the host system hardware.
Figure 22A:
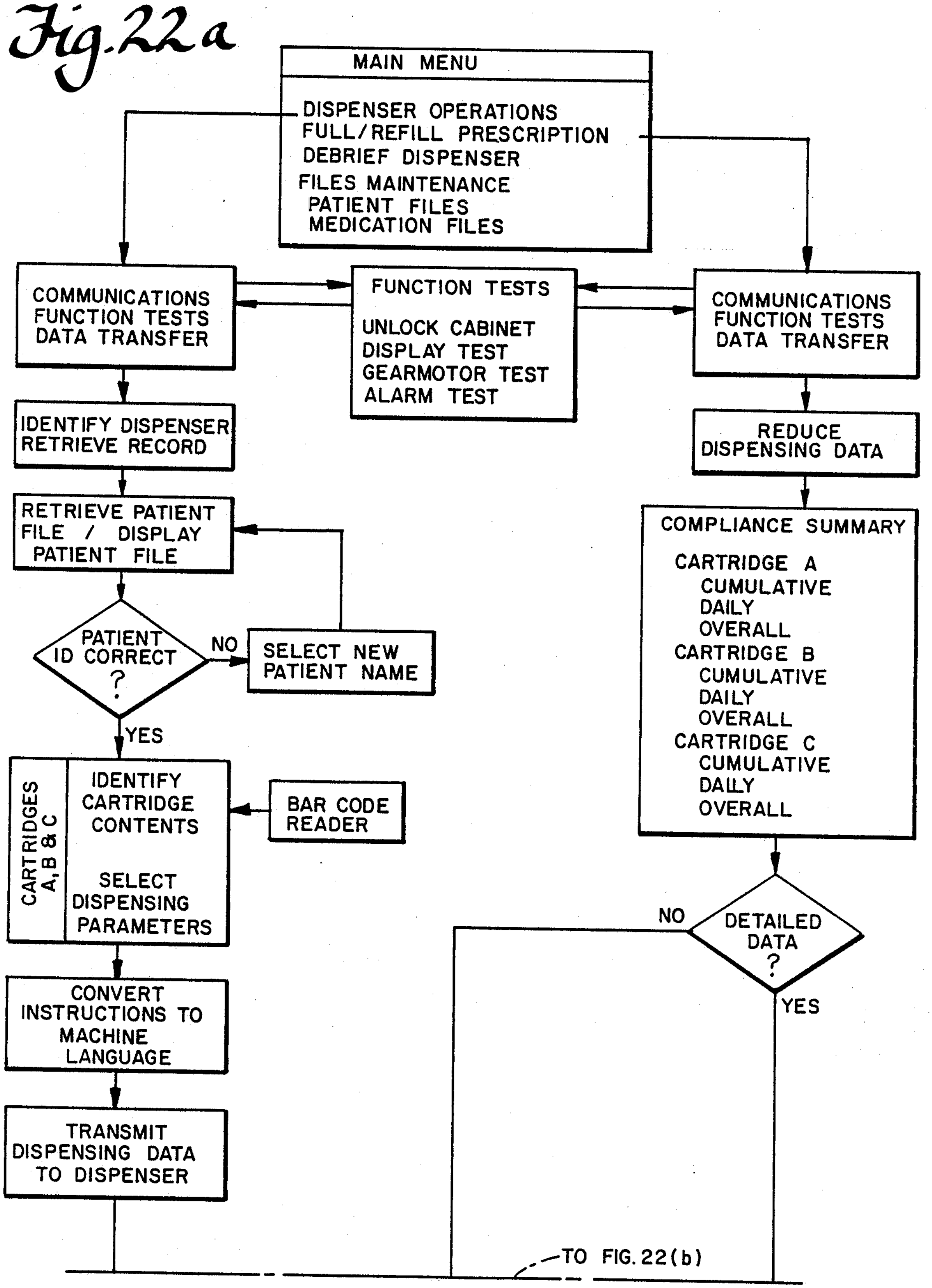
FIGS. 22(*a*) and 22(*b*) together constitute a flow chart of the host system software which explains the interaction of the host system with the dispensing unit 100.
Figure 22B:
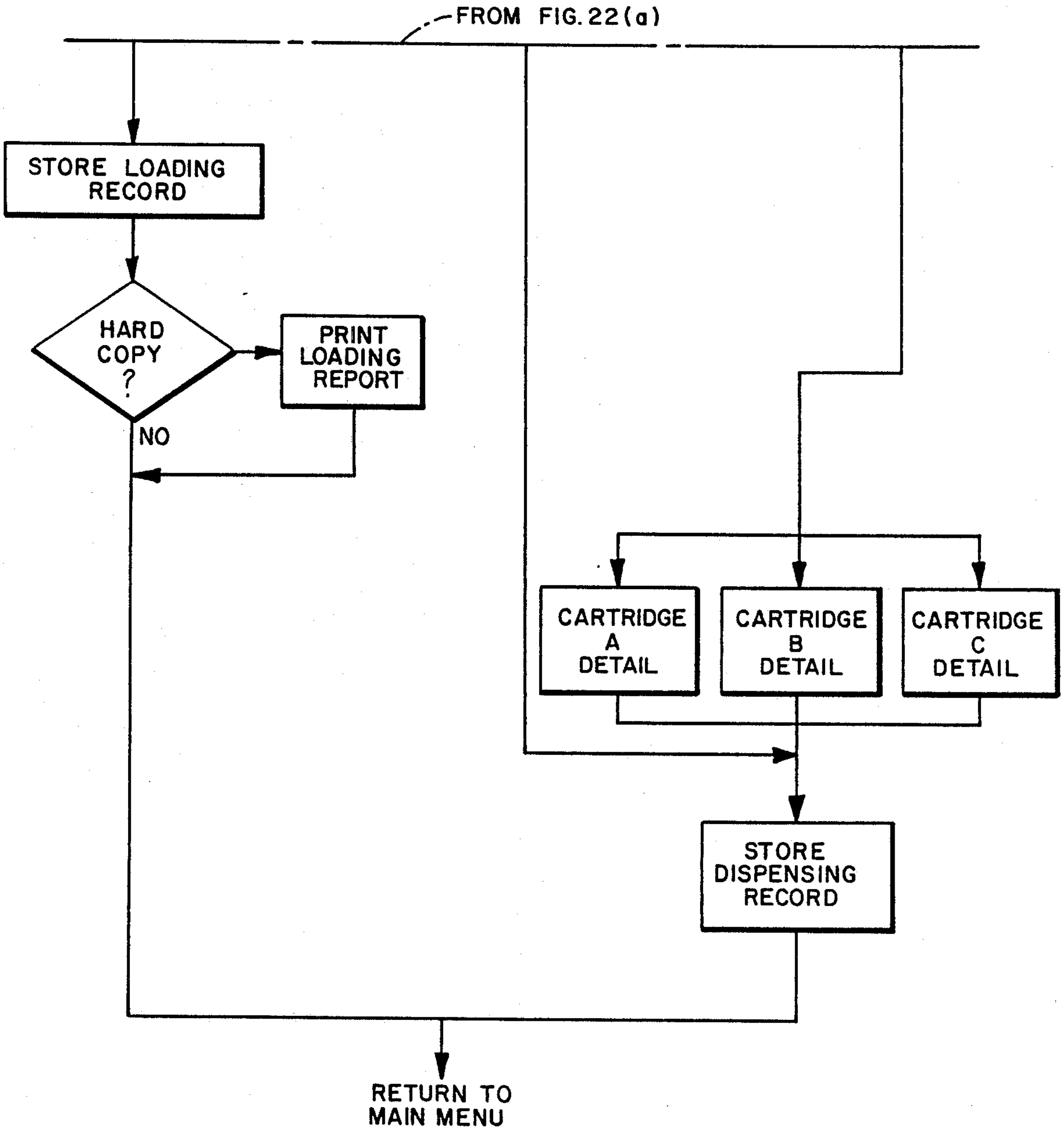

FIG. 21 is a block diagram of the host system hardware. FIGS. 22(*a*) and 22(*b*) together constitute a flow chart of the host system software which explains the interaction of the host system with the dispensing unit 100.

A loading operation is initiated by connecting three conductor connector 420 of dispensing unit 100 to the host system and pressing a selector pushbutton that has been designated for signalling host system communication requests. During the loading operation, dispensing unit 100 first sends a few bytes of information that identifies that particular dispenser unit to the host system. Then the host computer may request the dispenser to demonstrate proper operation of any of several dispenser functions. These tests include lighting all segments of display 104, operating buzzer 416, operating gear motor 340, and actuating solenoid 426 so that the dispenser may be opened for loading. After the medication cartridges have been loaded into the dispenser and first doses engaged on the sprockets, the drug types are identified to the host computer by means of reading a bar code label on each cartridge, and then the dispenser cabinet top is closed and latched. After cartridge loading is complete, the dispenser receives from the host system regimen data for each of the dispensing stations and time of day and date information to reset the onboard real time clock if necessary. At completion of the loading operation, the dispenser microprocessor checks the regimens and goes to the wait mode to await a dispense request, or a load or debrief host system request, or the once per minute real time clock interrupt to update the regimen status flags.

A host system debriefing request is similarly initiated by connecting the dispenser to the host system communication port and pushing the selector pushbutton designated for communications requests. The dispenser microprocessor then transmits identification, regimen, and time of actual dispensing data to the host system. Error checking routines verify that the host computer received the proper data.

The dispenser keeps time of actual dispensing data in the form of error data since that requires less storage space than a full representation of the time of day and date information. Since the host computer can reconstruct all essential information from just the error data, reduced storage requirements are possible. The error value is the difference between the prescribed dispensing time and the actual dispensing time. The resolution of this error data is set at 15 minutes since that is sufficient for medication regimen purposes. Resolution down to hundredths of a second is easily obtained from the real time clock. However, increased resolution must be balanced against the additional memory space required to store the higher resolution numbers.

Once the dispenser has transmitted the dispensing data to the host system for compliance analysis, the dispenser microprocessor checks regimens against the present time of day and date and returns to the wait mode to await the start of another cycle.

A host system would typically consist of a computer with serial communications port, printer, color monitor, and bar code reader. Virtually any computer system could be used as the host device for this dispensing system. The host computer must have sufficient on-line memory to run the load and debrief programs and sufficient storage capacity to maintain the necessary dispenser, patient, and medication files.

The drug therapist is first presented with the main menu which offers loading, debriefing, and file maintenance selections. When the loading program is selected, the therapist is instructed to connect the dispenser to the host system communication port and press the dispenser's selector pushbutton designated for signalling loading operations. The dispenser then transmits its identification code so that the host system can retrieve the latest loading record for that particular dispenser. The therapist next indicates whether the previous patient or a new patient is to use the dispenser next. If the same patient will use the device again, the program stores that information and proceeds to questions concerning the medications to be dispensed. If a different patient is to use the dispenser, a pop-up menu is used to select the patient's name from the stored patients' files. Once the proper patient has been identified, the host computer retrieves that patient's file and displays its contents. The therapist may then verify that the correct patient has been identified and review any special conditions for that patient that might be relevant to the dispensing operation.

Once the patient identification is complete, the program proceeds to identify the medication to be dispensed from each dispensing section. Dispensing schedules and instructions for each dispensing section are also input. A bar code reader connected to the host system may be used to rapidly read a bar code on the cartridges to quickly and accurately identify the contents of each dispensing station. Drug identification codes may also be typed in manually or selected from pop-up menus. The cartridge holders and video prompts may be color coded to aid in correlating the proper drug data with the correct dispensing station.

For each cartridge loaded, the therapist must select dispensing instructions options that will govern the dispensing operations for that particular medication. When the loaded medications are first identified, the program retrieves the files for those medications and suggests typical dispensing parameters for those drugs. The therapist then has the choice of accepting the suggested typical schedules and other parameters or modifying them to suit any particular needs.

The dispensing frequency is first defined. For the medical dispenser the four options are once, twice, three, or four times per day. Other frequencies and uneven intervals might be appropriate for dispensing other types of articles and are equally within the capabilities of this dispensing system. Once the dispensing frequency has been defined, the daily schedule of prescribed dispensing times is selected. In the case of the medication dispenser, on-the-hour dispensing times are selected but any target times could be used if appropriate for other applications.

The therapist also defines the allowable tolerance around the target dispensing time. Because the dispenser has complete locking control of the dispensing operations, the patient can be restricted to dispensing within predefined periods before and after the prescribed dispensing time. For instance, the dispenser may be instructed to allow access to a particular cartridge up to three hours before and four hours after the prescribed dispensing time. Any combination of early and late periods is possible including continuous access. The early and late period resolution may range from months to seconds depending upon the degree of control necessary.

Even more complicated definitions of access time could be accommodated. For example, a fixed number of dispensings within a specified period could be defined for a particular medication as the only limiting parameter. Or the dispenser could be instructed to enforce a minimum interval between dispensing operations with or without specifying a prescribed target dispensing time. Overdosing of a particular medication can thus be prevented. A minimum interval may be set either with respect to just one of the cartridge medications or taking into consideration dispensing operations of all the cartridges in the dispenser. Thus, if the effectiveness of one medication would be reduced by the presence of another, a twelve hour interval could be maintained between the dispensing of the two medications. The system is therefore capable of maintaining priorities among multiple dispensing operations and can, as required, prevent or cause interaction among dispensed medications by coordinating their dispensing times and accessibility. This sophisticated control capability, both for individual dispensing sections and for coordination of all the dispensing sections in combination, provides novel dispensing capabilities in such a compact and portable dispensing device.

The first dosing time is next selected from the daily dosing times. The therapist also can specify a starting day delay ranging from none to several days or weeks. Thus, the first dose and starting day offset parameters allow the therapist to precisely control when the regular dispensing operations will start for each dispensing section of the dispenser. The therapist can thereby program the dispenser in advance for the convenience of his and/or his patient's schedule.

The delayed starting option also may be used to extend the total dosing endurance for a medication by loading more than one cartridge of that drug into the dispenser and programming the additional cartridges to be accessible after earlier used cartridges have been exhausted. Dosing periods of six weeks or more can be attained by this method when using the three cartridge dispenser loaded with the same medication in all three compartments.

The total number of articles to be dispensed from a particular cartridge is also selected so that the dispenser knows when to stop prompting and dispensing for that cartridge.

Alarm usage may also be defined. The alarm can be programmed to sound only when the dispensing operation is overdue, or in advance to help insure timely dispensing, or not at all. These alarm options are selected for each dispensing section.

Messages to be displayed upon dispensing a medication may also be specified. For each dispensing section the therapist may chose from a standard set of messages or may input a custom message. A suggested standard message for that particular medication is provided when the host system identifies the drug in that cartridge but the therapist is free to modify or substitute for that standard message. These messages serve to help the patient properly use the dispensed medication. Instructions, warnings, or any other type of message may be provided. These messages may be much longer than eight characters since the dispenser microprocessor will scroll long messages across the display. The amount of information conveyed by these messages is only limited by the storage capacities for these messages in the dispenser memory elements.

The host system loading program also collects prescribing physician information. Emergency phone numbers are then readily available to the therapist in case a consultation with the prescribing physician is necessary. The program also automatically keeps track of the number of allowed and used refills for each medication loaded.

Once all of the identification and dispensing parameters data has been gathered from the therapist by the host system, the loading program converts the dispensing control data into a convenient form for use by the dispenser. This conversion of the control data into a form that is directly usable and preassembled for the dispenser saves dispensing unit software complexity. It is easier for the higher level host system computer to convert these data than for the dispenser's microprocessor to do so. After conversion, these identification and dispensing control data are automatically sent to the dispenser over the three wire communications link where it is stored in nonvolatile memory. Error checking routines verify that the stored data are the same as those sent.

The host system loading program then consolidates the loading data into a summary report and stores it on the host system archival storage medium, usually a hard disk. This record is then available as a memorandum of how the dispenser was programmed for that use period. A paper copy of this record may also be generated on the host system printer for use in the patient's, dispenser's, or therapist's hard copy files. At the completion of these loading documentation operations, the program returns to the main menu for selection of another function.

A dispenser function test routine is available from both the loading and debriefing programs. The functions test menu includes commands that will cause testing of the dispenser's buzzer, liquid crystal display, gear motor and solenoid latch devices. Thus, the therapist can verify that the loaded dispenser is sent out properly functioning and that any returning dispenser is still functioning properly at the end of the dispensing period.

The host system debriefing function is also selected from the main menu. After connection of the returned dispenser to the communication link, a selector pushbutton designated for signalling a debriefing request is pushed and causes the automatic transfer to the host system of all the data loaded into the dispenser at the start of the dispensing period and all of the data collected as the articles were dispensed. The collected dispensing data contains dispensing time error data. Because the host system recalls all of the dispensing schedule and control data from that dispenser's latest loading report, the host computer can reconstruct from the dispensing time error data the time of day and date when the medication was actually dispensed. The returned dispenser identification and dispensing parameters data is compared against the loading record to insure that data remained unchanged throughout the dispensing period.

The collected error data and the calculated time of day and date data are used to provide detailed reports of dispensing activity for each of the dispensing stations. A summary is first displayed on the host system color monitor which gives key information at a glance. Color coding of the displayed information speeds assimilation by the therapist and quickly identifies any problem areas requiring special attention. The primary information displayed on this first screen is the compliance level for each of the medications dispensed. The compliance levels are determined by comparing the patient's actual dispensing behavior to the prescribed dispensing schedule and by comparing the extent of any discrepancies to standards set for that medication. Those standards may have been set by the manufacturer of the drug, the drug therapist, or by some other method. The adequacy of the actual dispensing behavior in comparison to whatever standards are considered appropriate is quantified and displayed for each of the dispensing sections.

Several compliance scores may be calculated from the data. A cumulative compliance score may be calculated that is the ratio of the number of doses actually dispensed to the number of doses prescribed for the period. The cumulative compliance score then is a measure of total dosage compliance.

Another index can be computed that measures the effectiveness of the doses that were taken. This daily compliance score measures the number of medication dosing intervals during which the patient was under or over medicated. The actual dosing intervals are compared to the prescribed dosing intervals and intervals that are longer or shorter than some allowed length of interval tolerance are counted and weighted according to how excessively short or long the improper interval is. The daily compliance score then is a measure of how well the medication levels matched the prescribed levels irrespective of actual dispensing times.

By subtracting the daily compliance score from the cumulative compliance score an overall compliance index can be developed. Calculating an overall compliance index is one manner in which the entire set of dispensing data for a particular cartridge can be reduced to a manageable level. Such an index allows a quick, yet relatively complete, evaluation of patient compliance to the prescribed regimen and the probable effectiveness of the drug therapy.

Any compliance scores not meeting established standards are flagged by displaying them in a flashing red color. Thus, by means of this single screen summary of dispensing operations, the therapist may quickly evaluate the adequacy of the dispensing operations for each cartridge without having to decode and analyze all the compliance data details. If the summary indicates that the dispensing operations were within allowable limits for all of the cartridges, the therapist may elect to save time by not reviewing the more detailed data presented in later screens.

Figure 23:
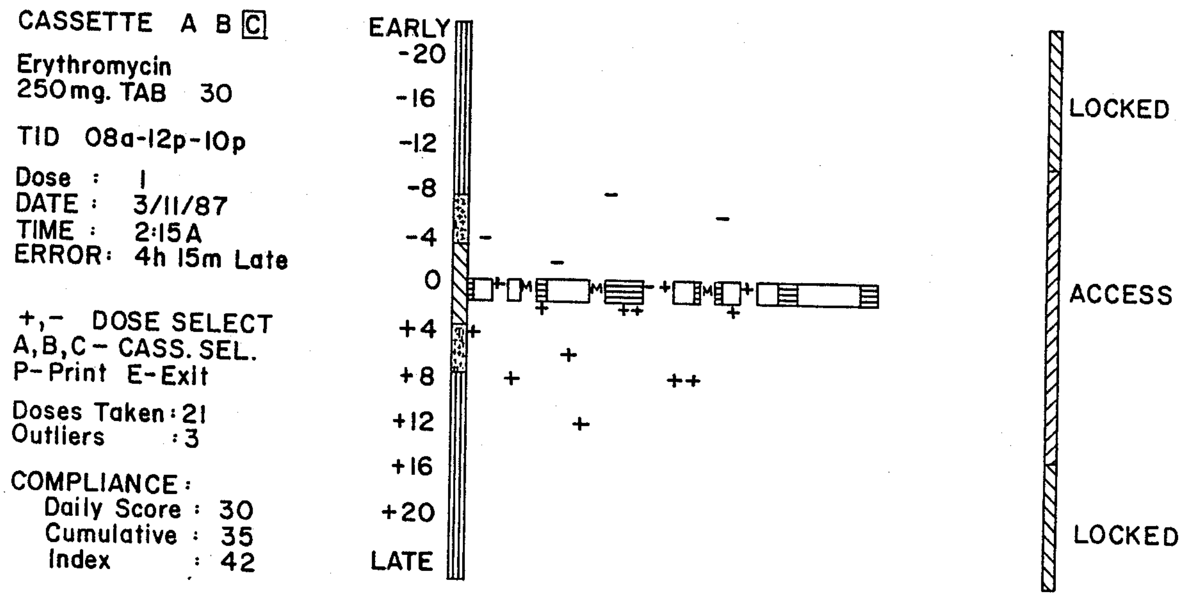
FIG. 23 is a graphical presentation of a compliance report prepared by the dispensing system according to the present invention.

If the summary screen shows that a compliance problem exists, or if the therapist cares to examine the dispensing data in detail for any reason, detailed dispensing data for each cartridge may be viewed in graphic and tabular form in full screen, color displays. FIG. 23 reproduces one such graphical presentation. These detailed graphic displays again allow immediate identification of non compliant operations by means of color coded graphs of dispensing error versus prescribed dosing times. Once the problem areas are shown on the graph, the therapist may use the cursor to point to those non-compliant operations and the program will display the actual dispensing time, the prescribed dosing time, and the amount of error in numeric form for an exact measure of the noncompliance for that one dispensing operation.

Thus, both summary level and detailed data are available to the therapist for both a rapid and a thorough evaluation of patient compliance to the prescribed regimens. The host system will save all dispensing data to its dispensers' and patients' files. A paper copy of any of the summary or detailed information may be generated and saved for statistical and archival purposes. The host system program returns to the main menu after completion of debriefing operations. The dispenser resumes normal dispensing operations after disconnection from the communications link.

The compliance analysis will now be described. The following parameters are important in evaluating patient compliance. The final computer generated compliance report includes the following information. These parameters allow the physician or pharmacist to adequately asses all potential aspects for poor compliance to a prescribed medication regimen.

1. Shortest dosing interval (hours)
2. Longest dosing interval (hours)
3. 24 hour intervals without medication (number of occurrences)

In addition to these, there are six calculations carried out to allow for adequate assessment of patient compliance based on the data collected by the compliance monitor.

The following definitions apply:

Prescribed Values

Total Dosing Period (Days) $= D$

Prescribed Dosing Frequency (Daily) $= F$

Longest Prescribed Dosing Interval (Hours) $= I_L$

Shortest Prescribed Dosing Interval (Hours) $= I_S$

Total Doses Prescribed $= D \cdot F$

Empirical Values

Total Doses Dispensed $= d$

Dosing Intervals Less Than $I_S = i$ where $n =$ dose number $i_{sn}$ is any i (in hours) where $i < I_S$ Dosing Intervals Greater Than $I_L = i_{1n}$ where $n =$ dose number, $i_{1n}$ is any i (in hours) where $i > I_L$ Short interval outlier $(0_{sn}) =$ any $i_{sn} < I_S/X$ where X is $>1$ and chosen based on toxicity profile of drug Long interval outlier $(O_{1n}) =$ any $i_{1n} > I_L \cdot Y$ where Y is $>1$ and chosen based on efficacy and elimination characteristics of drug Dosing frequency during any 24 hour period $(p) = f_p$ Dosing Frequency Less Than F $f_{1p}$ is any f where $f_p < F$ Dosing Frequency More Than F $f_{mp}$ is any f where $f_p > F$ A Cumulative Compliance Score (CCS) is calculated as a simple percentage of the total doses consumed during a given time period, divided by the total doses prescribed during this time period, multiplied by 100.

$$d/D \times 100 = CCS$$

A Daily Compliance Score (DCS) calculation allows for a value to quantitate overall compliance. Patients could have a very high CCS and yet not have taken the medication according to the prescription. The DCS evaluates patient compliance on an individual daily basis and provides a single value to facilitate evaluation. The DCS is calculated by determining the shortest $(I_S)$ and longest $(I_L)$ prescribed intervals. Actual dosing intervals (i) are then calculated—the first interval $(i_1)$ being between the time the initial dose was prescribed and the time the first dose was actually taken. The second interval $(i_2)$ is the time between first and second dose, etc. The last interval is calculated as the time between the last dose taken and the time the last dose was prescribed. Short interval outliers $(O_{sn})$ are divided into the shortest prescribed interval and summed. Long interval outliers $(O_{1n})$ are divided by the longest prescribed interval and these values are summed. These two sums derived from short and long intervals are added and divided by the total number of doses dispensed. This value is called the Daily Compliance Score.

$$\left(\sum_{D \cdot F}^{n=1} I_S/O_{sn} + \sum_{D \cdot F}^{n=1} O_{1n}/I_L\right)/d = DCS$$

An Overall Compliance Score (OCS) is a simple calculation provided by subtracting the DCS times ten from the CCS. A good compliance is proportional to a higher overall compliance score with the perfect score being 100. Acceptable limits for all three of the above indices will vary by drug, as well as by physician or pharmacist interpretation.

$$CCS - DCS \times 10 = OCS$$

An Over-Use Score (OUS) screens for periods of time when the medication was taken in very short intervals ($I_s$) or at minimally acceptable intervals over an extended period of time. This value is calculated by the summation of the shortest prescribed interval ($I_s$) divided by the short interval outliers ($O_{sn}$). This value is then added to the sum of the number of doses which exceed the maximum prescribed frequency in 24 hour periods, divided by the number of doses prescribed per 24 hour period. Twenty-four hour periods may not overlap. The total is then divided by the total doses taken.

$$\left(\sum_{D \cdot F}^{n=1} I_S/O_{sn} + \sum_{D \cdot F}^{n=1} f_{mp}/F\right)/d = OUS$$

An Under-Use Score is calculated by the summation of each long interval outlier divided by the longest prescribed interval ($I_L$). This value is added to the summation of 24 hour frequencies which were less than the prescribed frequency, divided by the prescribed 24 hour frequency. Twenty-four hour periods may not overlap. The summation of these two values, divided by the total doses used, is called the Under-Use Score.

$$\left(\sum_{D \cdot F}^{n=1} O_{1n}/I_L + \sum_{D \cdot F}^{n=1} f/f_{1p}\right)/d = UUS$$

In addition to the above, mean interval and standard deviation will be provided, as well as normalized standard deviation, which is calculated by standard deviation divided by the mean prescribed interval.

The above calculations, automatically carried out by the microprocessor provide evaluation of patient compliance by highlighting the cumulative effect of underuse or over-use of drugs throughout the prescription period as well asanalyzing overall drug intake. In addition to these, by considering individual drug absorption, serum half-life, effective blood levels and toxic ranges, calculations can be made using empirical dosing data to identify periods where therapeutic levels of drugs are not available to the patient or dangerously high levels exist.

While this invention has been described in connection with what is presently considered to be the most practical and preferred embodiment, it is to be understood that the invention is not limited to the disclosed embodiment, but, on the contrary, is intended to cover various modifications and equivalent arrangements included within the spirit and scope of appended claims.

MULTIPLE CARTRIDGE DISPENSING SYSTEM

Software Appendix

MA042087.TXT
REV. 01
04.20.87.LEP

```
CLOCKS: 1.048576 MHz (F1) INTO 146818 FROM CRYSTAL OSCILLATOR
   262.144 kHz (F2) (F1/4) INTO 146805E2 FROM 146818
   52.4288 kHz  (F3) (F2/5) BUS FREQUENCY
     BUS CYCLE PERIOD = .0000190735 SEC. (1/F3)
     FOR 1200 BAUD:
     1200 BAUD = .000833333 SEC/BIT
     44 CYCLES/BIT PERIOD = .000839256 SEC/BIT
     +0.71% ERROR
PORT ASSIGNMENTS: PORT A: 0000  07 UPON INITIALIZATION
      DDRA  : 0004  00 UPON RESET
         11 UPON INITIALIZATION
  PA 7 = CASSETTE #C REQUEST (ACTIVE=1)  0  DDA7 = 0 (IN)
  PA 6 = CASSETTE #B REQUEST (ACTIVE=1)  0  DDA6 = 0 (IN)
  PA 5 = CASSETTE #A REQUEST (ACTIVE=1)  0  DDA5 = 0 (IN)
  PA 4 = GEARMOTOR        0  DDA4 = 1 (OUT)
  PA 3 = AC ADAPTER AVAILABLE      0  DDA3 = 0 (IN)
```

```
  PA 2 = DISPENSING COMPLETE     1  DDA2 = 0 (IN)
  PA 1 = RS-232C INTO MONITOR     1  DDA1 = 0 (IN)
     MARK(-12v)=1(+5v)  SPACE(+12v)=0(GND)
     SET BAUD=1200,NONE,1 STOP,NO CONTROL
  PA 0 = RS-232C OUT OF MONITOR    1  DDA0 = 1 (OUT)
     1(+5v)=MARK(-12v)  0(GND)=SPACE(+12v)
     SET BAUD=1200,NONE,1 STOP,NO CONTROL
      PORT B: 0001  07 UPON INITIALIZATION
      DDRB  : 0005  00 UPON RESET
         FF UPON INITIALIZATION
         F7 FOR TAG DATA IN
  PB 7 = SOLENOID UNLOCK      0   DDB7 = 1 (OUT)  1
  PB 6 = BUZZER ON       0   DDB6 = 1 (OUT)  1
  PB 5 = NOVRAM ENABLE      0   DDB5 = 1 (OUT)  1
  PB 4 = NOVRAM ENABLE      0   DDB4 = 1 (OUT)  1
  PB 3 = LCD DATA OUT      0   DDB3 = 1 (OUT)  1
  PB 2 = COMMAND/DATA SELECT    1   DDB2 = 1 (OUT)  1
  PB 1 = SERIAL CLOCK      1   DDB1 = 1 (OUT)  1
  PB 0 = LCD ENABLE      1   DDB0 = 1 (OUT)  1
146818 REGISTERS: REGISTER A($010A) - 00011010 = 1A = 1.048576
MHz CRYSTAL
              15.625 mSec PI
              64 Hz SQW (NOT USED)
        BIT 0 - 3 RATE SELECT (1010 = 15.625 mSec PI,
              64 Hz SQW)
        4 - 6 DIVIDER BITS (001 = 1.048576 MHz CRYSTAL)
        7  UPDATE IN PROGRESS FLAG (READ ONLY)
      REGISTER B($010B) - 00100110 = 26 = RUN, PIE DISABLED,
            AIE ENABLED, UIE DISABLED,
            SQWE DISABLED, BINARY,24,
            NO DSE
        SET BIT 7(HOLD)($A6) DURING TIME INITIALIZE
       BIT 0 - DAYLIGHT SAVINGS ENABLE (0=DISABLE)
       1 - 24/12 HOUR FORMAT (1=24)
       2 - DATA MODE (1=BINARY)
       3 - SQW ENABLE (0=DISABLE)
       4 - UPDATE ENDED INTERRUPT ENABLE (0=DISABLE)
       5 - ALARM INTERRUPT ENABLE (1=ENABLE)
       6 - PERIODIC INTERRUPT ENABLE (0=DISABLE)
       7 - SET (1=HOLD 0=RUN)
     REGISTER C(010C) - READ ONLY (CLEARED BY A READ)
       BIT 6 - PERIODIC INTERRUPT FLAG
       5 - ALARM INTERRUPT FLAG
     REGISTER D(010D) - READ ONLY (NOT USED)
146818 RAM:  0100  SECONDS
     0101  SECONDS ALARM
     0102  MINUTES
     0103  MINUTES ALARM
     0104  HOURS
     0105  HOURS ALARM
     0106  DAY OF WEEK
     0107  DATE OF MONTH
     0108  MONTH
     0109  YEAR
     010A  REGISTER A
     010B  REGISTER B
     010C  REGISTER C
     010D  REGISTER D
```

```
--------------
(50 BYTES USER RAM - DOSING ERROR DATA (1 BYTE/DOSE))
146818 USER RAM:  010E  DOSE #0  A  +127/-127  X  15 MINUTE
INCREMENTS
       010F     B  +/- 31.75 HOUR RANGE (REALLY ONLY 24)
       0110     C
           $80 = MISSED DOSE
       0111  DOSE #1  A
       0112     B
       0113     C
146818 USER RAM:  0114  DOSE #2  A
       0115     B
       0116     C
       0117  DOSE #3  A
       0118     B
       0119     C
       011A  DOSE #4  A
       011B     B
       011C     C
       011D  DOSE #5  A
       011E     B
       011F     C
       0120  DOSE #6  A
       0121     B
       0122     C
       0123  DOSE #7  A
       0124     B
       0125     C
       0126  DOSE #8  A
       0127     B
       0128     C
       0129  DOSE #9  A
       012A     B
       012B     C
       012C  DOSE #10 A
       012D     B
       012E     C
       012F  DOSE #11 A
       0130     B
       0131     C
       0132  DOSE #12 A
       0133     B
       0134     C
       0135  DOSE #13 A
       0136     B
       0137     C
       0138  DOSE #14 A
       0139     B
       013A     C
       013B  DOSE #15 A
       013C     B
       013D     C
       013E  DOSE #16 A
       013F     B
146805 RAM MAP:  0000  PORT A  PORT A DATA REGISTER
       0001  PORT B  PORT B DATA REGISTER
       0002   EXTERNAL MEMORY SPACE
       0003   EXTERNAL MEMORY SPACE
```

```
        0004  DDRA . PORT A DATA DIRECTION REGISTER
        0005  DDRB   PORT B DATA DIRECTION REGISTER
        0006   EXTERNAL MEMORY SPACE
        0007   EXTERNAL MEMORY SPACE
        0008  TIDATA  TIMER DATA REGISTER
        0009  TCR  TIMER CONTROL REGISTER
            TCR7 - INTERRUPT REQUEST (CLEARED BY RESET)
            TCR6 - INTERRUPT MASK (1=MASKED)
            TCR5 - EXTERNAL CLOCK SOURCE (1=EXTERNAL)
            TCR4 - EXTERNAL TIMER PIN ENABLED (1=ENABLE)
            TCR3 - PRESCALER RESET TO 0 WITH A 1
            TCR2 - TCR0 - DIVIDE BY FACTOR (000= /1)
        (USER RAM) (112 BYTES)
        (69 BYTES LOADED FROM BASE UNIT)
        ( 3 BYTES: DOSES TAKEN DATA)
        ( 3 BYTES: DOSE # OF NEXT DOSE TO BE TAKEN)
        (51 BYTES: DRUG A REGIMEN)
        (    DRUG B REGIMEN)
        (    DRUG C REGIMEN)
        ( 5 BYTES: STARTING DATE AND TIME)
        ( 7 BYTES: MONITOR SERIAL #)
        (27 BYTES: RESERVED VARIABLES)
        (16 BYTES: STACK)
I=50 1  |0  0010  DISP A  # OF A DOSES DISPENSED (0-TODOSX) (42
MAX)
  51    |0  0011  DISP B
  52  reset  |0  0012  DISP C
   @
  53. start  |0  0013  DOSE#A  DOSE # OF NEXT DOSE TO BE TAKEN
(0-TODOSX-1)
  54    |0  0014  DOSE#B         (41 MAX)
  55    |0  0015  DOSE#C
  56 7   8  0016  1HOURA  SCHEDULED DOSING HOUR #1, (0-23)
  57   0  0017  2HOURA  .    #2
  58   0  0018  3HOURA       #3
  59   0  0019  4HOURA       #4
  60 11   12  001A  1HOURB
  61    19  001B  2HOURB
  62   0  001C  3HOURB
  63   0  001D  4HOURB
  64 15  8  001E  1HOURC
  65    11  001F  2HOURC
  66    18  0020  3HOURC
  67 18   23  0021  4HOURC
  68  (45H)  69  0022  MSKEYA  MESSAGES KEY (TABLE OFFSETS)
(0-255)
  69  (48H)  72  0023  MSKEYB
  70  (4BH)  75  0024  MSKEYC
146805 RAM MAP: 0 0025  STARTA  STARTING DAY OFFSET  (0-255)
  72   0  0026  STARTB
  73 24 '0 . 0027  STARTC
  74 25   16  0028  TODOSA  TOTAL # OF A DOSES TO BE DISPENSED
  75   4  0029  TODOSB
  76    16  002A  TODOSC
  77 28  0  002B  MAX/PA  MAX. # OF A DOSES IN DESIGNATED PERIOD
  78   0  002C  MAX/PB
  79  . 0  002D  MAX/PC
  80 31  0  002E  PERODA  DESIGNATED PERIOD FOR MAX. # OF A DOSES
```

```
  81    0  002F  PERODB
  82    0  0030  PERODC
  83 34   0  0031  MININA  MIN. DOSING INTERVAL (1 HOUR INCR.)
(0-23)
  84    0  0032  MININB
  85    0  0033  MININC
  86 37   0  0034  EARLYA  EARLY A DOSING TIME LIMIT (1 HOUR
INCR.)
  87    2  0035  EARLYB   (24 = NO LIMIT)
  88    4  0036  EARLYC
  89 40  1  0037  LATE A  LATE A DOSING TIME LIMIT (1 HOUR INCR.)
  90     24  0038  LATE B   (24 = NO LIMIT)
  91    4  0039  LATE C
  92 43  0  003A  MAKE A  # OF A MAKEUP DOSES ALLOWED (0-126)
  93    0  003B  MAKE B
  94    0  003C  MAKE C
  95 46   |0  003D  ERRORA  ERROR DATA (ONLY PRESENT FOR
CONDITIONS 1 & 3)
  96     |0  003E  ERRORB
  97     |0  003F  ERRORC
  98 49  0  0040  FEATRA  FEATURES SELECTION BYTE
           BIT 7 - ALARM AFTER TARGET HOUR (1)
           BIT 6 - LOCKOUT USED (1)
           BIT 5 - MAKEUP DOSES ALLOWED (1)
           BIT 4 -
           BIT 3 -
           BIT 2 -
           BIT 1 -
           BIT 0 -
  99    0  0041  FEATRB
 100    0  0042  FEATRC
 101 52  0  0043  FIRSTA  FIRST DOSAGE POINTER (0-3)
 102    0  0044  FIRSTB
 103    2  0045  FIRSTC
 104 55  0  0046  FREQ A  DOSING FREQUENCY (# DOSES/DAY) (0-3)
 105    1  0047  FREQ B
 106    3  0048  FREQ C
146805 RAM MAP: 5 0049  LOADMO    MONTH (1-12)
 108 59  2  004A  LOADDY    DAY (1-31)
 109 60  7  004B  LOADHR  LOADING TIME: HOURS (0-23)
 110 61   58  004C  LOADMI    MINUTES (0-59)
 111 62  1  004D  DAYWEK  LOADING DAY OF THE WEEK (1-7)
       --------------------------------------------
 112      004E  UNUSED
 113      004F  UNUSED
 114      0050  UNUSED
 115      0051  UNUSED
 116      0052  UNUSED
 117      0053  UNUSED
 118      0054  UNUSED
146805 RAM MAP:  0055  LENGTH  LCD MESSAGE LENGTH
 120      0056  ADJTAR  ADJUSTED TARGET HOUR
 121      0057  ADJACT  ADJUSTED ACTUAL HOUR
 122      0058  NEXTHR  HOUR OF NEXT DOSE (0-23)
 123      0059  FREQ    DOSING FREQUENCY DURING REGIMEN CHECKS
 124      005A  SPLCHR  SPECIAL CHARACTERS POINTERS
           00000000 = A OR P
           00000001 = 0 - 9
           00000010 = 1 OR BLANK
           00000100 = A,B,C
```

```
125     005B  IMMMSG  IMMEDIATE MESSAGE CODES
         00000000  PRIORITY 4  "EMPTY"
         00010000  PRIORITY 3  "TOMORROW"
         01100000     2  "_XX_XM__"
            (HOUR IS IN NEXT HOUR)
        110000XX    1  "TAKE_X__"
           (C1=A  C2=B  C3=C)
126     005C  CASSTA  DISPENSE/ERROR FLAG & IRQ MESSAGE CODES
127     005D  CASSTB
128     005E  CASSTC
          (80 OR 7F = OK TO DISPENSE )
          00000001  ERROR/"TOMORROW"
          00000010  ERROR/"DO NOT USE YET"
          00000100  ERROR/"EMPTY"
          001 0-23  ERROR/"NOT DUE UNTIL XX XM"
          01111111  DISPENSE/USE DELIVERY MESSAGE
          10000000  DISPENSE/BELL/USE DELIVERY MESSAGE
129     005F  CASSID  CASSETTE IDENTIFIER OFFSET (A=1, B=2, C=3)
     -----------------------------------------------------------
146805 RAM MAP:  0060  MONTH  DATE FROM RTC
131     0061  DAY  "   "  "
132     0062  HOURS  TIME FROM RTC
133     0063  MINUTS   "   "   "
134     0064  SWTEMP  PUSHBUTTON STATUS STORAGE
135     0065  TBL1OF  MESSAGE OFFSET FOR TABLE 1 (1C00)
136     0066  MSGATR  MESSAGE ATTRIBUTE BYTE
          BIT 7 - BLINK (1)
          BIT 6 - 8 CHARACTER MESSAGE (1)
          BIT 5 -
          BIT 4 -
          BIT 3 -
          BIT 2 -
          BIT 1 -
          BIT 0 -
137     0067  GENFLG  GENERAL FLAGS
          BIT 7 - CLEAR LATCHED IRQ (1)
          BIT 6 -
          BIT 5 -
          BIT 4 -
          BIT 3 -
          BIT 2 - DOSE TAKEN FLAG
          BIT 1 - DAY BEFORE FLAG
          BIT 0 - DAY AFTER FLAG
138     0068  ATEMP2  TEMPORARY STORAGE OF A REGISTER
139     0069  FRAME  FRAME COUNTER FOR SCROLL ROUTINE
140     006A  XTEMP  TEMPORARY STORAGE OF X REGISTER
141     006B  TABLOF  MESSAGE OFFSET FOR TABLE 2(1D00)
142     006C  ATEMP  TEMPORARY STORAGE OF REGISTER A
143     006D  MSGOFF  TABLE 1 OFFSET FOR CURRENT BASIC
INSTRUCTION
144     006E  CHAR   CHARACTER BYTE FOR RS-232C ROUTINES
      ATEMP3  TEMPORARY STORAGE OF REGISTER A
145     006F  COUNT  BIT COUNTER FOR RS-232 ROUTINES
        CHARACTER COUNTER FOR LCD DRIVER ROUTINES
     ----
     0070 - 007F  16 BYTE STACK
         ALLOWS 2 INTERRUPTS (5 BYTES EACH)
```

```
        AND  3 SUBROUTINES (2 BYTES EACH)
        SIMULTANEOUSLY
146805 ROM MAP:
  MAIN ROUTINES:
    1800  RESET  UPON MONITOR RESET BY PUSHBUTTON SWITCH OR POWER
UP
    1837  WAIT2  REDISPLAY BASIC INSTRUCTION AND GO ON TO WAIT
    1839  WAIT4  CLEAR UNWANTED EXTERNAL INTERRUPTS
    183C  WAIT3  ALLOW EXT. INTERRUPTS TO BE PROCESSED, GO ON TO
WAIT
    183E  WAIT1  RESET STACK POINTER, THEN GO ON TO WAIT
    183F  WAIT   WAITING FOR INTERRUPTS (POWER SAVING)
    1840  IRQ  PUSHBUTTON SERVICE ROUTINE
    1877  TESTS  TEST MODES
    1900  LODRED
    192C  IDENT  SHORT UNLOAD OF ID#
    193F  LOAD   LOAD REGIMENS & START
    19BE  UNLOAD  UNLOAD DATA TO BASE UNIT
  SUBROUTINES:
    1A00  ERROR  GIVES ERROR ALARM & DISPLAYS ERROR MESSAGE
    1A18  SEND C  SERIAL OUTPUT THRU RS232 PORT
    1A43  REC C   "  INPUT   "   "  "
    1A7C  DELAY1  .250 SEC
    1A8F  DELAY2  1 SEC
    1A96  DELAY3  3 SEC
    1AA0  JOGON  SEC  (MOTOR)
    1AA6  JOGOFF  .10 SEC  (MOTOR)
    1AAC  DELAY4  14 CYCLE  (SEND/REC)
    1AB4  DELAY5  .50 SEC  (BELL UPDATE)
    1AC0  ALLOFF  ALL OUTPUTS OFF
    1ACD  ERCALC  ERROR INCREMENTS CALCULATION
    1AFC  8BIOUT  TRANSFERS A BYTE INTO 7225
146805 ROM MAP:
  SUBROUTINES:
    1B00
    1B1C  CHRLOD  LOADS MESSAGE CHARACTER INTO REGISTER A
    1B40  DISPLA  DISPLAY MESSAGE
    1BAC  SEGCHK  ALL SEGMENTS LIT
    1BDA  STORER  RETRIEVE/STORE DOSING ERROR VALUE
  TABLES & MISCELLANEOUS:
    1C00
    1C09  TABLE1  MESSAGE PARAMETERS
      n  LENGTH
      n+1  ATTRIBUTES
         BIT 7 - BLINK (1)
         BIT 6 - 8 CHARACTER MESSAGE (1)
         BIT 5 -
         BIT 4 -
         BIT 3 -
         BIT 2 -
         BIT 1 - TABLE 2 (1) / TABLE 3 (0)
         BIT 0 -
      n+2  OFFSET (FOR TABLES 2-4)
    1C51  TABLE3  SPECIAL CHARACTERS TABLE
    1C69  TABLE4  DAYS/MONTH DIFFERENCE TABLE  (4 MONTH
DIFFERENCE MAX.)
    1C99  DSPCHK  DISPENSING REQUEST ROUTINE
    1D00  TABLE2  MESSAGES CHARACTERS
```

```
  1E00  MINUTE  TIMER INTERRUPT SERVICE ROUTINE
  1F00   MINUTE CONTINUED
INTERRUPT VECTORS:
  1FF6-1FF7  TIMER INTERRUPT FROM WAIT - 1E00 ('MINUTE')
  1FF8-1FF9  TIMER INTERRUPT     - 1E00 ('MINUTE')
  1FFA-1FFB  EXTERNAL INTERRUPT   - 1840 ('IRQ')
  1FFC-1FFD  SWI       - 183E ('WAIT1')
  1FFE-1FFF  RESET       - 1800 ('RESET')
        -----------MB050987.TXT---------------
MAIN ROUTINE:
--------------
      (POWER UP OR RESET SWITCH)
1000 1800  RESET  A611  LDA   #$11  INITIALIZE 146805E2
1002 1802    B704  STA   DDRA   PORT A DDR SET, PA4 & PA0 OUTPUTS
1004 1804    A6FF  LDA   #$FF
1006 1806    B705  STA   DDRB   PORT B DDR SET, ALL OUTPUTS
1008 1808    CD1AC0 JSR   ALLOFF  ALL OUTPUTS OFF
---------------------------------------------
100B 180B    A60F  LDA   #$0F  'WAITING'
100D 180D  RESET1  B76D  STA   MSGOFF
---------------------------------------------
100F 180F    9D9D      SPARES
1011 1811    9D9D
    1013 1813    1101  BCLR0  PB0   CS OF 7225 GOES LOW
            C/D IS HIGH (COMMAND) ON RESET
1015 1815    A611  LDA   #$11  ENABLE DISPLAY CODE
1017 1817    CD1AFC JSR   8BIOUT
            C/D REMAINS HIGH (COMMAND)
101A 181A    A615  LDA   #$15  ENABLE DECODE CODE
101C 181C    CD1AFC JSR   8BIOUT
101F 181F    5F  CLR   X
1020 1820  RESET2  A6CF  LDA   #$CF  BLINKING RAM SET
1022 1822    CD1AFC JSR   8BIOUT
1025 1825    5C  INC   X
1026 1826    A320  CPX   #32
1028 1828    26F6  BNE   RESET2
102A 182A    1001  BSET0  PB0   7225 DESELECTED
    102C 182C    AE27  LDX   #$27
102E 182E    CD1B40 JSR   DISPLA  'RESET'
1031 1831    CC183E JMP   WAIT1   TO WAIT MODE
----
      [  ]
NOTE: 146818 PROVIDING PROPER F2 (32.768 kHz) TO 146805 FOR 110
BAUD TIMING
---------
1034 1834  WAIT2  BE6D  LDX   MSGOFF
1036 1836    CD1B40 JSR   DISPLA  REDISPLAY BASIC INSTRUCTION
---------------------------------------------
1039 1839  CLRIRQ  1E67  BSET7  GENFLG  CLEAR UNWANTED EXTERNAL
INTERRUPTS
103B 183B    9A
CLI------------------------------------------------------
103C 183C  WAIT3  1F67  BCLR7  GENFLG  ALLOW EXT. INTERRUPTS
103E 183E  WAIT1  9C  RSP     RESET STACK POINTER & GO ON TO WAIT
---------------------------------------------
      (WAIT - POWER DOWN MODE) (EXTERNAL INTERRUPTS ARE ENABLED)
103F 183F  WAIT   8F  WAIT    WAITING FOR TIMER OR IRQ INTERRUPT
      ----
```

```
    (IRQ - PUSHBUTTON SERVICE ROUTINE)
    (I BIT HAS BEEN SET - FURTHER INTERRUPTS HAVE BEEN MASKED)
    (READ SWITCHES STATUS)
1040 1840  IRQ  B600  LDA   PORT A
1042 1842     B764  STA   SWTEMP
-----------------------------------------------
1044 1844     0F6703 BRCLR7 IRQ5  CLEAR UNWANTED INTERRUPTS
1047 1847     CC183C JMP   WAIT3  GO TO WAIT w/IRQ RESET
-----------------------------------------------
104A 184A  IRQ5   9C  RSP
-----------------------------------------------
104B 184B     CD1AC0 JSR   ALLOFF  ANY ACTIVE OUTPUTS TURNED OFF
-----------------------------------------------
    (TEST FOR SIMULTANEOUS PUSHBUTTON ACTIVATIONS)
    (SWITCHES STATUS IS IN REGISTER A)
104E 184E     49  ROL
104F 184F     250E  BCS   IRQ1  C SWITCH ACTIVATED
    (NO SWITCH C)
1051 1851     49  ROL
1052 1852     2411  BCC   IRQ2  NO C OR B SWITCH ACTIVATION
    (B SWITCH ACTIVATED)
1054 1854     49  ROL
1055 1855     240E  BCC   IRQ2  NO C, B ACTIVATED, NO A
1057 1857  IRQ3   AE2A  LDX   #$2A  'ONE BUTTON AT A TIME'
MESSAGE OFFSET
1059 1859     CD1A00 JSR   ERROR   B & A
105C 185C     CC1839 JMP   CLRIRQ  CLEAR INT. & GO WAIT FOR SINGLE
ENTRY
105F 185F  IRQ1   49  ROL
1060 1860     25F5  BCS   IRQ3  C & B
1062 1862     49  ROL
1063 1863     25F2  BCS   IRQ3  C & A

    (ONLY ONE SWITCH PUSHED)
    (CHECK FOR BASE UNIT REQUEST)
1065 1865  IRQ2   020003 BRSET1 BASREQ  CHECK FOR RS232 CARRIER
1068 1868     CC1C99 JMP   DSPCHK  REQUEST TO DISPENSE
    (BASE UNIT REQUEST)
106B 186B  BASREQ  0B6403 BRCLR5 IRQ4  LOAD/UNLOAD REQUEST?
106E 186E     CC1900 JMP   LODRED
1071 1871  IRQ4   0D6403 BRCLR6 TESTS   DEMO REQUEST?
1074 1874     CC183E JMP   DEMO  (TO WAIT FOR NOW)
    (TEST MODE) (PUSHBUTTON C, RIGHT SIDE)
1077 1877  TESTS  9D  NOP     TOO SOON FOR CLI (BOUNCES)
-----------------------------------
1078 1878  TESTS0  AE4E  LDX   #$4E  'TESTMODE' OFFSET
107A 187A     CD1B40 JSR   DISPLA  ACKNOWLEDGE REQUEST ON LCD
-----------------------------------------
107D 187D  TESTS9  A654  LDA   'T'   PUT BASE UNIT IN TEST MODE
107F 187F     CD1A18 JSR   SEND C  ACKNOWLEDGE TESTMODE TO BASE
UNIT
1082 1882     CD1A43 JSR   REC C   LOOKING FOR A BASE UNIT COMMAND
1085 1885     A142  CMP   'B'
1087 1887     260A  BNE   TESTS1
1089 1889     AE09  LDX   #$09  '_BUZZER_' OFFSET
108B 188B     CD1B40 JSR   DISPLA
108E 188E     1C01  BSET6  PORT B  BUZZER ON
1090 1890     CC187D JMP   TESTS9
```

```
   1093 1893  TESTS1  A155  CMP   'U'
1095 1895     260F  BNE   TESTS2
1097 1897     AE0C  LDX   #$0C 'UNLOCKED' OFFSET
1099 1899     CD1B40 JSR   DISPLA
109C 189C     1E01  BSET7  PORT B  SOLENOID ON
109E 189E     CD1A96 JSR   DELAY3  3 SEC
10A1 18A1     1F01  BCLR7  PORT B  SOLENOID OFF
10A3 18A3     CC1878 JMP   TESTS0
-
10A6 18A6  TESTS2  A153  CMP   'S'
10A8 18A8     2606  BNE   TESTS3
10AA 18AA     CD1AC0 JSR   ALLOFF  STOP ALL
10AD 18AD     CC1878 JMP   TESTS0
10B0 18B0  TESTS3  A151  CMP   'Q'   QUIT TESTMODE
10B2 18B2     260A  BNE   TESTS4
10B4 18B4     CD1AC0 JSR   ALLOFF
10B7 18B7     A60F  LDA   #$0F 'WAITING_'
10B9 18B9     B76D  STA   MSGOFF
10BB 18BB     CC1834 JMP   WAIT2
--
10BE 18BE  TESTS4  A144  CMP   'D'   DISPLAY CHECK
10C0 18C0     2609  BNE   TESTS6
10C2 18C2     CD1BAC JSR   SEGCHK  ALL SEGMENTS ON
10C5 18C5     CD1A96 JSR   DELAY3  3 SEC
10C8 18C8     CC1878 JMP   TESTS0
   ---------------------------------------------------
10CB 18CB  TESTS6  A14D  CMP   'M'   MOTOR - ONE REVOLUTION
10CD 18CD     2623  BNE   TESTS11
10CF 18CF     AD13  BSR   MOTOR
10D1 18D1     AD03  BSR   JOG
10D3 18D3     CC1878 JMP   TESTS0
10D6 18D6  JOG  1800  BSET4  PORT A  GEARMOTOR ON
10D8 18D8     CD1AA0 JSR   JOGON
10DB 18DB     1900  BCLR4  PORT A  GEARMOTOR OFF
10DD 18DD     CD1AA6 JSR   JOGOFF  (6)
10E0 18E0     0500F3 BRCLR2 JOG   (5) PA2 - STOP @ FULLY DISPENSED
10E3 18E3     81  RTS
10E4 18E4  MOTOR  1800  BSET4  PA4
10E6 18E6  TESTS7  0400FD BRSET2 TESTS7
10E9 18E9     1900  BCL4  PA4
10EB 18EB     CD1AB4 JSR   DELAY5
10EE 18EE     CD1A7C JSR   DELAY1
   10F2 18F2  TEST11  AE18  LDX   #$18  'WRONG KEY'
10F4 18F4     CD1A00 JSR   ERROR
10F7 18F7     CC1878 JMP   TESTS0
10FA 18FA     39    9   MONITOR SERIAL # (ASCII)
10FB 18FB     38    8
10FC 18FC     37    7
10FD 18FD     36    6
10FE 18FE     35    5
10FF 18FF     34    4
    (LOAD/UNLOAD REQUEST)
    (PUSHBUTTON A, LEFT SIDE)
1100 1900  LODRED  A644  LDA   'D'
1102 1902  LODRD3  CD1A18 JSR   SEND C  ACKNOWLEDGE "DATA"
EXCHANGE REQUEST
1105 1905     CD1A43 JSR   REC C   LOOKING FOR LOAD OR UNLOAD
COMMAND
```

```
1108 1908  LODRD  A149   CMP   'I'
110A 190A    271F   BEQ    IDENT
110C 190C    9D9D   NOP    .
110E 190E    A14C   CMP    'L'
1110 1910    2603   BNE    LODRD2
1112 1912    CC193F JMP    LOAD
1115 1915  LODRD2  A155   CMP    'U'
1117 1917    2603   BNE    LODRD3
1119 1919    CC19BE JMP    UNLOAD
111C 191C  LODRD3  A152   CMP    'R'
111E 191E    2603   BNE    LODRD4
1120 1920    CC183E JMP    WAIT1
1123 1923  LODRD4  AE18   LDX    #$18   "WRONG_KEY"
1125 1925    CD1A00 JSR    ERROR
1128 1928    CC1900 JMP    LODRED
112B 192B  IDENT  AE24   LDX    #$24
112D 192D    CD1B40 JSR    DISPLA  "_IDENT__"
1130 1930    5F   CLR    X
1131 1931  IDENT1  D618FA LDA    18FA,X
1134 1934    CD19CB JSR    COMECO
1137 1937    5C   INC    X
1138 1938    A306   CPX    #6
113A 193A    25F5   BLO    IDENT1
113C 193C    CC1834 JMP    WAIT2
113F 193F  LOAD    AE1E   LDX    #$1E
1141 1941    CD1B40 JSR    DISPLA  "LOADING_" ON LCD
     (REGIMEN DATA LOADED)
1144 1944  LOAD1  5F   CLR    X
1145 1945    A64C   LDA    'L'   ACKNOWLEDGE "LOAD" OPERATION
1147 1947  LOAD11  CD1A18 JSR    SEND C  ECHO FOR GOOD
COMMUNICATION CHECK
114A 194A    CD1A43 JSR    REC C   MUST BE IN REVERSE BIT ORDER
114D 194D    E710   STA    0010,X
114F 194F    5C   INC    X
1150 1950    A344   CPX    #$44  LOAD 69 BYTES
1152 1952    26F3   BNE    LOAD11
1154 1954    CD1A18 JSR    SEND C  ECHO LAST CHARACTER
        (DOSAGE TAKEN ERROR RAM RESET)
1157 1957    5F   CLR    X   LOAD RTC RAM WITH ALL 80s
1158 1958    A680   LDA    #$80    (MISSED DOSAGE CODE)
115A 195A  LOAD2  D7010E STA    010E,X
115D 195D    5C   INC    X
115E 195E    A332   CPX    #$32
1160 1960    26F8   BNE    LOAD2
1162 1962    9D9D9D
1165 1965    9D9D9D
1168 1968    9D9D9D
116B 196B    9D9D9D
116E 196E    9D9D9D
1171 1971    9D9D9D
1174 1974    9D9D9D
     (INITIALIZE RTC REGISTERS)
1177 1977  START2  A6A6   LDA    #$A6  1010 0110
1179 1979    C7010B STA    010B  RTC PUT ON HOLD DURING TIME SET
117C 197C    4F   CLR    A
117D 197D    C70100 STA    0100  SECONDS SET TO 00
1180 1980    A63B   LDA    #59
1182 1982    C70101 STA    0101  SECONDS ALARM SET FOR 59
```

```
1185 1985    A6FF  LDA    #$FF  DONT CARE CODE
1187 1987    C70103 STA    0103  MINUTES ALARM SET
118A 198A    C70105 STA    0105  HOURS ALARM SET
118D 198D    A61A  LDA    #$1A  SET RTC REGISTER A
118F 198F    C7010A STA    010A  1.048576kHz,15.625 mSec PI,64 Hz
SQW
1192 1992    B64C  LDA    LOADMI  READ STARTING MINUTES
1194 1994    C70102 STA    0102  STARTING MINUTES MOVED INTO 0102
1197 1997    B64B  LDA    LOADHR  READ STARTING HOURS
1199 1999    C70104 STA    0104  STARTING HOURS MOVED INTO 0104
119C 199C    B64D  LDA    DAYWEK
119E 199E    C70106 STA    0106  DAY OF WEEK SET
11A1 19A1    B64A  LDA    LOADDY  READ STARTING DAY
11A3 19A3    C70107 STA    0107  SET RTC DAY
11A6 19A6    B649  LDA    LOADMO  READ STARTING MONTH
11A8 19A8    C70108 STA    0108  SET RTC MONTH

       (146805 TIMER SETUP)   (0011 0000)
11AB 19AB  TIMRST  A630  LDA   $30   SET UP TIMER CONTROL
REGISTER
11AD 19AD    B709  STA   TCR    TCR7 - INTERRUPT REQUEST
CLEARED(0)
             TCR6 - INTERRUPT MASK CLEARED (0)
             TCR5 - EXTERNAL CLOCK SOURCE (1)
             TCR4 - EXTERNAL TIMER PIN ENAB. (1)
             TCR3 - PRESCALER NOT RESET TO 0 (0)
             TCR2 - TCR0 DIVIDE BY 1  (000)
    ------------------------------------------------------------
       (LET RTC RUN)
11AF 19AF  RTCRUN  C6010C LDA    010C  READING REGISTER C CLEARS
ALARM FLAG
11B2 19B2    A626  LDA    #$26  SET RTC REGISTER B
11B4 19B4    C7010B STA    010B  RUN, AIE ON, PIE, UIE, SQWE OFF
             BINARY, 24, NO DSE
11B7 19B7  STRTND  A60F  LDA    #$0F  "WAITING_"
11B9 19B9    B76D  STA   MSGOFF  DEFAULT MESSAGE
11BB 19BB    CC1E00 JMP    MINUTE  GO COMPARE REGIMENS TO PRESENT
TIME
11BE 19BE  UNLOAD  AE21  LDX    #$21  "_UNLOAD_"
11C0 19C0    CD1B40 JSR    DISPLA
11C3 19C3    5F   CLR   X
11C4 19C4  UNDATA  D6010E LDA    010E,X  FETCH DOSAGE TAKEN ERROR
DATA
11C7 19C7    AD02  BSR   COMECO
11C9 19C9    2011  BRA   UNDAT1
11CB 19CB  COMECO  CD1A18 JSR    SEND C
11CE 19CE    CD1A43 JSR    REC C
11D1 19D1    B16C  CMP   ATEMP,A
11D3 19D3    2601  BNE   BADCOM
11D5 19D5    81  RTS
11D6 19D6  BADCOM  9C  RSP     CLEAR STACK
11D7 19D7    A67F  LDA   #$7F  BAD COMMUNICATIONS CODE
11D9 19D9    CC1902 JMP    LODRD5  GO FOR RESTART OF UNLOAD
11DC 19DC  UNDAT1  5C  INC    X
11DD 19DD    A332  CPX   #$32  UNLOAD 50 DATA BYTES
11DF 19DF    25E3  BLO   UNDATA
11E1 19E1    5F  CLR   X
11E2 19E2  UNREGM  E610  LDA   0010,X
```

```
11E4 19E4    ADE5  BSR   COMECO
11E6 19E6  UNRGM1  5C  INC   X
11E7 19E7    A33E  CPX   #$3E  UNLOAD 62 REGIMEN BYTES
11E9 19E9    25F7  BLO   UNREGM
11EB 19EB    CC192B JMP   IDENT   EXIT TO `MINUTE' THRU `IDENT'
11EE 19EE    9D  NOP     SPARES
11EF 19EF    9D9D9D NOP
11F2 19F2  SPEC2C  BE5F  LDX   CASSID
11F4 19F4    E642  LDA   FIRSTX  0042,X
11F6 19F6    B76C  STA   ATEMP
11F8 19F8    CD1EDE JSR   DOSEHR
11FB 19FB    BE5F  LDX   CASSID
11FD 19FD    CC1FB5 JMP   DOSEA4  TO CONDITION 2
     (ERROR - BEEP AND ERROR MESSAGE)
     (MESSAGE OFFSET FOR TABLE 1 IS IN X)
1200 1A00  ERROR  1C01  BSET6  PORT B  BUZZER ON
1202 1A02    CD1A8F JSR   DELAY2  1 SEC
1205 1A05    1D01  BCLR6  PORT B  BUZZER OFF
1207 1A07    9D  NOP    TOO EARLY FOR CLEAR INTERRUPT
1208 1A08    CD1B40 JSR   DISPLA  DISPLAY ERROR MESSAGE 2 TIMES
120B 1A0B    CD1B40 JSR   DISPLA  IF SCROLLING
120E 1A0E    9D9D9D NOP
1211  1A11     0D6603  BRCLR6  ERROR1  DELAY  IF  AN  8  CHARACTER
MESSAGE
1214 1A14    CD1A96 JSR   DELAY3  3 SEC
1217 1A17  ERROR1  81  RTS
      ----
      [24]

      (1200  BAUD,  8  DATA  BITS,  NO  PARITY,  1  STOP  BIT,  NO
XON/XOFF)
      (SERIAL OUTPUT CHARACTER MUST BE IN A)
      (USES REG A, REG X, ATEMP, CHAR, COUNT, XTEMP)
      (ALTERS A, RESTORES X, CHARACTER IN ATEMP)
1218  1A18   SEND C   BF6A   STX    XTEMP    (4)  STORE  X  FOR  LATER
RESTORATION
121A 1A1A    B76C  STA   ATEMP   (4)
121C  1A1C     B76E   STA    CHAR   (4)  STORE  CHARACTER  IN  ATEMP  -
ECHO
             CHECK & IN CHAR FOR SENDING
121E 1A1E    A609  LDA   #9  (2) OUTPUT 9 BITS (8 + START)
1220 1A20    B76F  STA   COUNT   (4) BIT COUNTER IN COUNT
1222  1A22    2008   BRA    SENDC3   (3)  BRANCH  TO  OUTPUT  A  0  (START
BIT)
             ----
             (21)
    ----------------------------------------------------------
1224 1A24  SENDC2  366E  ROR   CHAR  (5) MOVE NEXT BIT INTO CARRY
1226  1A26   SENDC1   2404   BCC    SENDC3   (3)  TEST  FOR  SET  OR  CLEAR
BIT
1228 1A28    1000  BSET0  PA0   OUTPUT A 1
122A 1A2A    2004  BRA   SENDC4  BRANCH TO DELAY
122C 1A2C  SENDC3  1100  BCLR0  PA0   (5) OUTPUT A 0
122E 1A2E    2000  BRA   SENDC4  (3) EQUALIZE TIMING
1230  1A30   SENDC4   CD1AAC JSR    DELAY4   (6)  TO  TIMING  DELAY  FOR
1200 BAUD
1233 1A33    3A6F  DEC   COUNT   (5) DECREMENT BIT COUNTER
1235 1A35    26ED  BNE   SENDC2  (3) TEST IF ANOTHER BIT TO SEND
             ----
```

```
        (44) CYCLES BETWEEN BITS
-------------------------------------------------------------
1237 1A37  STOPBT  9D  NOP      (2) 8 CYCLE DELAY
1238 1A38    9D  NOP     (2)
1239 1A39    9D  NOP     (2)
123A 1A3A    9D  NOP     (2)
123B 1A3B    1000  BSET0  PA0   (5) SEND STOP BIT
123D 1A3D    CD1AAC JSR   DELAY4  (6) DELAY FOR THE STOP BIT
-------------------------------------------------------------
1240 1A40    BE6A  LDX   XTEMP   (3) RESTORE X
1242 1A42    81  RTS     (6) RETURN
      [43]       ASSUMES 8 CYCLES TO REENTER
           SEND C
            (129 CYCLES BETWEEN CHARACTERS)
      (1200 BAUD, 8 DATA BITS, NO PARITY, 1 STOP BIT, NO
XON/XOFF)
      (SERIAL INPUT CHARACTER GOES INTO A)
      (ALTERS A, RESTORES X)
1243 1A43  REC C  BF6A  STX   XTEMP   STORE REG X FOR LATER
RESTORATION
1245 1A45    A608  LDA   #8
1247 1A47    B76F  STA   COUNT   NUMBER OF DATA BITS TO READ
1249 1A49  REC C1  0200FD BRSET1 REC C1  TESTS FOR HI TO LO START
BIT
           TRANSITION ON PA1
-------------------------------------------------------------
124C 1A4C  1/2DLY  AE04  LDX   #04   (2) DELAY 1/2 BIT TIME (30
CYCLES)
124E 1A4E  1/2DY  5A  DECX  X   (3) DECREMENT COUNTER
124F 1A4F    26FD  BNE   1/2DY   (3) LOOP
1251 1A51    9D  NOP     (2) TIMING EQUALIZATION
1252 1A52    9D  NOP     (2)   "   "
           ----
           (30)
-------------------------------------------------------------
      (NOW IN MIDDLE OF START BIT)
1253 1A53  FALSE  0200F3 BRSET1 REC C1  (5) FALSE START BIT TEST
1256 1A56    9D  NOP     (2) TIMING EQUALIZATION
1257 1A57    9D  NOP     (2)   "   "
1258 1A58    9D  NOP     (2)   "   "
1259 1A59    9D  NOP     (2)   "   "
125A 1A5A    9D  NOP     (2)   "   "
125B 1A5B    2000  BRA   REC C2  (3)   "   "
           ----
           (18)
-------------------------------------------------------------
      (MAIN RECEIVE ROUTINE)
125D 1A5D  REC C2  CD1AAC JSR   DELAY4  (6) ONE BIT TIMING DELAY
1260 1A60    9D  NOP     (2) 6 CYCLE EQUALIZATION
1261 1A61    9D  NOP     (2)
1262 1A62    9D  NOP     (2)
1263 1A63    030000 BRCLR1 REC C3  (5) TEST INPUT (PA1) AND SET
C-BIT
1266 1A66  REC C3  366E  ROR   CHAR  (5) ASSEMBLE CHARACTER
1268 1A68    3A6F  DEC   COUNT  (5) DECREMENT BIT COUNTER
126A 1A6A    26F1  BNE   REC C2  (3) TEST FOR MORE BITS TO READ
          -----
           (44) CYCLES BETWEEN BITS
```

```
------------------------------------------------------------------------
126C 1A6C      CD1AAC JSR   DELAY4  WAIT OUT THE 9TH (STOP) BIT
------------------------------------------------------------------------
126F 1A6F      B66E  LDA    CHAR  PUT ASSEMBLED BYTE INTO A
1271 1A71      BE6A  LDX    XTEMP   RESTORE X
1273 1A73      81   RTS     RETURN
     ----
     [49]

1274 1A74   SCLDLY  B76C   STA    ATEMP   194 mSec DELAY FOR SCROLL
1276 1A76      BF6A  STX    XTEMP
1278 1A78      A607  LDA    #7
127A 1A7A      2006  BRA    DLY1
    (DELAY1 - .250 SEC (13107 CYCLES)
127C 1A7C   DELAY1  B76C   STA    ATEMP   (4) .250 SEC DELAY
127E 1A7E      BF6A  STX    XTEMP   (4)
1280 1A80      A609  LDA    9   (2)
1282 1A82   DLY1    AEF1  LDX    #241  (2)
1284 1A84   DLY2    5A  DEC    X   (3)
1285 1A85      26FD  BNE    DLY2  (3)
1287 1A87      4A  DEC    A   (3)
1288 1A88      26F8  BNE    DLY1  (3)
128A 1A8A      B66C  LDA    ATEMP   (3)
128C 1A8C      BE6A  LDX    XTEMP   (3)
128E 1A8E      81   RTS     (6)
     ----
     [  ]
    (DELAY2 - 1 SEC. (2*.5(DELAY5)))
128F 1A8F   DELAY2  CD1AB4 JSR   DELAY5
1292 1A92      CD1AB4 JSR   DELAY5
1295 1A95      81   RTS
     ----
     [ 7]

    (DELAY3 - 3 SEC. (3*1 SEC.(DELAY2)))
1296 1A96   DELAY3  CD1A8F JSR   DELAY2
1299 1A99      CD1A8F JSR   DELAY2
129C 1A9C      CD1A8F JSR   DELAY2
129F 1A9F      81   RTS
     ----
     [10]

    (JOGON - MOTOR ON DELAY -   SEC
12A0 1AA0   JOGON   A658  LDA   #   (2)
12A2 1AA2   JOG1    4A  DEC   A   (3)
12A3 1AA3      26FD  BNE   JOG1  (3)
12A5 1AA5      81   RTS     (6)
     ---       ----
     [6]       (  )

    (JOGOFF - MOTOR OFF DELAY -  SEC
12A6 1AA6   JOGOFF  A6FF  LDA   #   (2)
12A8 1AA8   JOG2    4A  DEC   A   (3)
12A9 1AA9      26FD  BNE   JOG2  (3)
12AB 1AAB      81   RTS     (6)
     ---       ----
     [6]       (  )
     14 CYCLE (  mSec) DELAY FOR SEND/RECEIVE SUBROUTINES
```

```
12AC 1AAC  DELAY4  2000  BRA   DLY4  (3)
12AE 1AAE  DLY4    9D  NOP     (2)
12AF 1AAF     2000  BRA   DLY4  (3)
12B1 1AB1     81  RTS
           ----
           [ 6]
12B2 1AB2     9D  NOP      SPARES
12B3 1AB3     9D  NOP

     (DELAY5 - .500 SEC)
12B4 1AB4     CD1A7C JSR   DELAY1
12B7 1AB7     CD1A7C JSR   DELAY1
12BA 1ABA     81  RTS
           ----
           [  ]

12BB 1ABB     9D9D  NOP     SPARES
12BD 1ABD     9D9D9D NOP

     (ALLOFF - TURN OFF ALL OUTPUTS)
12C0 1AC0  ALLOFF  B76C  STA   ATEMP
12C2 1AC2     A607  LDA   #$07
12C4 1AC4     B700  STA   PORT A  PORT A OUTPUTS INACTIVE
12C6 1AC6     A607  LDA   #$07
12C8 1AC8     B701  STA   PORT B  PORT B OUTPUTS INACTIVE
12CA 1ACA     B66C  LDA   ATEMP   RESTORE A
12CC 1ACC     81  RTS

     (ERROR CALCULATION SUBROUTINE)
     (USES ADJACT(0057) AND ADJTAR(0056))
12CD 1ACD  ERCALC  BE5F  LDX   CASSID
12CF 1ACF     B657  LDA   ADJACT
12D1 1AD1     B156  CMP   ADJTAR
12D3 1AD3     2415  BHS   ERCLC1
     (NEGATIVE ERROR - EARLY)
12D5 1AD5     B663  LDA   MINUTES
12D7 1AD7     44  LSR
12D8 1AD8     44  LSR
12D9 1AD9     44  LSR
12DA 1ADA     44  LSR     MINUTES / 16
12DB 1ADB     B76E  STA   ATEMP3  APPROX. 1/4 HOUR INCREMENTS
12DD 1ADD     B656  LDA   ADJTAR
12DF 1ADF     B057  SUB   ADJACT  HOURS DIFFERENCE
12E1 1AE1     48  LSL
12E2 1AE2     48  LSL     *4 = DIFFERENCE IN 1/4 HOUR INCRE.
12E3 1AE3     B06E  SUB   ATEMP3  TOTAL 1/4 HOUR INCREMENTS
12E5 1AE5     AB80  ADD   #$80  1000 0000 TO INDICATE NEGATIVE
12E7 1AE7  ERCLC2  E73C  STA   ERRORX  003C,X
12E9 1AE9     81  RTS
     (POSITIVE ERROR - LATE OR SAME)
12EA 1AEA  ERCLC1  B056  SUB   ADJTAR  HOURS DIFFERENCE
12EC 1AEC     48  LSL
12ED 1AED     48  LSL     *4 = DIFFERENCE IN 1/4 HOUR INCRE.
12EE 1AEE     B76E  STA   ATEMP3
12F0 1AF0     B663  LDA   MINUTES
12F2 1AF2     44  LSR
12F3 1AF3     44  LSR
12F4 1AF4     44  LSR
```

```
12F5 1AF5     44  LSR      MINUTES / 16 = 1/4 HR. INCREMENTS
12F6 1AF6     BB6E  ADD    ATEMP3  TOTAL 1/4 HR. INCREMENTS
12F8 1AF8     20ED  BRA    ERCLC2  EXIT
12FA 1AFA     9D9D      SPARES
    (8BIOUT - TRANSFERS A BYTE INTO 7225)
    (BYTE MUST START IN REGISTER A)
    (MSB LOADED FIRST)
12FC 1AFC    8BIOUT   B76C   STA     ATEMP     STORE A FOR LATER
RESTORATION
12FE 1AFE     BF6A  STX    XTEMP   STORE X FOR LATER RESTORATION
1300 1B00     AE08  LDX    #$08  LOAD COUNTER FOR 8 BIT TRANSFER
1302 1B02    8BIOU1  49  ROL    A    MSB FIRST
1303 1B03     2404  BCC    8BIOU2
1305 1B95     1601  BSET3  PB3   C=1 SET SI
1307 1B07     2002  BRA    8BIOU3
1309 1B09    8BIOU2  1701  BCLR3  PB3   C=0 CLEAR SI
130B 1B0B    8BIOU3  1301  BCLR1  PB1   SCK LOW
130D 1B0D     1201  BSET1  PB1   SCK HIGH
130F, 1B0F    5A  DECX
1310 1B10     26F0  BNE    8BIOU1
1312 1B12     B66C  LDA    ATEMP   RESTORE A
1314 1B14     BE6A  LDX    XTEMP   RESTORE X
1316 1B16     81  RTS
       ----
       [  ]
1317 1B17     9D9D9D     SPARES
131A 1B1A     9D9D

    (CHRLOD - LOAD MESSAGE CHARACTER INTO REGISTER A)
    (CALLED FROM DISPLA)
    (ATTRIBUTE BYTE IS IN MSGATR (0066))
    (TABLES OFFSET IS IN TBLSOF (006B))
    (CHARACTER POINTER IS IN COUNT (006F))
    (FRAME COUNTER IS IN FRAME (0069))
131C 1B1C  CHRLOD  B66F  LDA   COUNT
131E 1B1E     BB69  ADD   FRAME
1320 1B20     0C660D BRSET6 CHRLO1
1323 1B23     A108  CMP   #08
1325 1B25     2506  BLO   CHRLO2
1327 1B27     A008  SUB   #08
1329 1B29     B155  CMP   LENGTH
132B 1B2B     2503  BLO   CHRLO1
132D 1B2D  CHRLO2  A6A0  LDA   #$A0
132F 1B2F     81  RTS
1330 1B30  CHRLO1  BB6B  ADD   TABLOF  RETRIEVE TABLES OFFSET
1332 1B32     97  TAX     X LOADED WITH CORRECTED OFFSET
1333 1B33  TABLE2  D61D00 LDA   1D00,X
1336 1B36  TABLE3  CD1E94 JSR   SPCHAR
1339 1B39     81  RTS

133A 1B3A     9D9D9D NOP     SPARES
133D 1B3D     9D9D9D NOP
       ----
       [27]
    (DISPLA - DISPLAY MESSAGE)
```

```
    (OFFSET FOR TABLE1 IS IN X REGISTER)
    (CALLS CHRLOD, 8BIOUT)
1340 1B40  DISPLA  BF65  STX   TBL1OF  STORE TABLE 1 OFFSET FOR
LATER USE
1342 1B42    D61C02 LDA   1C02,X  RETRIEVE TABLES OFFSET
1345 1B45    B76B  STA   TBLSOF  STORE IN TBLSOF (006B)
1347 1B47    D61C01 LDA   1C01,X  RETRIEVE ATTRIBUTES BYTE
134A 1B4A    B766  STA   MSGATR  STORE IN MSGATR (0066)
134C 1B4C    D61C00 LDA   1C00,X  RETRIEVE MESSAGE LENGTH
134F 1B4F    B755  STA   LENGTH  STORE IN LENGTH (0055)

1351 1B51    1101  BCLR0  PB0   CS OF 7225 GOES LOW
           DATA POINTER GOES TO 0
1353 1B53    1401  BSET2  PB2   SET C/D FOR COMMANDS
1355 1B55    A618  LDA   #$18  DISABLE BLINKING CODE
1357 1B57    CD1AFC JSR   8BIOUT  STOP ANY BLINKING
135A 1B5A    A615  LDA   #$15  ENABLE DECODE CODE
135C 1B5C      CD1AFC JSR    8BIOUT   REESTABLISH DECODING IF
NECESSARY

135F 1B5F    0C6603 BRSET6 DISPL1  TEST FOR 8 CHARACTER MESSAGE
1362 1B62    CC1B90 JMP   SCROLL

    (STANDARD 8 CHARACTER DISPLAY)
1365 1B65  DISPL1  3F69  CLR   FRAME
1367 1B67    CD1B6D JSR   DISPL8
136A 1B6A    CC1B80 JMP   DISPL2

    (FRAME DISPLAY SUBROUTINE)
136D 1B6D  DISPL8  3F6F  CLR   COUNT   CHARACTER COUNT STARTS @ 0
136F 1B6F    1501  BCLR2  PB2   SET C/D FOR DATA
1371 1B71  DSPL8  CD1B1C JSR   CHRLOD  LOAD NEXT CHARACTER INTO
REGISTER A
1374 1B74    CD1AFC JSR   8BIOUT  TRANSFER CHARACTER TO 7225
1377 1B77    3C6F  INC   COUNT
1379 1B79    B66F  LDA   COUNT
137B 1B7B    A108  CMP   #$08  CHECK FOR 8 CHARACTERS SENT
137D 1B7D    26F2  BNE   DSPL8   GO SEND NEXT CHARACTER
137F 1B7F    81  RTS

1380 1B80  DISPL2  0E6603 BRSET7 BLINK8  TEST FOR BLINKING
1383 1B83     CC1BA7 JMP    DSPLND   STD. 8 CHARACTER MESSAGE
COMPLETE

    (BLINKING 8 CHARACTER DISPLAY)
1386 1B86  BLINK8  1401  BSET2  PB2   SET C/D FOR COMMANDS
1388 1B88    A61A  LDA   #$1A  ENABLE SLOW BLINKING CODE
138A 1B8A    CD1AFC JSR   8BIOUT
138D 1B8D    CC1BA7 JMP   DSPLND
    (MESSAGES LONGER THAN 8 CHARACTERS)
1390 1B90  SCROLL  3F69  CLR   FRAME
1392 1B92  SCROL1  ADD9  BSR   DISPL8
1394 1B94    1001  BSET0  PB0   FRAME UPDATE
1396 1B96    CD1A74 JSR   SCLDLY  DELAY 194 mSec
1399 1B99    3C69  INC   FRAME
139B 1B9B    B655  LDA   LENGTH
139D 1B9D    AB09  ADD   #09
139F 1B9F    B169  CMP   FRAME
```

```
13A1 1BA1     2704  BEQ   DSPLND
13A3 1BA3     1101  BCLR0  PB0   READY 7225 FOR NEW DATA
13A5 1BA5     20EB  BRA   SCROL1

13A7 1BA7   DSPLND   1001   BSET0   PB0    7225 DESELECTED, DISPLAY
UPDATED
13A9 1BA9     BE65  LDX    TBL1OF  RESTORE X TO INITIAL VALUE
13AB 1BAB     81  RTS

    (SEGCHK - LIGHTS ALL LCD SEGMENTS)
13AC 1BAC  SEGCHK  1101  BCLR0  PB0    CS OF 7225 GOES LOW
             DATA POINTER GOES TO 0
13AE 1BAE     1401  BSET2  PB2   SET C/D FOR COMMANDS
13B0 1BB0     5F  CLR   X
13B1 1BB1  SEG1   A6DF  LDA   #$DF  ALL DISPLAY RAM BITS SET
13B3 1BB3     CD1AFC JSR   8BIOUT
13B6 1BB6     5C  INC   X
13B7 1BB7     A320  CPX   #$32
13B9 1BB9     26F6  BNE   SEG1
13BB 1BBB     1001  BSET0  PB0   DISPLAY UPDATED
13BD 1BBD     81  RTS
13BE 1BBE     9D9D9D NOP     SPARES
13C1 1BC1     9D9D9D NOP
13C4 1BC4     9D9D9D NOP
13C7 1BC7     9D9D9D NOP
13CA 1BCA     9D9D9D NOP
13CD 1BCD     9D9D9D NOP
13D0 1BD0     9D9D9D NOP
13D3 1BD3     9D9D9D NOP
13D6 1BD6     9D9D9D NOP
13D9 1BD9     9D  NOP

    (RETRIEVE/STORE ERROR - FROM 1CF8)
13DA 1BDA  STORER  BE5F  LDX   CASSID
13DC 1BDC     E63C  LDA   ERRORX  003C,X
13DE 1BDE     B76C  STA   ATEMP
13E0 1BE0     E612  LDA   DOSE#X  0012,X
13E2 1BE2     EB12  ADD   DOSE#X  0012,X
13E4 1BE4     EB12  ADD   DOSE#X
13E6 1BE6     BB5F  ADD   CASSID  (3*DOSE#) + ID
13E8 1BE8     6C12  INC   DOSE#X  (UPDATE DOSE# TO NEXT DOSAGE)
13EA 1BEA     97  TAX
13EB 1BEB     B66C  LDA   ATEMP
13ED 1BED     D7010D STA   010D,X
13F0 1BF0     CC1E00 JMP   MINUTE  EXIT
13F3 1BF3     9D9D9D NOP     SPARE BYTES
13F6 1BF6     9D9D9D NOP
13F9 1BF9     9D9D9D NOP
13FC 1BFC     9D9D9D NOP
13FF 1BFF     9D  NOP

    (TABLE1 - MESSAGE PARAMETERS)
1400 1C00     08      00  "WRONG_KE"
1401 1C01     42
1402 1C02     51
1403 1C03         03
1404 1C04
1405 1C05
```

```
1406 1C06          06
1407 1C07
1408 1C08
1409 1C09    08      09  "_BUZZER_"
140A 1C0A    42
140B 1C0B    29
140C 1C0C    08      0C  "UNLOCKED"
140D 1C0D    42
140E 1C0E    31
140F 1C0F    08      0F  "WAITING_"
1410 1C10    42
1411 1C11    39
1412 1C12    08      12  "RELEASE_"
1413 1C13    42
1414 1C14    41
1415 1C15    08      15  "__NOON__"
1416 1C16    42
1417 1C17    49
1418 1C18    09      18  "WRONG KEY"
1419 1C19    02
141A 1C1A    51
141B 1C1B    08      1B  "MIDNIGHT"
141C 1C1C    42
141D 1C1D    5A
141E 1C1E    08      1E  "LOADING_"
141F 1C1F    42
1420 1C20    62
1421 1C21    08      21  "_UNLOAD_"
1422 1C22    42
1423 1C23    6A
1424 1C24    08      24  "_IDENT__"
1425 1C25    42
1426 1C26    72
1427 1C27    08      27  "_RESET__"
1428 1C28    C2      BLINKING
1429 1C29    00 ____
142A 1C2A    19      2A  "PUSH ONE BUTTON AT A TIME"
142B 1C2B    02
142C 1C2C    08
142D 1C2D    08      2D  "_MINUTE_"
142E 1C2E    42
142F 1C2F    7A
1430 1C30    08      30  "TOMORROW"
1431 1C31    42
1432 1C32    82
1433 1C33    08      33  "TAKE_X__"
1434 1C34    42
1435 1C35    8A
1436 1C36    08      36  "_XX_XM__"
1437 1C37    42
1438 1C38    92
1439 1C39    13      39  "NOT_DUE_UNTIL_XX_XM"
143A 1C3A    02
143B 1C3B    9A
143C 1C3C    10      3C  "WAIT_UNTIL_XX_XM"
143D 1C3D    02
143E 1C3E    AD
143F 1C3F    0E      3F  "DO_NOT_USE_YET"
```

```
1440 1C40    02
1441 1C41    BD
1442 1C42    08       42  "_EMPTY__"
1443 1C43    42
1444 1C44    CB
1445 1C45    0E       45  "TAKE_WITH_FOOD"
1446 1C46    02
1447 1C47    D3
1448 1C48    11       48  "TAKE_BEFORE_MEALS"
1449 1C49    02
144A 1C4A    E1
144B 1C4B    0E       4B  "TAKE_WITH_MILK"
144C 1C4C    02
144D 1C4D    F2
144E 1C4E    08       4E  "TESTMODE"
144F 1C4F    42
1450 1C50    21
     (TABLE3 - SPECIAL CHARACTERS TABLE)
       BIT 7,6 - NOT USED
       BIT  5 - 1=P 0=A
       BIT  4 - 1=1 0=BLANK
       BITS0-3 - 0-9
1451 1C51    00       0   0 AM (MIDNIGHT)  (NOT USED)
1452 1C52    01       1   1 AM
1453 1C53    02       2   2 AM
1454 1C54    03       3   3 AM
1455 1C55    04       4   4 AM
1456 1C56    05       5   5 AM
1457 1C57    06       6   6 AM
1458 1C58    07       7   7 AM
1459 1C59    08       8   8 AM
145A 1C5A    09       9   9 AM
145B 1C5B    10       10    10 AM
145C 1C5C    11       11    11 AM
145D 1C5D    32       12   12 PM (NOON)  (NOT USED)
145E 1C5E    21       13  1 PM
145F 1C5F    22       14  2 PM
1460 1C60    23       15  3 PM
1461 1C61    24       16  4 PM
1462 1C62    25       17  5 PM
1463 1C63    26       18  6 PM
1464 1C64    27       19  7 PM
1465 1C65    28       20  8 PM
1466 1C66    29       21  9 PM
1467 1C67    30       22   10 PM
1468 1C68    31       23   11 PM

     (TABLE4 - DAYS/MONTH DIFFERENCE TABLE)
1469 1C69   TABLE4  1F  31  1/2
146A 1C6A     3B  59  1/3
146B 1C6B     5A  90  1/4
146C 1C6C     78   120  1/5
146D 1C6D     1C  28  2/3
146E 1C6E     3B  59  2/4
146F 1C6F     59  89  2/5
1470 1C70     78   120  2/6
1471 1C71     1F  31  3/4
1472 1C72     3D  61  3/5
```

```
1473 1C73     5C  92  3/6
1474 1C74     7A   122  3/7
1475 1C75     1E  30  4/5
1476 1C76     3D  61  4/6
1477 1C77     5B  91  4/7
1478 1C78     7A   122  4/8
1479 1C79     1F  31  5/6
147A 1C7A     3D  61  5/7
147B 1C7B     5C  92  5/8
147C 1C7C     7B   123  5/9
147D 1C7D     1E  30  6/7
147E 1C7E     3D  61  6/8
147F 1C7F     5C  92  6/9
1480 1C80     7A   122  6/10
1481 1C81     1F  31  7/8
1482 1C82     3E  62  7/9
1483 1C83     5C  92  7/10
1484 1C84     7B   123  7/11
1485 1C85     1F  31  8/9
1486 1C86     3D  61  8/10
1487 1C87     5C  92  8/11
1488 1C88     7A   122  8/12
1489 1C89     1E  30  9/10
148A 1C8A     3D  61  9/11
148B 1C8B     5B  91  9/12
148C 1C8C     7A   122  9/1
148D 1C8D     1F  31  10/11
148E 1C8E     3D  61  10/12
148F 1C8F     5C  92  10/1
1490 1C90     7B   123  10/2
1491 1C91     1E  30  11/12
1492 1C92     3D  61  11/1
1493 1C93     5C  92  11/2
1494 1C94     78   120  11/3
1495 1C95     1F  31  12/1
1496 1C96     3E  62  12/2
1497 1C97     5A  90  12/3
1498 1C98     79   121  12/4
-----------------------------------------------------------------
---------------
    (DISPENSE CHECK)
1499 1C99  DSPCHK  B664  LDA   SWTEMP
    (SWITCH IDENTIFICATION)
149B, 1C9B    49  ROL   A
149C 1C9C     49  ROL   A
149D 1C9D     49  ROL   A
149E 1C9E     49  ROL   A   BITS 7,6,5 MOVED TO 2,1,0
149F 1C9F     A407  AND   #07
14A1 1CA1     A102  CMP   #2
14A3 1CA3     2301  BLS   DSPCK1
14A5 1CA5     4A  DEC   A   4--3
14A6 1CA6  DSPCK1  B75F  STA   CASSID
14A8 1CA8     97  TAX     (3=C, 2=B, 1=A)
    (OK TO DISPENSE CHECK)
14A9 1CA9     E65B  LDA   CASSTX  005B,X
14AB 1CAB     B76C  STA   ATEMP
14AD 1CAD     A17F  CMP   #$7F
14AF 1CAF     2421  BHS   DSPENS
```

```
    (ERROR - NOT PROPER TO DISPENSE)
14B1 1CB1     5F   CLR    X     "WRONG_KE" IF X NOT SET LATER
14B2 1CB2     0A6C11 BRSET5 ERR1  ATEMP BIT5
14B5 1CB5     056C02 BRCLR2 ERR2  ATEMP BIT2
14B8 1CB8     AE42   LDX    #$42  "EMPTY"
14BA 1CBA ERR2   036C02 BRCLR1 ERR3  ATEMP BIT1
14BD 1CBD     AE3F   LDX    #$3F  "DO NOT USE YET"
14BF 1CBF ERR3   016C02 BRCLR0 ERR4  ATEMP BIT0
14C2 1CC2     AE30   LDX    #$30  "TOMORROW"
14C4 1CC4 ERR4   2006   BRA   ALERT
14C6 1CC6 ERR1   AE39   LDX    #$39  "NOT DUE UNTIL ____"
14C8 1CC8     A020   SUB    #$20
14CA 1CCA     B758   STA    NEXTHR
14CC 1CCC ALERT  CD1A00 JSR    ERROR    RING BELL & DISPLAY ERROR
MESSAGE
14CF 1CCF     CC1E00 JMP    MINUTE   REDETERMINE PRESENT SITUATION
      (OK TO DISPENSE)
    (GEARMOTOR SEQUENCE)
14D2 1CD2 DSPENS CD18E4 JSR    MOTOR
14D5 1CD5 DSPNS4 B600   LDA    PORT A
14D7 1CD7     A4E0   AND    #$E0
14D9 1CD9     2604   BNE    DSPNS2
14DB 1CDB     1D01   BCLR6  PORT B  BUZZER OFF IF ON
14DD 1CDD     2009   BRA    DSPNS5  EXIT
    (BUTTON STILL PUSHED)
14DF 1CDF DSPNS2 AE12   LDX    #$12   "RELEASE"
14E1 1CE1     CD1B40 JSR    DISPLA
14E4 1CE4     1C01   BSET6  PORT B  BUZZER ON
14E6 1CE6     20EC   BRA    DSPNS4  LOOP
14E8 1CE8 DSPNS5  CD18D6 JSR    JOG     LAST HALF OF GEARMOTOR
SEQUENCE

    (DISPLAY DISPENSING MESSAGE - TWICE)
14EB 1CEB     BE5F   LDX    CASSID
14ED 1CED     EE21   LDX    MSKEYX  0021,X
14EF 1CEF     CD1B40 JSR    DISPLA
14F2 1CF2     CD1B40 JSR    DISPLA
14F5 1CF5     CC1BDA JMP    STORER  FINISH BY STORING DOSING ERROR
14F8 1CF8     9D9D9D NOP
14FB 1CFB     9D9D9D NOP
14FE 1CFE     9D9D   NOP

    (TABLE2 - MESSAGES CHARACTERS)
1500 1D00 TABLE2 A0    BLANK   TBLSOF = 0  "_RESET__"
1501 1D01     D2    R
1502 1D02     C5    E
1503 1D03     D3    S
1504 1D04     C5    E
1505 1D05     D4    T
1506 1D06     A0    BLANK
1507 1D07     A0    BLANK
1508 1D08     D0    P
1509 1D09     D5    U
150A 1D0A     D3    S
150B 1D0B     C8    H
150C 1D0C     A0    BLANK
150D 1D0D     CF    O
150E 1D0E     CE    N
```

| | | | |
|---|---|---|---|
| 150F | 1D0F | C5 | E |
| 1510 | 1D10 | A0 | BLANK |
| 1511 | 1D11 | C2 | B |
| 1512 | 1D12 | D5 | U |
| 1513 | 1D13 | D4 | T |
| 1514 | 1D14 | D4 | T |
| 1515 | 1D15 | CF | O |
| 1516 | 1D16 | CE | N |
| 1517 | 1D17 | A0 | BLANK |
| 1518 | 1D18 | C1 | A |
| 1519 | 1D19 | D4 | T |
| 151A | 1D1A | A0 | BLANK |
| 151B | 1D1B | C1 | A |
| 151C | 1D1C | A0 | BLANK |
| 151D | 1D1D | D4 | T |
| 151E | 1D1E | C9 | I |
| 151F | 1D1F | CD | M |
| 1520 | 1D20 | C5 | E |
| 1521 | 1D21 | D4 | T |
| 1522 | 1D22 | C5 | E |
| 1523 | 1D23 | D3 | S |
| 1524 | 1D24 | D4 | T |
| 1525 | 1D25 | CD | M |
| 1526 | 1D26 | CF | O |
| 1527 | 1D27 | C4 | D |
| 1528 | 1D28 | C5 | E |
| 1529 | 1D29 | A0 | BLANK |
| 152A | 1D2A | C2 | B |
| 152B | 1D2B | D5 | U |
| 152C | 1D2C | DA | Z |
| 152D | 1D2D | DA | Z |
| 152E | 1D2E | C5 | E |
| 152F | 1D2F | D2 | R |
| 1530 | 1D30 | A0 | BLANK |
| 1531 | 1D31 | D5 | U |
| 1532 | 1D32 | CE | N |
| 1533 | 1D33 | CC | L |
| 1534 | 1D34 | CF | O |
| 1535 | 1D35 | C3 | C |
| 1536 | 1D36 | CB | K |
| 1537 | 1D37 | C5 | E |
| 1538 | 1D38 | C4 | D |
| 1539 | 1D39 | D7 | W |
| 153A | 1D3A | C1 | A |
| 153B | 1D3B | C9 | I |
| 153C | 1D3C | D4 | T |
| 153D | 1D3D | C9 | I |
| 153E | 1D3E | CE | N |
| 153F | 1D3F | C7 | G |
| 1540 | 1D40 | A0 | BLANK |
| 1541 | 1D41 | D2 | R |
| 1542 | 1D42 | C5 | E |
| 1543 | 1D43 | CC | L |
| 1544 | 1D44 | C5 | E |
| 1545 | 1D45 | C1 | A |
| 1546 | 1D46 | D3 | S |
| 1547 | 1D47 | C5 | E |
| 1548 | 1D48 | A0 | BLANK |

| | | | |
|---|---|---|---|
| 1549 | 1D49 | A0 | BLANK |
| 154A | 1D4A | A0 | BLANK |
| 154B | 1D4B | CE | N |
| 154C | 1D4C | CF | O |
| 154D | 1D4D | CF | O |
| 154E | 1D4E | CE | N |
| 154F | 1D4F | A0 | BLANK |
| 1550 | 1D50 | A0 | BLANK |
| 1551 | 1D51 | D7 | W |
| 1552 | 1D52 | D2 | R |
| 1553 | 1D53 | CF | O |
| 1554 | 1D54 | CE | N |
| 1555 | 1D55 | C7 | G |
| 1556 | 1D56 | A0 | BLANK |
| 1557 | 1D57 | CB | K |
| 1558 | 1D58 | C5 | E |
| 1559 | 1D59 | D9 | Y |
| 155A | 1D5A | CD | M |
| 155B | 1D5B | C9 | I |
| 155C | 1D5C | C4 | D |
| 155D | 1D5D | CE | N |
| 155E | 1D5E | C9 | I |
| 155F | 1D5F | C7 | G |
| 1560 | 1D60 | C8 | H |
| 1561 | 1D61 | D4 | T |
| 1562 | 1D62 | CC | L |
| 1563 | 1D63 | CF | O |
| 1564 | 1D64 | C1 | A |
| 1565 | 1D65 | C4 | D |
| 1566 | 1D66 | C9 | I |
| 1567 | 1D67 | CE | N |
| 1568 | 1D68 | C7 | G |
| 1569 | 1D69 | A0 | BLANK |
| 156A | 1D6A | A0 | BLANK |
| 156B | 1D6B | D5 | U |
| 156C | 1D6C | CE | N |
| 156D | 1D6D | CC | L |
| 156E | 1D6E | CF | O |
| 156F | 1D6F | C1 | A |
| 1570 | 1D70 | C4 | D |
| 1571 | 1D71 | A0 | BLANK |
| 1572 | 1D72 | A0 | BLANK |
| 1573 | 1D73 | C9 | I |
| 1574 | 1D74 | C4 | D |
| 1575 | 1D75 | C5 | E |
| 1576 | 1D76 | CE | N |
| 1577 | 1D77 | D4 | T |
| 1578 | 1D78 | A0 | BLANK |
| 1579 | 1D79 | A0 | BLANK |
| 157A | 1D7A | A0 | BLANK |
| 157B | 1D7B | CD | M |
| 157C | 1D7C | C9 | I |
| 157D | 1D7D | CE | N |
| 157E | 1D7E | D5 | U |
| 157F | 1D7F | D4 | T |
| 1580 | 1D80 | C5 | E |
| 1581 | 1D81 | A0 | BLANK |
| 1582 | 1D82 | D4 | T |

| | | | | |
|---|---|---|---|---|
| 1583 | 1D83 | CF | O | |
| 1584 | 1D84 | CD | M | |
| 1585 | 1D85 | CF | O | |
| 1586 | 1D86 | D2 | R | |
| 1587 | 1D87 | D2 | R | |
| 1588 | 1D88 | CF | O | |
| 1589 | 1D89 | D7 | W | |
| 158A | 1D8A | D4 | T | |
| 158B | 1D8B | C1 | A | |
| 158C | 1D8C | CB | K | |
| 158D | 1D8D | C5 | E | |
| 158E | 1D8E | A0 | BLANK | |
| 158F | 1D8F | 04 | SPECIAL 1 | 04-- C1(A), C2(B), C3(C) |
| 1590 | 1D90 | A0 | BLANK | |
| 1591 | 1D91 | A0 | BLANK | |
| 1592 | 1D92 | A0 | BLANK | |
| 1593 | 1D93 | 02 | SPECIAL 2 | 02-- A0(BLANK), B1(1) |
| 1594 | 1D94 | 01 | SPECIAL 3 | 01-- B0-B9(0-9) |
| 1595 | 1D95 | A0 | BLANK | |
| 1596 | 1D96 | 00 | SPECIAL 4 | 00-- C1(A), D0(P) |
| 1597 | 1D97 | CD | M | |
| 1598 | 1D98 | A0 | BLANK | |
| 1599 | 1D99 | A0 | BLANK | |
| 159A | 1D9A | CE | N | |
| 159B | 1D9B | CF | O | |
| 159C | 1D9C | D4 | T | |
| 159D | 1D9D | A0 | BLANK | |
| 159E | 1D9E | C4 | D | |
| 159F | 1D9F | D5 | U | |
| 15A0 | 1DA0 | C5 | E | |
| 15A1 | 1DA1 | A0 | BLANK | |
| 15A2 | 1DA2 | D5 | U | |
| 15A3 | 1DA3 | CE | N | |
| 15A4 | 1DA4 | D4 | T | |
| 15A5 | 1DA5 | C9 | I | |
| 15A6 | 1DA6 | CC | L | |
| 15A7 | 1DA7 | A0 | BLANK | |
| 15A8 | 1DA8 | 02 | SPECIAL 2 | |
| 15A9 | 1DA9 | 01 | SPECIAL 3 | |
| 15AA | 1DAA | A0 | BLANK | |
| 15AB | 1DAB | 00 | SPECIAL 4 | |
| 15AC | 1DAC | CD | M | |
| 15AD | 1DAD | D7 | W | |
| 15AE | 1DAE | C1 | A | |
| 15AF | 1DAF | C9 | I | |
| 15B0 | 1DB0 | D4 | T | |
| 15B1 | 1DB1 | A0 | BLANK | |
| 15B2 | 1DB2 | D5 | U | |
| 15B3 | 1DB3 | CE | N | |
| 15B4 | 1DB4 | D4 | T | |
| 15B5 | 1DB5 | C9 | I | |
| 15B6 | 1DB6 | CC | L | |
| 15B7 | 1DB7 | A0 | BLANK | |
| 15B8 | 1DB8 | 02 | SPECIAL 2 | |
| 15B9 | 1DB9 | 01 | SPECIAL 3 | |
| 15BA | 1DBA | A0 | BLANK | |

| | | | |
|---|---|---|---|
| 15BB | 1DBB | 00 | SPECIAL 4 |
| 15BC | 1DBC | CD | M |
| 15BD | 1DBD | C4 | D |
| 15BE | 1DBE | CF | O |
| 15BF | 1DBF | A0 | BLANK |
| 15C0 | 1DC0 | CE | N |
| 15C1 | 1DC1 | CF | O |
| 15C2 | 1DC2 | D4 | T |
| 15C3 | 1DC3 | A0 | BLANK |
| 15C4 | 1DC4 | D5 | U |
| 15C5 | 1DC5 | D3 | S |
| 15C6 | 1DC6 | C5 | E |
| 15C7 | 1DC7 | A0 | BLANK |
| 15C8 | 1DC8 | D9 | Y |
| 15C9 | 1DC9 | C5 | E |
| 15CA | 1DCA | D4 | T |
| 15CB | 1DCB | A0 | BLANK |
| 15CC | 1DCC | C5 | E |
| 15CD | 1DCD | CD | M |
| 15CE | 1DCE | D0 | P |
| 15CF | 1DCF | D4 | T |
| 15D0 | 1DD0 | D9 | Y |
| 15D1 | 1DD1 | A0 | BLANK |
| 15D2 | 1DD2 | A0 | BLANK |
| 15D3 | 1DD3 | D4 | T |
| 15D4 | 1DD4 | C1 | A |
| 15D5 | 1DD5 | CB | K |
| 15D6 | 1DD6 | C5 | E |
| 15D7 | 1DD7 | A0 | BLANK |
| 15D8 | 1DD8 | D7 | W |
| 15D9 | 1DD9 | C9 | I |
| 15DA | 1DDA | D4 | T |
| 15DB | 1DDB | C8 | H |
| 15DC | 1DDC | A0 | BLANK |
| 15DD | 1DDD | C6 | *F |
| 15DE | 1DDE | CF | O |
| 15DF | 1DDF | CF | O |
| 15E0 | 1DE0 | C4 | D |
| 15E1 | 1DE1 | D4 | T |
| 15E2 | 1DE2 | C1 | A |
| 15E3 | 1DE3 | CB | K |
| 15E4 | 1DE4 | C5 | E |
| 15E5 | 1DE5 | A0 | BLANK |
| 15E6 | 1DE6 | C2 | B |
| 15E7 | 1DE7 | C5 | E |
| 15E8 | 1DE8 | C6 | F |
| 15E9 | 1DE9 | CF | O |
| 15EA | 1DEA | D2 | R |
| 15EB | 1DEB | C5 | *E |
| 15EC | 1DEC | A0 | BLANK |
| 15ED | 1DED | CD | M |
| 15EE | 1DEE | C5 | E |
| 15EF | 1DEF | C1 | A |
| 15F0 | 1DF0 | CC | L |
| 15F1 | 1DF1 | D3 | S |
| 15F2 | 1DF2 | D4 | T |
| 15F3 | 1DF3 | C1 | A |
| 15F4 | 1DF4 | CB | K |

```
15F5 1DF5    C5     E
15F6 1DF6    A0     BLANK
15F7 1DF7    D7     W
15F8 1DF8    C9     I
15F9 1DF9    D4     T
15FA 1DFA    C8     H
15FB 1DFB    A0     BLANK
15FC 1DFC    CD     *M
15FD 1DFD    C9     I
15FE 1DFE    CC     L
15FF 1DFF    CB     K
     (MINUTE - TIMER SERVICE ROUTINE)
1600 1E00  MINUTE  9C   RSP      DONT USE UP STACK
1601 1E01    AE2D  LDX     #$2D
1603 1E03    CD1B40 JSR    DISPLA   "_MINUTE_"

     (READ CURRENT TIME AND DATE FROM RTC)
1606 1E06  RTCRED  C6010C LDA    010C     READING REG C CLEARS PF
BIT
1609 1E09  RTCRD1  C6010C LDA    010C  (4) LOAD REG C FOR TESTING
160C 1E0C    A440  AND    #$40   (2) (2) BIT 6 (PF) HIGH?
160E 1E0E    27F9  BEQ    RTCRD1   (3) (3) LOOP IF PF NOT SET
1610 1E10    C60102 LDA   0102   (4) READ CURRENT MINUTES
1613 1E13    B763  STA    MINUTS   (4) STORE MINUTES IN RAM (0063)
1615 1E15    C60104 LDA   0104   (4) READ CURRENT HOURS
1618 1E18    B762  STA    HOURS    (4) STORE HOURS IN RAM (0062)
161A 1E1A    C60107 LDA   0107   (4) READ CURRENT DAY OF MONTH
161D 1E1D    B761  STA    DAY    (4) STORE DAY IN RAM (0061)
161F 1E1F    C60108 LDA   0108   (4) READ CURRENT MONTH
1622 1E22    B760  STA    MONTH    STORE MONTH IN RAM (0060)
                                  ____
              (42) CYCLES = 6.4 mSec.
                7.5 mSec. (1/2 PI) AVAILABLE

     (RESET REGISTERS)
1624 1E24    9D9D  NOP
1626 1E26    3F5C  CLR    CASSTC   CLEAR OK TO DISPENSE FLAGS
1628 1E28    3F5D  CLR    CASSTB
162A 1E2A    3F5E  CLR    CASSTA
162C 1E2C    A6FF  LDA    #$FF
162E 1E2E    B758  STA    NEXTHR   RESET NEXT DOSING HOUR REGISTER
1630 1E30    3F5B  CLR    IMMMSG   CLEAR IMMEDIATE MESSAGE POINTER

     (SET FLAGS AND MESSAGE POINTERS)
1632 1E32    AE03  LDX    #$03   CHECK REGIMEN FOR CASSETTE C
1634 1E34    CD1EC5 JSR   RGMCHK   SET FLAGS AND MESSAGE POINTERS
1637 1E37    AE02  LDX    #$02   CHECK REGIMEN FOR CASSETTE B
1639 1E39    CD1EC5 JSR   RGMCHK
163C 1E3C    AE01  LDX    #$01   CHECK REGIMEN FOR CASSETTE A
163E 1E3E    CD1EC5 JSR   RGMCHK

     (BELL UPDATE)
1641 1E41    0E5C08 BRSET7 BELL   CASSETTE A
1644 1E44    0E5D05 BRSET7 BELL   CASSETTE B
1647 1E47    0E5E02 BRSET7 BELL   CASSETTE C
164A 1E4A    2011  BRA    IMMESG
164C 1E4C  BELL   1C01  BSET6  PORT B  BUZZER ON
164E 1E4E    CD1A8F JSR   DELAY2  DELAY 1 SEC
```

```
1651 1E51     1D01  BCLR6   PORT B   BUZZER OFF
1653 1E53     CD1AB4 JSR    DELAY5   DELAY 1/2 SEC
1656 1E56     1C01  BSET6   PORT B   BUZZER ON
1658 1E58     CD1A8F JSR    DELAY2   DELAY 1 SEC
165B 1E5B     1D01  BCLR6   PORT B   BUZZER OFF
    (IMMEDIATE DISPLAY UPDATE)
165D 1E5D  IMMESG   3D5B  TST    IMMMSG
165F 1E5F     2604  BNE    IMMSG1
1661 1E61     AE42  LDX    #$42  "EMPTY"
1663 1E63     201E  BRA    IMMSG2
1665 1E65  IMMSG1   095B04 BRCLR4 IMMSG5  IMMMSG BIT4
1668 1E68     AE30  LDX    #$30  "TOMORROW"
166A 1E6A     2017  BRA    IMMSG2
166C 1E6C  IMMSG5   0F5B04 BRCLR7 IMMSG3  IMMMSG BIT7
166F 1E6F     AE33  LDX    #$33  "TAKE _X__"
1671 1E71     2010  BRA    IMMSG2
1673 1E73  IMMSG3   AE36  LDX    #$36  "_XX_XM__"
1675 1E75     B658  LDA    NEXTHR
1677 1E77     A100  CMP    #0
1679 1E79     2602  BNE    IMMSG4
167B 1E7B     AE1B  LDX    #$1B  "MIDNIGHT"
167D 1E7D  IMMSG4   A10C  CMP    #12
167F 1E7F     2602  BNE    IMMSG2
1681 1E81     AE15  LDX    #$15  "__NOON__"
1683 1E83  IMMSG2   CD1B40 JSR    DISPLA

    (EXIT)
1686 1E86      C6010C LDA    010C   READ RTC REG C TO CLEAR ALARM
FLAG
1689 1E89     A601  LDA    #$01
168B 1E8B     B708  STA    TIDATA  LOAD TIMER WITH ONE COUNT
168D 1E8D     1F09  BCLR7   TCR7  CLEAR TIMER INTERRUPT REQUEST
168F 1E8F     1D09  BCLR6   TCR6  ALLOW TIMER INTERRUPTS
1691 1E91     CC1839 JMP    CLRIRQ  CLEAR ANY PENDING INTERRUPTS

    (SPECIAL CHARACTERS SUBROUTINE)
    (SUBSTITUTES SPECIAL CHARACTERS FOR SPECIAL CHARACTER FLAGS)
1694 1E94  SPCHAR  A1A0   CMP   #$A0  A0-DF FOR REGULAR CHARACTERS
1696 1E96     2501  BLO    SPCHR0  04 = A,B,C
1698 1E98     81  RTS     02 = BLANK OR 1
1699 1E99  SPCHR0  B75A   STA   SPLCHR  01 = 0-9
             00 = A OR P
169B 1E9B     055A03 BRCLR2 SPCHR1  TEST SPLCHR BIT2
169E 1E9E     B65B  LDA    IMMMSG  A,B, OR C
16A0 1EA0     81  RTS
16A1 1EA1  SPCHR1  BE58   LDX   NEXTHR
16A3 1EA3     D61C51 LDA    1C51,X  GET SPECIAL CHARACTER CODE
16A6 1EA6     B768  STA    ATEMP2
16A8 1EA8     035A09 BRCLR1 SPCHR2  TEST SPLCHR BIT1
16AB 1EAB     096803 BRCLR4 SPCHR3  TEST ATEMP2 BIT4
16AE 1EAE     A6B1  LDA    #$B1  "1"
16B0 1EB0     81  RTS
16B1 1EB1  SPCHR3  A6A0   LDA   #$A0  BLANK
16B3 1EB3     81  RTS
16B4 1EB4  SPCHR2  015A05 BRCLR0 SPCHR4  TEST SPLCHR BIT0
16B7 1EB7     A40F  AND    #$0F  0/0-9
16B9 1EB9     ABB0  ADD    #$B0  B0-B9
16BB 1EBB     81  RTS
```

```
16BC 1EBC  SPCHR4  0B6803 BRCLR5 SPCHR5  TEST ATEMP2 BIT5
16BF 1EBF    A6D0  LDA   #$D0  "p"
16C1 1EC1    81  RTS
16C2 1EC2  SPCHR5  A6C1  LDA   #$C1  A
16C4 1EC4    81  RTS
     (REGIMEN CHECK SUBROUTINE)
     (CASSETTE CODE MUST START IN REG X; A=1, B=2, C=3)
     (SETS BELL FLAGS, OK TO DISPENSE FLAGS, IMM. AND IRQ MESSAGE
CODES)
16C5 1EC5  RGMCHK  BF5F  STX   CASSID  CASSETTE ID INTO 005F
16C7 1EC7    3F67  CLR   GENFLG  RESET FLAGS BETWEEN CASSETTES

     (ALL DOSES DISPENSED CHECK)
16C9 1EC9    E60F  LDA   000F,X  # DISPENSED
16CB 1ECB    E127  CMP   0027,X  TOTAL # TO BE DISPENSED
16CD 1ECD    2505  BLO   DOSEB
16CF 1ECF  COND10  A604  LDA   #$04  IMMMSG IS LEFT AT 0, "EMPTY"
16D1 1ED1    B75B  STA   CASSTX  "EMPTY"
16D3 1ED3    81  RTS

     (DOSE B CHECK)
     (FIND DOSE B DOSING HOUR SCEDULE # AND PUT INTO ATEMP)
16D4 1ED4  DOSEB  E645  LDA   FREQX   0045,X
16D6 1ED6    B759  STA   FREQ  0059
16D8 1ED8    B76C  STA   ATEMP
16DA 1EDA  DOSB17  AD02  BSR   DOSEHR  GET DOSING HOUR FOR LATEST
DOSE
16DC 1EDC    200D  BRA   DOSEB2
16DE 1EDE  DOSEHR  B65F  LDA   CASSID
16E0 1EE0    4A  DEC   A
16E1 1EE1    48  LSL
16E2 1EE2    48  LSL     4*(CASSETTE ID - 1)
16E3 1EE3    BB6C  ADD   ATEMP   ATEMP = DOSE SCHEDULE #
16E5 1EE5    97  TAX
16E6 1EE6    E616  LDA   YHOURX  DOSING HOUR LOADED INTO REG A
16E8 1EE8    B76A  STA   XTEMP
16EA 1EEA    81  RTS
16EB 1EEB  DOSEB2  B162  CMP   HOURS   A TO ACTUAL HOURS
16ED 1EED    2310  BLS   DOSEB0  EXIT
16EF 1EEF    3D6C  TST   ATEMP
16F1 1EF1    2608  BNE   DOSEB1
16F3 1EF3    B659  LDA   FREQ
16F5 1EF5    B76C  STA   ATEMP
16F7 1EF7    1267  BSET1  GENFLG  DAY BEFORE FLAG SET
16F9 1EF9    2004  BRA   DOSEB0  EXIT
16FB 1EFB  DOSEB1  3A6C  DEC   ATEMP
16FD 1EFD    20DB  BRA   DOSB17  LOOP

     (DOSE B DOSE # CALCULATION)
     [(D.MONTH + D.RTC - D.OFFSET - D.LOAD) * (FREQ + 1)] + CDH -
FD
     (DAYS DUE TO MONTH DIFFERENCE PUT INTO REG A)
16FF 1EFF  DOSEB0  B660  LDA   MONTH   RTC MONTH  0060
1701 1F01    B149  CMP   LOADMO  STARTING MONTH  0049
1703 1F03    2603  BNE   DOSEB3
1705 1F05    4F  CLR   A   A=0
1706 1F06    2013  BRA   DOSEB4  EXIT
1708 1F08  DOSEB3  2202  BHI   DOSEB5
```

```
170A 1F0A    AB0C  ADD   #12
170C 1F0C  DOSEB5  B049  SUB   LOADMO
170E 1F0E    B768  STA   ATEMP2  MONTH DIFFERENCE (1-4)
1710 1F10    B649  LDA   LOADMO
1712 1E12    4A  DEC   A
1713 1F13    48  LSL
1714 1F14    48  LSL     4*(LOADMO - 1)
1715 1F15     BB68  ADD    ATEMP2   (4*(LOADMO-1)) + MONTH DAYS
DIFF.
1717 1F17    97  TAX
1718 1F18    D61C68 LDA   1C69,X  TABLE
    (MAIN DOSE # CALCULATION) (DOSE B DOSE # PUT INTO REG A)
171B 1F1B  DOSEB4  BB61  ADD   DAY   RTC DAY  0061
171D 1F1D    B04A  SUB   LOADDY  STARTING DAY  004B
171F 1F1F    BE5F  LDX   CASSID
1721 1F21    E024  SUB   STARTX  STARTING DAY OFFSET  0024,X
1723 1F23    2407  BHS   DOSEB8
1725 1F25  COND09  A610  LDA   #$10  CONDITION 9
1727 1F27    CC1FEB JMP   COND9C
172A 1F2A    9D9D  NOP    SPARES
172C 1F2C  DOSEB8  2708  BEQ   DOSB10
172E 1F2E    97  TAX
172F 1F2F    4F  CLR   A
1730 1F30  DOSB11  BB59  ADD   FREQ
1732 1F32    4C  INC   A
1733 1F33    5A  DEC   X
1734 1F34    26FA  BNE   DOSB11  +(FREQ+1) * DAYS DIFFERENCE
1736 1F36  DOSB10  036705 BRCLR1 DOSB13
CHECK FOR CDH ON DAY BEFORE GENFLG
1739 1F39    4A  DEC   A
173A 1F3A    2B0A  BMI   SPEC02
173C 1F3C    2002  BRA   DOSB14
173E 1F3E  DOSB13  BB6C  ADD   ATEMP   +CDH#
1740 1F40  DOSB14  BE5F  LDX   CASSID
1742 1F42    E042  SUB   FIRSTX  0042,X
1744 1F44    2403  BHS   DOSB12
1746 1F46  SPEC02  CC19F2 JMP   SPEC2C  SPECIAL CONDITION 2
    ----------------------------------------------------
    (DOSE B TAKEN OR MISSED CHECK) (DOSE B DOSE # STARTS IN A)
1749 1F49  DOSB12  B76E  STA   ATEMP3
174B 1F4B    E112  CMP   DOSE#X  0012,X
174D 1F4D    2527  BLO   DOSEA   DOSE B TAKEN OR MISSED
174F 1F4F    E712  STA   DOSE#X  REPLACE, EARLIER DOSE # MISSED
    (CHECK DOSE B LATE LIMIT)
1751 1F51    CD1EDE JSR   DOSEHR  DOSE B HOUR INTO A
1754 1F54    B756  STA   ADJTAR  FOR ERROR CALC.
1756 1F56    BE5F  LDX   CASSID
1758 1F58    EB36  ADD   LATEX   0036,X
175A 1F5A    B768  STA   ATEMP2
175C 1F5C    B662  LDA   HOURS
175E 1F5E    036702 BRCLR1 DOSB16  CHECK DAY BEFORE FLAG
1761 1F61    AB18  ADD   #24
1763 1F63  DOSB16  B757  STA   ADJACT  FOR ERROR CALC.
1765 1F65    B168  CMP   ATEMP2
1767 1F67    220D  BHI   DOSEA   PAST DOSE B LATE LIMIT
    (CONDITION 1)
1769 1F69  COND01  CD1ACD JSR   ERCALC  LOAD ERRORX
176C 1F6C    A680  LDA   #$80
```

```
176E 1F6E     E75B  STA    005B,X  SET
          OK TO DISPENSE AND BELL FLAGS
1770 1F70     9F  TXA
1771 1F71     ABC0  ADD    #$C0
1773 1F73     B75B  STA    IMMMSG  C1=A  C2=B  C3=C
1775 1F75     81  RTS      EXIT
     ----------------------------------------
     (DOSE A CHECK)
1776 1F76   DOSEA  3C6E  INC    ATEMP3  DOSE B
          DOSE # + 1 = DOSE A DOSE #
1778 1F78     3C6C  INC    ATEMP   DOSE B SCHEDULE # + 1
177A 1F7A     B66C  LDA    ATEMP
177C 1F7C     E145  CMP    FREQX   0045,X
177E 1F7E     2307  BLS    DOSEA1  SAME DAY
1780 1F80     026702 BRSET1 DOSEA2  CHECK DAY BEFORE FLAG
1783 1F83     1067  BSET0  GENFLG  SET DAY AFTER FLAG
1785 1F85   DOSEA2  3F6C  CLR   ATEMP   DOSE # 0
     ------------------------------------
     (DOSE A TAKEN CHECK)
     (DOSEA DOSING HR IN XTEMP;DOSEA
          DOSE# IN ATEMP3;DOSEA SCH# ATEMP)
1787 1F87   DOSEA1  B66E  LDA   ATEMP3

1789 1F89     E112  CMP    DOSE#X  0012,X
178B 1F8B     254C  BLO    DOSEA8  DOSE A TAKEN
178D 1F8D     E712  STA    DOSE#X  0012,X  NOT YET TAKEN
     ----------------------------------------
     (DOSE A EARLY LIMIT CHECK) (DOSE A NOT YET TAKEN)
178F 1F8F     CD1EDE JSR   DOSEHR  DOSE A DOSING HOUR
1792 1F92     016702 BRCLR0 DOSEA3  CHECK DAY AFTER FLAG
1795 1F95     AB18  ADD    #24
1797 1F97   DOSEA3  B756  STA   ADJTAR
1799 1F99     BE5F  LDX    CASSID
179B 1F9B     B662  LDA    HOURS
179D 1F9D     B757  STA    ADJACT
179F 1F9F     EB33  ADD    EARLYX  RTC + EARLY LIMIT (0033,X)
17A1 1FA1     B156  CMP    ADJTAR
17A3 1FA3     2427  BHS    COND03
     ----------------------------------------
     (CONDITION 2)
17A5 1FA5   COND02  01670D BRCLR0 DOSEA4
          CHECK DAY AFTER FLAG
17A8 1FA8   COND04  A601  LDA    #1
17AA 1FAA     E75B  STA    CASSTX  005B,X  "TOMORROW"
17AC 1FAC   DOSEA6  A610  LDA    #10
17AE 1FAE     B15B  CMP    IMMMSG
17B0 1FB0     2302  BLS    DOSEA9  EXIT
17B2 1FB2     B75B  STA    IMMMSG
17B4 1FB4   DOSEA9  81  RTS      EXIT
17B5 1FB5   DOSEA4  B66A  LDA    XTEMP
          DOSE A (OR A+1) DOSING HOUR
17B7 1FB7     AB20  ADD    #20
17B9 1FB9     E75B  STA    CASSTX  005B,X "NOT DUE UNTIL _____"
17BB 1FBB   DOSEA7  A660  LDA    #60
17BD 1FBD     B15B  CMP    IMMMSG
17BF 1FBF     250A  BLO    DOSEA5  EXIT
17C1 1FC1     B75B  STA    IMMMSG  "__XX_XM__"
17C3 1FC3     B66A  LDA    XTEMP
```

```
17C5 1FC5      B158   CMP    NEXTHR
17C7 1FC7      2402   BHS    DOSEA5   EXIT
17C9 1FC9      B758   STA    NEXTHR   LOWER DOSING HOUR STORED
17CB 1FCB   DOSEA5   81   RTS
     (CONDITION 3)
17CC 1FCC   COND03   CD1ACD JSR   ERCALC
17CF 1FCF      A67F   LDA    #$7F
17D1 1FD1      E75B   STA    CASSTX  OK TO DISPENSE/NO BELL
17D3 1FD3      0067D6 BRSET0 DOSEA6  CHECK DAY AFTER FLAG
17D6 1FD6      CC1FBB JMP    DOSEA7  "__XX_XM__"
---------------------------------
     (DOSE A TAKEN) (CHECK IF FURTHER DOSES DUE TODAY)
17D9 1FD9   DOSEA8   0067CC BRSET0 COND04
            DOSE A IS ALREADY TOMORROW
17DC 1FDC      B66C   LDA    ATEMP
17DE 1FDE      4C   INC    A    DOSE A SCHEDULE # + 1
17DF 1FDF      B159   CMP    FREQ  0059
17E1 1FE1      22C5   BHI    COND04
17E3 1FE3      3C6C   INC    ATEMP
17E5 1FE5      CD1EDE JSR    DOSEHR  DOSE A +1 DOSING
            HOUR INTO A & XTEMP
---------------------------------
     (CONDITION 5) (BOTH B AND A TAKEN AND ANOTHER DOSE DUE TODAY)
17E8 1FE8   COND05   CC1FB5 JMP    DOSEA4
"NOT DUE UNTIL ____" & "__XX__XM__"
---------------------------------
17EB 1FEB   COND9C   B15B   CMP    IMMMSG
17ED 1FED      2302   BLS    CON9C1
17EF 1FEF      B75B   STA    IMMMSG
17F1 1FF1   CON9C1   A602   LDA    #$02   "DO NOT USE YET"
17F3 1FF3      E75B   STA    CASSTX  005B,X
17F5 1FF5      81   RTS
---------------------------------------
  INTERRUPT VECTORS:
---------------------------------------
17F6 1FF6    1E00    TIMER INTERRUPT DURING WAIT -(`MINUTE')
17F8 1FF8    1E00    TIMER INTERRUPT - (`MINUTE')
17FA 1FFA    1840    EXTERNAL INTERRUPT - (`IRQ')
17FC 1FFC    183E    SWI - (`WAIT1')
17FE 1FFE    1800    RESET - 1800 (`RESET')
      ----
     [10]
50 ! MMS87.TRU
65 ! 25 MAY 87
80 ! IBM/TRUE BASIC
85 ! ---- Initialization
120 LIBRARY "comlib.trc"
125 LIBRARY "doslib.trc"
140 DECLARE DEF mid$
150 DIM bytesin(118), bytesout(69), mon_file
         $(40), temp_mon_file$(40)
152 DIM compli_sum_values(15), compli_detail(174)
155 DIM demo_sn(6), demo_data(118)
156 MAT READ demo_sn
157 MAT READ demo_data
158 MAT READ compli_sum_values
159 MAT READ compli_detail
160 ! ---- Main Program Start
```

```
162 LET pass = 0
165 DO  ! loop 1 - indefinitely until session over
200   LET demo = 0
210   CLEAR
230   SET MODE "GRAPHICS"
245   SET COLOR "cyan/blue"
320   SET WINDOW 0,319,199,0
324   IF pass = 0 then
330    ! ---- "M"
335    PLOT AREA: 64,3;64,21;68,21;68,9;74,15;80,9;80,
          21;84,21;84,3;80,3;74,9;68,3;64,3
365    BOX KEEP 64,84,3,21 IN BLOCKM$
370    ! ---- "M"
380    BOX SHOW BLOCKM$ AT 88,21
390    ! ---- "S"
410    PLOT AREA: 132,3;116,3;112,7;112,14;128,14;125,17;
          112,17;112,21;128,21;132,17;132,10;116,
          10;119,7;132,7;132,3
420    ! ---- block hyphen
455    BOX AREA 140,152,9,15
495    ! ---- "5"
500    PLOT AREA:161,3;161,14;174,14;174,17;161,17;
          161,21;178,21;181,18;181,13;178,10;166,10;
          166,7;181,7;181,3;161,3
540    ! ---- "0"
545    PLOT AREA: 188,3;185,6;185,18;188,21;202,21;
          205,18;205,6;202,3;188,3
560    SET COLOR "background"
575    PLOT AREA: 192,8;190,10;190,14;192,16;198,16;
          200,14;200,10;198,8;192,8
620    BOX KEEP 185,205,3,21 IN BLOCKO$
630    ! ---- "0"
635    BOX SHOW BLOCKO$ AT 209,21
649    SET COLOR "white"
695    SET CURSOR 4,11
696    PRINT "MEDICATION SYSTEM"
710    SET CURSOR 5, 9
711    PRINT "Copyright MMS Feb. 87"
725    SET CURSOR 9, 2
726    PRINT "Field Unit Operations:"
740    SET CURSOR 11, 8
741    PRINT "Fill/Refill Prescription"
755    SET CURSOR 13, 8
756    PRINT "Debrief Medication Monitor"
770    SET CURSOR 16, 2
771    PRINT "Files Maintenance:"
785    SET CURSOR 18, 8
786    PRINT "Patient File Entry/Update"
800    SET CURSOR 20, 8
801    PRINT "Medication Data Entry/Update"
840    ! ---- ARROW
845    SET COLOR "magenta"
860    PLOT AREA: 26,79;26,87;28,85;38,85;38,87;
          42,83;38,79;38,81;28,81;26,79
875    BOX KEEP 26,42,79,87 IN ARROW$
880    BOX KEEP 0,319,0,199 in main_menu$
882    LET pass = 1
890   ELSE
```

```
892    BOX SHOW main_menu$ at 0,199
894   END IF
900   SET CURSOR "off"
905   LET menu_selection = 1
910   DO             ! loop 3 - Function selection - Screen 1 --
912    GET KEY KEY
914    SELECT CASE KEY
916    CASE 13          ! `Return' - function selected
918      EXIT DO        ! exit loop 3
920    CASE 100, 68       ! `d' or `D' for demo (no hardware)
922      LET demo = 1
924      EXIT DO
926    CASE 336, 328      ! Down arrow, up arrow
928      IF key = 336 then
930      LET menu_selection = menu_selection + 1
932      IF menu_selection = 5 then LET menu_selection = 1
934      ELSE
936      LET menu_selection = menu_selection - 1
938      IF menu_selection = 0 then LET menu_selection = 4
940      END IF
942      SELECT CASE menu_selection
944      CASE 1
946        IF key = 336 then
948        BOX CLEAR 26,42,151,159
950        ELSE
952        BOX CLEAR 26,42,95,103
954        END IF
956        BOX SHOW ARROW$ AT 26,87
958      CASE 2
960        IF key = 336 then
962        BOX CLEAR 26,42,79,87
964        ELSE
966        BOX CLEAR 26,42,135,143
968        END IF
970        BOX SHOW ARROW$ AT 26,103
972      CASE 3
974        IF key = 336 then
976        BOX CLEAR 26,42,95,103
978        ELSE
980        BOX CLEAR 26,42,151,159
982        END IF
984        BOX SHOW ARROW$ AT 26,143
986      CASE 4
988        IF key = 336 then
1000        BOX CLEAR 26,42,135,143
1002        ELSE
1004        BOX CLEAR 26,42,79,87
1006        END IF
1008        BOX SHOW ARROW$ AT 26,159
1010      END SELECT
1012    CASE 27          ! `Esc'
1014      SET MODE "80"
1016      CLEAR
1018      STOP          ! Back to DOS
1020    CASE ELSE
1022      SOUND 600,.5
1024    END SELECT
```

```
1026   LOOP          ! loop 3
1028   !
1100   ! -Separate to Selected Function --1110
          SELECT CASE menu_selection
1120   CASE 1
1130     CALL fill_refill
1140   CASE 2
1150     CALL debrief
1160   CASE 3
1170     CALL patient_file_maint
1180   CASE 4
1190     CALL drug_file_maint
1200   END SELECT
1210 LOOP           ! loop 1
1222 ! ----------------------
1224 SUB fill_refill       ! Prepare monitor for use by patient
1228   ! ------------- Retrieve monitor record & patient file
1230  CALL unload (6,"I",bytesin)  ! Find monitor serial # bytes
1232  IF exit = 1 then EXIT SUB  ! to main menu
1234  LET monitorSN$="M"&chr$(bytesin(1))&chr$(bytesin(2))&chr
          $(bytesin(3))&chr$(bytesin(4))&chr
          $(bytesin(5))&chr$(bytesin(6))
1238  CALL read_monitor_file
1264  LET id$ = mon_file$(1)
1268  CALL read_patient_file
1310  ! ------------- Screen 3 -- Patient ID & Data -
1320  CLEAR
1330  SET MODE "40"
1340  SET COLOR 13       ! bright magenta
1350  SET CURSOR 1, 4
1360  PRINT "FILL/REFILL PRESCRIPTION PROCEDURE"
1370  SET COLOR 10       ! bright green
1380  SET CURSOR 2, 12
1390  PRINT "MONITOR "; monitorSN$
1400  CALL pr_patient_legends
1720  CALL pr_patient_data
1730  DO            ! until proper patient is listed
2040    SET COLOR 15     ! bright white
2050    SET CURSOR 3, 10
2060    PRINT "S";       ! Patient status prompt
2070    SET COLOR 9      ! bright blue
2080    PRINT "ame or ";
2090    SET COLOR 15     ! bright white
2100    PRINT "N";
2110    SET COLOR 9      ! bright blue
2120    PRINT "ew Patient ?";
2130    SET CURSOR 4, 14
2135    SET CURSOR "off"
2150    GET KEY key
2155    SET CURSOR "on"
2160    SELECT CASE key
2170    CASE 115, 83     ! `s' or `S' same patient
2180      EXIT DO     ! loop 1 - on to medication log
2190     CASE 110, 78    ! `n' or `N' new patient
2200      CLEAR
2210      SET COLOR 9    ! bright blue
2220      SET CURSOR 4, 14
2230      PRINT "New Patient";
```

```
2240      SET CURSOR 7, 1
2250      PRINT "Patient ID#  ? ";
2260      DO       ! loop 2
2270       SET CURSOR 7, 14  ! clear response zone
2272       PRINT "    ";
2280       SET COLOR 10  ! bright green
2290       SET CURSOR 7, 14
2300       INPUT prompt "": id$
2310       SELECT CASE id$
2320       CASE "123456", "234567", "345678", "456789"
2322         CALL read_patient_file
2324         CALL pr_patient_legends
2326         CALL pr_patient_data
2330         EXIT DO  ! loop 2 - out to loop 1
2340       CASE else
2345         SOUND 600,.5
2360       END SELECT
2370      LOOP       ! loop 2
2380    CASE 27        ! `Esc'
2390      EXIT SUB     ! escape to main menu
2690    CASE else
2700      SOUND 600,.5
2710    END SELECT
2715    SET CURSOR 4,14
2718    PRINT "       ";   ! erase response zone
2719    SET CURSOR 4,14
2722  LOOP           ! loop 1
2730  LET temp_mon_file$(1) = id$
2740  !
3010  ! - Screen 4 -- Medication Log ---
3080  CLEAR
3095  SET COLOR 13       ! bright magenta
3110  SET CURSOR 1, 4
3111  PRINT "MONITOR # "; monitorSN$;
3125  PRINT " MEDICATION LOG"
3140  LET med$ = "A"
3141  LET med = 1
3142  DO             ! loop 4 - until all 3 data sets are entered
3144    CALL med_field_parameters
3230    SET CURSOR 3, 3
3231    PRINT "CASSETTE "; med$;
3245    SET COLOR 15    ! bright white
3246    PRINT " R";
3260    SET COLOR "white"
3261    PRINT "efill, ";
3275    SET COLOR 15    ! bright white
3276    PRINT "N";
3290    SET COLOR "white"
3291    PRINT "ew, or ";
3305    SET COLOR 15    ! bright white
3306    PRINT "E";
3320    SET COLOR "white"
3321    PRINT "mpty ?";
3325    SET CURSOR "off"
3330    DO             ! loop 5 - until R, N, E, or Esc
3335     GET KEY key
3340     SET CURSOR "on"
3350     SELECT CASE key
```

```
3365     CASE 82, 114     ! `R' or `r' refill
3368       SET COLOR 9
3370       SET CURSOR 2, 10
3372       PRINT "Last loaded "; mon_file$(38); " ";
3374       CALL read_drug_file (mon_file$(4+med))
3386       CALL read_phys_file (mon_file$(1+med))
3398       CALL regimen_data
3424       CALL med_log_labels
3462       CALL pr_med_log_drug
3483       CALL pr_med_log_sig
3510       CALL pr_med_log_control
3522       CALL pr_med_log_phys
3524       FOR i = 1 to 34 step 3
3526        LET temp_mon_file$(i+med) = mon_file$(i+med)
3528       NEXT i
3539       CALL cassette_data_entry  ! Allow changes
3540       EXIT DO    ! loop 5 - to loop 4 - next med
3700     CASE 78, 110     ! `N' or `n' new med
3703       CALL med_log_labels
3712       LET phys_file$ = ""
3714       LET ndc_file$ = ""
3715       CALL cassette_data_entry
3930       EXIT DO    ! loop 5 - to loop 4 - next med
4840     CASE 69, 101     ! `E' or `e' empty
4850       CALL med_log_labels
4860       SET CURSOR ref_row, 14
4870       SET COLOR "white"
4880       PRINT " None"
4890       LET temp_mon_file$(1+med) = ""
4900       LET temp_mon_file$(4+med) = ""
4910       FOR i = 1 to 10
4920        LET temp_mon_file$((i*3)+4+med) = "0"
4930       NEXT i
4940       EXIT DO    ! loop 5 - to loop 4 - next med
5054     CASE 27        ! `Esc'
5058       EXIT SUB   ! fill_refill - escape to main menu
5060     CASE else
5070       SOUND 600, .50
5080     END SELECT
5090    LOOP          ! loop 5
5100    LET med = med + 1
5110    LET med$ = chr$(64+med)
5120  LOOP until med = 4     ! loop 4
5121  ! --Conversion of medication log data for transmission
         5122   FOR i = 1 to 6
5124     LET bytesout(i) = 0  ! DISP X and DOSE#X reset
5128  NEXT i
5129  !
5130  LET med = 1
5132  LET j = 1
5134  FOR i = 7 to 10
5136     CALL scheduled_hour  ! X HOURA
5164     LET j = j + 4
5166  NEXT i
5168  !
5170  LET med = 2
5172  LET j = 1
```

```
5174 FOR i = 11 to 14
5176    CALL scheduled_hour  ! XHOURB
5178    LET j = j + 4
5180 NEXT i
5182 !
5184 LET med = 3
5186 LET j = 1
5188 FOR i = 15 to 18
5190    CALL scheduled_hour  ! XHOURC
5192    LET j = j + 4
5194 NEXT i
5196 !
5198 LET med = 1
5200 FOR i = 19 to 21
5202    SELECT CASE mid$(temp_mon_file$(22+med),11,1)
5204    CASE "e"
5206      LET bytesout(i) = 72   ! MSKEYX
5208    CASE "f"
5210      LET bytesout(i) = 69
5212    CASE "m"
5214      LET bytesout(i) = 75
5216    CASE else
5218      LET bytesout(i) = 0
5220    END SELECT
5222    LET med = med + 1
5224 NEXT i
5226 !
5228 LET med = 1
5230 FOR i = 22 to 24
5232    LET bytesout(i) = val(temp_mon_file$(28+med))   ! STARTX
5234    LET med = med + 1
5236 NEXT i
5238 !
5240 LET med = 1
5242 FOR i = 25 to 27
5244    LET bytesout(i) = val(temp_mon_file$(25+med))   ! TODOSX
5246    LET med = med + 1
5248 NEXT i
5250 !
5252 FOR i = 28 to 36
5254    LET bytesout(i) = 0  ! MAX/PX   PERODX   MININX
5256 NEXT i
5258 !
5260 LET med = 1
5262 FOR i = 37 to 39
5264    LET bytesout(i) = val(temp_mon_file$(13+med))   ! EARLYX
5266    LET med = med + 1
5268 NEXT i
5270 !
5272 LET med = 1
5274 FOR i = 40 to 42
5276    LET bytesout(i) = val(temp_mon_file$(16+med))   ! LATE X
5278    LET med = med + 1
5280 NEXT i
5282 !
5284 FOR i = 43 to 51
```

```
5286     LET bytesout(i) = 0  ! MAKE X   ERRORX   FEATRX
5288  NEXT i
5290  !
5292  LET med = 1
5294  FOR i = 52 to 54
5296     FOR j = 0 to 3
5298       IF temp_mon_file$(19+med) = mid$(temp_mon_file
           $(10+med),j*4+1,3) then EXIT FOR
5299     NEXT j
5300     LET bytesout(i) = j
5302     LET med = med + 1   ! FIRSTX
5304  NEXT i
5306  !
5308  LET med = 1
5310  FOR i = 55 to 57
5312     SELECT CASE temp_mon_file$(7+med)
5314     CASE "QD"
5316       LET bytesout(i) = 0  ! FREQ X
5318     CASE "BID"
5320       LET bytesout(i) = 1
5322     CASE "TID"
5324       LET bytesout(i) = 2
5326     CASE "QID"
5328       LET bytesout(i) = 3
5330     CASE else
5332       LET bytesout(i) = 0
5334     END SELECT
5336     LET med = med + 1
5338  NEXT i
5340  !
5660  LET loading_date$ = "03/10/87"
5661  LET loading_time$ = "07:57"
5662  LET temp_mon_file$(38) = loading_date$
5663  LET temp_mon_file$(39) = loading_time$
5664  LET temp_mon_file$(40) = "Wed"
5675  LET bytesout(58) = val(mid$(loading_date$,1,2))
5676  LET bytesout(59) = val(mid$(loading_date$,4,2))
5690  LET bytesout(60) = val(mid$(loading_time$,1,2))
5720  LET bytesout(61) = val(mid$(loading_time$,4,2))
5735  LET bytesout(62) = 0
5750  FOR i = 63 to 69
5751     LET bytesout(i) = ord(mid$(mon$,i-62,1))
5752  NEXT i
6080  ! - Screen 5 -- Load starting data into monitor --
6090  CLEAR
6092  CALL com_open(#1,1,1200,"d8 p- s1 rts")
6097  SET COLOR 13       ! bright magenta
6100  SET CURSOR 1, 5
6102  PRINT "MONITOR INSTRUCTIONS LOAD/START"
6104  SET COLOR 15       ! bright white
6106  SET CURSOR 3, 9
6108  PRINT "PRESS MONITOR BUTTON `A'"
6110  SET CURSOR "off"
6112  DO             ! loop 10
6114    LET bytein$ = ""
6116    IF demo = 1 then
6118     DO          ! until `a' or `A' are pushed
6120       GET KEY key
```

```
6122        LET bytein$ = ucase$(chr$(key))
6124        IF bytein$ = "A" then
6126         LET bytein$ ="D"
6128         EXIT DO
6129        END IF
6130        LET bytein$ = ""
6131        SOUND 600, .5
6132      LOOP
6133     ELSE
6134      IF key input then
6135        GET KEY key
6136        IF key = 27 then
6137         EXIT SUB  ! fill_refill - exit to main menu
6138        ELSE
6139         SOUND 600, .5
6140        END IF
6141      ELSE
6142        CALL receive (bytein$)
6143      END IF
6144     END IF
6145     IF bytein$ = "D" then EXIT DO
6146     IF bytein$ <> "" then
6147      PRINT "Wrong Code"
6148      SOUND 600, 1
6150      EXIT SUB     ! fill_refill - exit to main menu
6151     END IF
6152   LOOP           ! loop 10
6182   SET CURSOR "on"
6184   SET COLOR "background"
6186   SET CURSOR 3, 9
6187   PRINT "PRESS MONITOR BUTTON `A'"  ! erase
6200   SET COLOR 13        ! bright magenta
6201   SET CURSOR 10, 7
6202   PRINT "COMMUNICATIONS ESTABLISHED"
6204   !
6206   LET byteout$ = "L"
6207   FOR i = 1 to 69     ! "L" + 69 data bytes
6208      IF demo = 1 then
6209       LET i = i
6210      ELSE
6211       CALL send (byteout$)
6212       CALL receive_byte
6214       IF bytein$ <> byteout$ then
6215       CALL send ("?")
6216       PRINT "Bad Echo"
6218       SOUND 600, 1
6220       EXIT SUB    ! fill_refill - exit to main menu
6222       END IF
6223      END IF
6224      CALL echo_bytein
6226      LET byteout$ = chr$(bytesout(i))
6228   NEXT i
6230   CLOSE #1
6232   !
6240   CALL write_monitor_file
6250   !
6321   CLEAR
6322   SET COLOR 13        ! bright magenta
```

```
6335  SET CURSOR 14, 12
6336  PRINT "LOADING COMPLETE"
6350  SET COLOR 15       ! bright white
6351  SET CURSOR 16, 8
6352  PRINT "TURN OFF INTERFACE UNIT"
6365  SET CURSOR 17, 8
6366  PRINT "BEFORE REMOVING MONITOR"
6386  SET COLOR 13       ! bright magenta
6388  SET CURSOR 20, 12
6390  PRINT "TURN ON PRINTER"
6395  SET CURSOR 22, 7
6396  PRINT "PRESS `RETURN' FOR REPORT"
6397  SET CURSOR "off"
6398  DO            ! loop 11 - until request to print
6400    GET KEY key
6402    SELECT CASE key
6404    CASE 13       ! `Return'  Print loading record
6406      CALL pr_loading_record
6458      EXIT DO     ! loop 11 - to main menu
6460    CASE 27       ! `Esc'
6462      EXIT DO     ! loop 11 - escape to main menu
6464    CASE else
6466      SOUND 600, .5
6468    END SELECT
6470  LOOP          ! loop 11
6471  SET CURSOR "on"
6998 END SUB          ! fill_refill     back to main menu
6          9            9           9                         !
----------------------------------------------------------------
-----
7000 SUB debrief         ! Unload & reduce monitor data
7019  ! --gather compliance, monitor & patient data --
7020  CALL unload (118, "U", bytesin)
          ! 50 data + 62 regimen + 6 serial
7022  IF exit = 1 then EXIT SUB  ! to main menu
7 0 3 0         L E T     m o n i t o r s n $     =
"M"&chr$(bytesin(113))&chr$(bytesin(114))&chr$(bytes
          in(115))&chr$(bytesin(116))&chr
          $(bytesin(117))&chr$(bytesin(118))
7040  CALL read_monitor_file
7050  LET id$ = mon_file$(1)
7060  CALL read_patient_file
7070  ! ----------- Screen 6 - Compliance Summary --7080  CALL
compliance_summary_header
7090  FOR med = 1 to 3
7100     IF mon_file$(4+med) <> "" then
7101       CALL compliance_summary_calcs
7102       CALL read_drug_file (mon_file$(4+med))
7104     END IF
7110     CALL compliance_summary_reports
7120  NEXT med
7121  ! ------------------- summary menu -------
7122  SET COLOR 15       ! bright white
7124  SET CURSOR 24, 1
7126  PRINT "P";
7128  SET COLOR "white"
7130  PRINT "rint Record, ";
7132  SET COLOR 15       ! bright white
```

```
7134  PRINT "E";
7136  SET COLOR "white"
7138  PRINT "xamine Detail, or ";
7140  SET COLOR 15        ! bright white
7142  PRINT "M";
7144  SET COLOR "white"
7146  PRINT "enu ?";
7150  SET CURSOR "off"
7151  DO
7152    GET KEY key
7154    SELECT CASE key
7156    CASE 112, 80     ! `p' or `P'
7158      CALL prtsc
7160    CASE 101, 69     ! `e' or `E'
7162      EXIT DO
7164    CASE 109, 77, 27    ! `m' or `M' or `Esc'
7166      EXIT SUB      ! to main menu
7168    CASE else
7170      SOUND 600, .5
7172    END SELECT
7174  LOOP
7200  ! --- Screens 7,8,9 - Compliance Detail -----
7202  LET loading_day = val(mid$(mon_file$(38),4,2))
7204  LET loading_month = val(mid$(mon_file$(38),1,2))
7206  LET loading_year = val(mid$(mon_file$(38),7,2))
7210  SET MODE "80"
7212  LET med = 1
7214  LET exit = 0
7220  DO
7221    CALL compliance_detail_legends
7222    CALL calc_compliance_detail
7230    CALL display_compliance_detail
7232    IF exit = 1 then EXIT SUB  ! escape to main menu
7240  LOOP
7998 END SUB           ! debrief
7999 ! ----------8000 SUB patient_file_maint
8010  CLEAR
8998 END SUB           ! patient_file_maint
8999 ! ---------------------------------------------
9000 SUB drug_file_maint
9010  CLEAR
9998 END SUB           ! drug_file_maint
9999  !  ----------------------------------------------11000  !
---------------- Fill_Refill Subroutines ------F
11002 SUB unload(bytes_unloaded, command_character$, bytesin())
11005  ! Data uploaded from monitor & Testmode operations
11008  ! --- Screen 2 -- Unload Prompts -----
11009  CLOSE #1
11010  CLEAR
11015  CALL com_open (#1,1,1200,"d8 p- s1 rts")
11020  SET MODE "40"       ! text,40 columns,color
11030  SET COLOR 13        ! bright magenta
11035  SET CURSOR "on"
11040  SET CURSOR 1, 4
11050  PRINT "Connect Interface Unit to Monitor"
11060  SET COLOR 15        ! bright white
11070  SET CURSOR 3, 9
11080  PRINT "Energize Interface Unit"
```

```
11085 DO          ! loop 1 - until command_character = "D"
11090   SET COLOR 9     ! bright blue
11100   SET CURSOR 5, 1
11110   PRINT "PRESS MONITOR BUTTON `A' - DATA TRANSFER";
11120   SET CURSOR 7, 1
11130   PRINT "PRESS MONITOR BUTTON `C' - UNLOCK/TESTS"
11135   SET CURSOR "off"
11142   LET bytein$ = ""
11143   LET exit = 0
11145   DO          ! loop 2 - until proper command_character
11147    IF bytein$ <> "" then
11148      SOUND 600, .5
11149      LET BYTEIN$ = ""
11150    END IF
11151    IF demo = 1 then
11152      GET KEY key
11153      LET bytein$ = ucase$(chr$(key))
11154      IF bytein$ = "A" then LET bytein$ = "D"
11155      IF bytein$ = "C" then LET bytein$ = "T"
11156    ELSE
11158      IF key input then
11160       GET KEY key
11162       IF key = 27 then
11164       LET exit = 1
11166       EXIT SUB   ! unload - to main menu
11168       ELSE
11170       SOUND 600, .5
11172       END IF
11174      ELSE
11176       CALL receive (bytein$)
11178      END IF
11180    END IF
11182   LOOP until bytein$ = "D" or bytein$ = "T"  ! loop 2
11183   LET data_test$ = bytein$
11184   SOUND 800, .25
11186   SELECT CASE bytein$
11190   CASE "D"       ! Bring bytes_unloaded bytes in
11200     SET COLOR 13    ! bright magenta
11205     SET CURSOR "on"
11210     SET CURSOR 10, 7
11220     PRINT "COMMUNICATIONS ESTABLISHED"
11230     LET i = 1
11235     LET byteout$ = command_character$
11236     DO        ! loop 3 - until bytes_unloaded bytes out
11238      IF demo = 1 then
11240        IF command_character$ = "I" then
11242         LET bytesin(i) = demo_sn(i)
11244        ELSE
11246         LET bytesin(i) = demo_data(i)
11248        END IF
11250      ELSE
11252        CALL send (byteout$)
11254        CALL receive_byte
11255        LET bytesin(i) = ascii
11260      END IF
11292      CALL echo_bytein
```

```
11360       LET i = i+1
11365       LET byteout$ = bytein$
11370      LOOP until i = bytes_unloaded + 1  ! loop 3
11380      IF demo = 0 then CALL send (byteout$)
11400    CASE "T"      ! Testmode operations selected
11402      CLEAR
11404      SET COLOR 13    ! bright magenta
11405      SET CURSOR "on"
11406      SET CURSOR 1, 12
11408      PRINT "FUNCTIONAL TESTS"
11410      SET COLOR 9  ! bright blue
11412      SET CURSOR 6, 1
11414      PRINT "PRESS KEY `U'"
11416      SET CURSOR 7, 11
11418      PRINT "`B'"
11420      SET CURSOR 8, 11
11422      PRINT "`D'"
11424      SET CURSOR 9, 11
11426      PRINT "`M'"
11428      SET CURSOR 10, 11
11430      PRINT "`S'"
11432      SET CURSOR 11,11
11434      PRINT "`Q'"
11436      SET COLOR 10    ! bright green
11438      SET CURSOR 6, 16
11440      PRINT "UNLOCK (3 sec.)"
11442      SET CURSOR 7, 16
11444      PRINT "ALARM TEST"
11446      SET CURSOR 8,16
11448      PRINT "DISPLAY SEGMENTS CHECK"
11450      SET CURSOR 9, 16
11452      PRINT "MOTOR ON"
11454      SET CURSOR 10,16
11456      PRINT "STOP ALL"
11458      SET CURSOR 11,16
11460      PRINT "QUIT TESTMODE"
11462      SET CURSOR "off"
11465      DO        ! loop 5 - indefinitely - until tests done
11470       GET KEY key
11475       IF demo = 1 then
11476         CLEAR
11478         EXIT DO
11479       END IF
11480       SELECT CASE chr$(key)
11490       CASE "U","u","B","b","D","d","M","m","S","s"
11492         CALL send (ucase$(chr$(key)))
11500       CASE "Q","q"
11502         CALL send ("Q")
11506         CLEAR
11508         EXIT DO   ! loop 5 - to loop 1
11510       CASE else
11512         SOUND 600,.5
11520       END SELECT
11530      LOOP       ! loop 5
11540    END SELECT
```

```
11550  LOOP until data_test$ = "D"  ! loop 1
11555  CLOSE #1
11557  SET CURSOR "on"
11560 END SUB          ! unload
1          1          5          6          2                              !
-----------------------------------------------------------------------------
-----
11564 SUB receive_byte      ! Wait for/capture 1 byte in
11566  LET bytein$ = ""
11568  DO            ! loop 4
11570    CALL receive (bytein$)
11572  LOOP until bytein$ <> ""  ! loop 4
11574  LET bytein$ = mid$ (bytein$,1,1)
11576  LET ascii = ord (bytein$)
11578 END SUB          ! receive_byte
11580 ! -----------------------------------F
11582 SUB echo_bytein
11584  SET CURSOR 12, 12
11586  PRINT i;
11588  SET CURSOR 12, 17
11590  PRINT bytesin(i);
11592  SET CURSOR 12, 24
11594  IF bytesin(i) > 32 then PRINT chr$(bytesin(i))
11596 END SUB          ! echo_bytein
11598 ! -----------------------------F
11600 SUB read_monitor_file    ! Retrieve latest loading record
11610  OPEN #1: name monitorSN$&".", access input
11620  FOR i = 1 to 40
11630     INPUT #1:mon_file$(i)
11640  NEXT i
11650  CLOSE #1
11698 END SUB          ! read_monitor_file
11699 ! ---------------------------------F
11700 SUB read_patient_file    ! Retrieve patient file data
11710  OPEN #1: name id$&".", access input
11720  INPUT #1: name$,street$,city$,state$,zip,homeph$,busph$,
          birth$,age,ssn$,sex$,cond1$,cond2$
11730  CLOSE #1
11798 END SUB          ! read_patient_file
11799 ! ----------------------------------F
11800 SUB pr_patient_legends   ! Print patient data legends
11810  SET COLOR 9        ! bright blue
11820  SET CURSOR 7, 1
11830  PRINT "Patient ID# "
11840  SET CURSOR 8, 1
11850  PRINT "Patient Name "
11852  SET CURSOR 9, 1
11854  PRINT "Street "
11856  SET CURSOR 10, 1
11858  PRINT "City "
11860  SET CURSOR 11, 1
11862  PRINT "State "
11864  SET CURSOR 12, 1
11866  PRINT "Zip Code "
11868  SET CURSOR 13, 1
11870  PRINT "Home Phone # "
11872  SET CURSOR 14, 1
11874  PRINT "Business Phone # "
```

```
12094  END SELECT
12096  SET COLOR color
12098 END SUB          ! med_field_parameters
12099 ! ----------------------------------F
12100 SUB read_drug_file (ndc_file$)  ! Retrieve drug file
12110  OPEN #1: name ndc_file$, access input
12120  INPUT #1:drug$, ndc$, dose$, form$, cartq,
          sugsig$, sugsch$, sugmess$, sugfirst$
12130  CLOSE #1
12198 END SUB          ! read_drug_file
12199 ! ----------------------------F
12200 SUB read_phys_file (phys_file$)  ! Retrieve phys. file
12210  OPEN #1: name phys_file$&".", access input
12220  INPUT #1: phys$, phone$, emerph$
12230  CLOSE #1
12298 END SUB          ! read_phys_file
12299 ! --------------------------------F
12300 SUB regimen_data      ! Assemble regimen data
12302  LET ndc_file$ = mon_file$(4+med)
12304  LET phys_file$ = mon_file$(1+med)
12310  LET dispq$ = mid$(str$(val(mon_file
          $(med+25))),1,2)
12320  LET start$ = mid$(str$(val(mon_file
          $(med+28))),1,1)
12330  LET refil$ = mid$(str$(val(mon_file
          $(med+31))),1,1)
12340  LET alarm$ = mon_file$(med+34)
12350  LET early$ = mon_file$(med+13)
12360  LET late$ = mon_file$(med+16)
12370  LET message$ = mon_file$(med+22)
12380  LET sig$ = mon_file$(med+7)
12390  LET schedule$ = mon_file$(med+10)
12392  LET first$ = mon_file$(med+19)
12398 END SUB          ! regimen_data
12399 ! -----------------------------------F
12400 SUB med_log_labels    ! Print regimen labels
12410  SET COLOR color
12420  SET CURSOR ref_row, 1
12430  PRINT "MEDICATION "; med$
12440  PRINT "NDC";
12450  SET CURSOR ref_row+1, 19
12460  PRINT "Dose";
12470  SET CURSOR ref_row+1, 30
12480  PRINT "Form";
12481  SET CURSOR ref_row+2, 1
12482  PRINT "SIG  SCH";
12484  SET CURSOR ref_row+2, 25
12486  PRINT "1  #  Rfl Off";
12487  SET CURSOR ref_row+3, 1
12488  PRINT "Alarm:  Unlock(Early):  Lock(Late):";
12489  SET CURSOR ref_row+4, 1
12490  PRINT "Dr";
12492  SET CURSOR ref_row+4, 14
12494  PRINT "O      E";
12495  SET CURSOR ref_row+5, 1
12496  PRINT "Message:";
12498 END SUB          ! med_log_labels
12499 ! ------------------------------------F
```

```
11876  SET CURSOR 15, 1
11878  PRINT "Birthdate "
11880  SET CURSOR 16, 1
11882  PRINT "Age "
11884  SET CURSOR 17, 1
11886  PRINT "Social Security # "
11888  SET CURSOR 18, 1
11890  PRINT "Sex "
11891  SET CURSOR 21, 1
11892  PRINT "Condition "
11893  SET CURSOR 22, 1
11894  PRINT "Condition "
11898 END SUB          ! pr_patient_legends
11899 ! ------------------------------F
11900 SUB pr_patient_data      ! Print patient data
11902  SET COLOR 10       ! bright green
11904  SET CURSOR 7, 14
11906  PRINT id$
11908  SET CURSOR 8, 15
11910  PRINT name$
11912  SET CURSOR 9, 9
11914  PRINT street$
11916  SET CURSOR 10, 7
11918  PRINT city$
11920  SET CURSOR 11, 8
11922  PRINT state$
11924  SET CURSOR 12, 10
11926  PRINT zip
11928  SET CURSOR 13, 15
11930  PRINT homeph$
11932  SET CURSOR 14, 19
11934  PRINT busph$
11936  SET CURSOR 15, 12
11938  PRINT birth$
11940  SET CURSOR 16, 5
11942  PRINT age
11944  SET CURSOR 17, 20
11946  PRINT ssn$
11948  SET CURSOR 18, 6
11950  PRINT sex$
11952  SET CURSOR 21, 12
11954  PRINT cond1$
11956  SET CURSOR 22, 12
11958  PRINT cond2$
11998 END SUB          ! pr_patient_data
11999 ! -------------------------------------F
12000 SUB med_field_parameters   ! set color, row and column
12010  SELECT CASE med
12020  CASE 1          ! Cassette A
12030    LET color = 10  ! bright green
12040    LET ref_row = 5
12050  CASE 2          ! Cassette B
12060    LET color = 12  ! bright red
12070    LET ref_row = 12
12080  CASE 3          ! Cassette C
12090    LET color = 14  ! yellow
12092    LET ref_row = 19
```

```
12500 SUB pr_med_log_drug     ! print regimen values
12510  SET COLOR "white"
12520  CALL clean_field (ref_row, 15, 25)
12530  PRINT drug$;
12540  CALL clean_field (ref_row+1, 5, 14)
12550  PRINT ndc$;
12560  CALL clean_field (ref_row+1, 24, 6)
12570  PRINT dose$;
12580  CALL clean_field (ref_row+1, 35, 5)
12582  PRINT form$;
12584  CALL clean_field (ref_row+2, 30, 2)
12586  PRINT dispq$;
12588  CALL clean_field (ref_row+2, 35, 1)
12590  PRINT refil$;
12592  CALL clean_field (ref_row+5, 10, 30)
12594  PRINT message$;
12598 END SUB            ! med_log_drug
12599 ! -----------F
12600 SUB pr_med_log_sig
12610  CALL clean_field (ref_row+2, 4, 3)
12620  PRINT sig$;
12630  CALL clean_field (ref_row+2, 10, 15)
12640  PRINT schedule$;
12650  CALL clean_field (ref_row+2, 26, 3)
12660  PRINT first$;
12670  CALL clean_field (ref_row+2, 39, 1)
12680  PRINT start$;
12698 END SUB            ! med_log_sig
12699 ! -----------------------------------F
12700 SUB pr_med_log_control
12710  CALL clean_field (ref_row+3, 7, 3)
12720  PRINT alarm$;
12730  CALL clean_field (ref_row+3, 24, 3)
12740  PRINT early$;
12750  CALL clean_field (ref_row+3, 38, 2)

12760  PRINT late$;
12798 END SUB            ! med_log_control
12799 ! ----------------------------------F
12800 SUB pr_med_log_phys
12810  CALL clean_field (ref_row+4, 3, 11)
12820  PRINT phys$;
12830  CALL clean_field (ref_row+4, 15, 12)
12840  PRINT phone$;
12850  CALL clean_field (ref_row+4, 28, 12)
12860  PRINT emerph$;
12898 END SUB            ! pr_med_log_phys
12899 ! ----------------------------------F
12900 SUB response_check
12910  LET bad_response = 0
13000  SELECT CASE item
13010  CASE 1          ! NDC #
13020    IF a$ = "1" then
13030      LET a$ = "0071-0407-20"
13040    ELSE IF a$ = "2" then
13050      LET a$ = "0071-0568-13"
13060    ELSE IF a$ = "3" then
13070      LET a$ = "0071-0672-40"
13080    ELSE IF a$ = "999976752" then
```

```
13090     LET a$ = "0071-0407-20"
13092    ELSE IF a$ = "" and ndc_file$ <> "" then
13093      CALL pr_med_log_drug
13094      EXIT SUB     ! response_check
13100    ELSE
13110      LET bad_response = 1
13120      EXIT SUB     ! response_check
13130    END IF
13140    SET CURSOR row, column
13150    PRINT a$;
13160    LET ndc_file$ = mid$(a$,1,4)&
          mid$(a$,6,4)&"."&mid$(a$,11,2)
13170    CALL read_drug_file (ndc_file$)
13180    LET temp_mon_file$(4+med) = ndc_file$
13190    LET sig$ = sugsig$
13200    LET temp_mon_file$(7+med) = sig$
13210    LET schedule$ = sugsch$
13220    LET temp_mon_file$(10+med) = schedule$
13230    LET first$ = sugfirst$
13240    LET temp_mon_file$(19+med) = first$
13250    LET dispq$ = str$(cartq)
13260    LET temp_mon_file$(25+med) = dispq$
13270    LET refil$ = "0"
13280    LET temp_mon_file$(31+med) = refil$
13290    LET start$ = "0"
13300    LET temp_mon_file$(28+med) = start$
13310    LET message$ = sugmess$
13320    LET temp_mon_file$(22+med) = message$
13330    LET alarm$ = "y"

13340    LET temp_mon_file$(34+med) = alarm$
13350    LET early$ = "2"
13360    LET temp_mon_file$(13+med) = early$
13370    LET late$ = "2"
13380    LET temp_mon_file$(16+med) = late$
13390    CALL pr_med_log_drug
13400    CALL pr_med_log_sig
13410    CALL pr_med_log_control
13420  CASE 2          ! SIG
13430    IF ucase$(a$) = "QD" then
13440      LET schedule$ = "07a"
13450      LET first$ = "07a"
13460      LET start$ = "1"
13470    ELSE IF ucase$(a$) = "BID" then
13480      LET schedule$ = "07a-06p"
13490      LET first$ = "06p"
13500      LET start$ = "0"
13510    ELSE IF ucase$(a$) = "TID" then
13520      LET schedule$ = "07a-12p-06p"
13530      LET first$ =  "06p"
13540      LET start$ = "0"
13550    ELSE IF ucase$(a$) = "QID" then
13560      LET schedule$ = "07a-12p-06p-10p"
13570      LET first$ = "06p"
13580      LET start$ = "0"
13582    ELSE IF a$ = "" then
13584      SET CURSOR row, column
13586      PRINT sig$;
13588      EXIT SUB
```

```
13590   ELSE
13600     LET bad_response = 1
13610     EXIT SUB    ! response_check
13620   END IF
13630   LET sig$ = Ucase$(a$)
13640   CALL sig_values
13650 CASE 3         ! Schedule
13660   IF len(a$) = 3 then
13670     LET sig$ = "QD"
13680     LET first$ = a$
13690     LET start$ = "1"
13700   ELSE IF len(a$) = 7 then
13710     LET sig$ = "BID"
13720     LET first$ = mid$(a$,5,3)
13730     LET start$ = "0"
13740   ELSE IF len(a$) = 11 then
13750     LET sig$ = "TID"
13760     LET first$ = mid$(a$,9,3)
13770     LET start$ = "0"
13780   ELSE IF len(a$) = 15 then
13790     LET sig$ = "QID"
13800     LET first$ = mid$(a$,9,3)
13810     LET start$ = "0"
13812   ELSE IF a$ = "" then
13814     SET CURSOR row, column
13816     PRINT schedule$;
13818     EXIT SUB    ! response_check
13820   ELSE
13830     LET bad_response = 1
13840     EXIT SUB    ! response_check
13850   END IF
13860   LET schedule$ = lcase$(a$)
13862   LET first$ = lcase$(first$)
13870   CALL sig_values
13880 CASE 4         ! First dosage
13882   IF a$ = "" then
13883     SET CURSOR row, column
13884     PRINT first$;
13885     LET a$ = first$
13886   END IF
13890   IF a$ = mid$(schedule$,1,3) or a$ =
         mid$(schedule$,5,3) or a$ = mid$(schedule$,9,3)
         or a$ = mid$(schedule$,13,3) then
13900     LET first$ = a$
13910     LET temp_mon_file$(19+med) = first$
13920   ELSE
13930     LET bad_response = 1
13940   END IF
13950 CASE 5         ! # to be dispensed
13952   IF a$ = "" then
13954     SET CURSOR row, column
13956     PRINT dispq$;
13957     LET a$ = dispq$
13958   END IF
13960   IF val(a$) > cartq then
13970     LET bad_response = 1
13980   ELSE
13990     LET dispq$ = a$
```

```
14350      LET alarm$ = "n"
14360      LET late$ = "24"
14370    END IF
14380    LET early$ = str$(val(a$))
14390    CALL alarm_values
14400  CASE 10          ! Lock
14402    IF a$ = "" then
14404      SET CURSOR row, column
14406      PRINT late$;
14407      LET a$ = late$
14408    END IF
14410    IF val(a$) < 0 or val(a$) > 24 then
14420      LET bad_response = 1
14430      EXIT SUB    ! response_check
14432    ELSE IF alarm$ = "n" and a$ <> "24" then
14434      LET a$ = "24"
14436      SOUND 600, .5
14440    END IF
14450    IF val(a$) = 24 then
14460      LET alarm$ = "n"
14470      LET early$ = "24"
14480    END IF
14490    LET late$ = str$(val(a$))
14500    CALL alarm_values
14510  CASE 11          ! Physician
14512    IF a$ = "" and phys_file$ <> "" then
14513      CALL pr_med_log_phys
14514      EXIT SUB    ! response_check
14516    END IF
14520    IF Ucase$(a$) = "P9988" or Ucase$(a$) = "P8877"
          or Ucase$(a$) = "P7766" then
14530      LET phys_file$ = Ucase$(a$)
14540      LET temp_mon_file$(1+med) = phys_file$
14550      CALL read_phys_file (phys_file$)
14560      CALL pr_med_log_phys
14570    ELSE
14580      LET bad_response = 1
14590    END IF
14600  CASE 12          ! Message
14602    IF a$ = "" then
14604      SET CURSOR row, column
14605      PRINT message$;
14606      EXIT SUB
14608    END IF
14610    LET message1$ = "take before meals"
14620    LET message2$ = "take with milk"
14630    LET message3$ = "take with food"
14640    IF lcase$(a$) = message1$ or lcase$(a$) = message2$
          or lcase$(a$) = message3$ then
14650      LET message$ = lcase$(a$)
14660      LET temp_mon_file$(22+med) = message$
14670    ELSE
14680      LET bad_response = 1
14690    END IF
14700  END SELECT
14798 END SUB          ! response_check
14799 ! -----------------------------------------F
14800 SUB sig_values
```

```
14810  LET temp_mon_file$(7+med) = sig$
14820  LET temp_mon_file$(10+med) = schedule$
14830  LET temp_mon_file$(19+med) = first$
14840  LET temp_mon_file$(28+med) = start$
14850  CALL pr_med_log_sig
14898 END SUB           ! sig_values
14899 ! -------------------------------------------F
14900 SUB alarm_values
14910  LET temp_mon_file$(34+med) = alarm$
14920  LET temp_mon_file$(13+med) = early$
14930  LET temp_mon_file$(16+med) = late$
14940  CALL pr_med_log_control
14998 END SUB           ! alarm_values
14999 ! -------------------------------------------F
15000 SUB scheduled_hour
15010  IF temp_mon_file$(10+med) = "" then
15020    LET bytesout(i) = 0
15030    EXIT SUB       ! scheduled_hour
15040  END IF
15050  LET dosing_hour$ = mid$(temp_mon_file$(10+med),j,3)
15060  IF dosing_hour$ = "" then LET dosing_hour$ = "00a"
15070  LET hour = val(mid$(dosing_hour$,1,2))
15080  IF mid$(dosing_hour$,3,1) = "p"
          then LET hour = hour + 12
15082  IF hour = 12 then LET hour = 0
15084  IF hour = 24 then LET hour = 12
15086  LET bytesout(i) = hour
15098 END SUB           ! scheduled_hour
15099 ! -------------------------------------------F
15100 SUB write_monitor_file
15110  IF demo = 1 then
15112    OPEN #1: name "M000000.", create newold
15113    ERASE #1
15114  ELSE
15130    OPEN #1: name monitorSN$&".", create newold
15131   ' ERASE #1
15132  END IF
15140  FOR i = 1 to 40
15150     PRINT #1:temp_mon_file$(i)
15160  NEXT i
15170  CLOSE  #1
15198 END SUB           ! write_monitor_file
15199 ! ---------------------------F
15200 SUB pr_loading_record
15202  OPEN #2: printer
15203  IF demo = 1 then LET mon$ = "M000000"
15204  PRINT #2: "MONITOR ";MON$;" LOADING RECORD"
15206  PRINT #2:
15208  PRINT #2: "PATIENT #";temp_mon_file$(1)
15210  PRINT #2: mid$(date$,5,2);"-";
          mid$(date$,7,2);"-";mid$(date$,1,4)
15211  PRINT #2: mid$(time$,1,5)
15212  FOR med = 1 to 3
15214     CALL pr_med_record
15260  NEXT med
15270  CLOSE #2
15278 END SUB           ! pr_loading_record
```

```
15279 ! --------------------------------F
15280 SUB pr_med_record
15282  PRINT #2:
15283  PRINT #2:  "CASSETTE ";CHR$(64+MED)
15284  IF temp_mon_file$(4+med) = "" then
15285    PRINT #2:  "NDC#  EMPTY"
15286    EXIT SUB      ! pr_med_record
15287  END IF
15288  PRINT #2: "NDC# ";MID$(temp_mon_file$(4+MED),1,4);"-";MID$
          (temp_mon_file$(4+MED),5,4);
          "-";MID$(temp_mon_file$(4+MED),10,2)
15289  PRINT #2:  temp_mon_file$(7+MED);"
          ";temp_mon_file$(10+MED);"   ";temp_mon_file$(19+MED)
15291  PRINT #2:  "STARTING DAY OFFSET:
          ";temp_mon_file$(28+med)
15292  PRINT #2: "QTY: ";temp_mon_file$(25+MED);"    REFILL#:
";temp_mon_file$(31+MED)
15293  PRINT #2:  "ALARM: ";temp_mon_file$(34+MED);"   EARLY:
";temp_mon_file$(13+MED);" LATE: ";temp_mon_file$(16+MED)
15294  PRINT #2:  "MESSAGE: ";temp_mon_file$(22+MED)
15295  PRINT #2:  "DR.# ";temp_mon_file$(1+MED)
15298 END SUB       ! pr_med_record
15299 ! ----------------------------------F
15300 SUB cassette_data_entry
15302  LET item = 1
15304  DO            ! loop 6 - indefinitely (until med data OK)
15306    SELECT CASE item
15308    CASE 1       ! NDC #
15310      LET row = ref_row+1
15312      LET column = 5
15314      LET spaces = 12
15316    CASE 2       ! SIG
15318      LET row = ref_row+2
15320      LET column = 4
15322      LET spaces = 3
15324    CASE 3       ! Schedule
15326      LET row = ref_row+2
15328      LET column = 10
15330      LET spaces = 15
15332    CASE 4       ! First dosage
15334      LET row = ref_row+2
15336      LET column = 26
15338      LET spaces = 3
15340    CASE 5       ! # to be dispensed
15342      LET row = ref_row+2
15344      LET column = 30
15346      LET spaces = 2
15348    CASE 6       ! Refill
15350      LET row = ref_row+2
15352      LET column = 35
15354      LET spaces = 1

15356    CASE 7       ! Offset
15358      LET row = ref_row+2
15360      LET column = 39
15362      LET spaces = 1
15364    CASE 8       ! Alarm
```

```
15366       LET row = ref_row+3
15368       LET column = 7
15370       LET spaces = 1
15372     CASE 9        ! Unlock
15374       LET row = ref_row+3
15376       LET column = 24
15378       LET spaces = 2
15380     CASE 10        ! Lock
15382       LET row = ref_row+3
15384       LET column = 38
15386       LET spaces = 2
15388     CASE 11        ! Physician
15390       LET row = ref_row+4
15392       LET column = 3
15393       LET spaces = 5
15394     CASE 12        ! Message
15396       LET row = ref_row+5
15398       LET column = 10
15400       LET spaces = 30
15402     END SELECT
15404     SET COLOR "white"   ! all med data
15406     DO         ! loop 7 until proper item response
15408      SET CURSOR row, column
15410      LET a$ = ""
15412      DO        ! loop 9 until complete keyboard entry
15414        GET KEY key
15416        SELECT CASE key
15418        CASE 324    ! F10 - med data complete - exit to next med
15420          IF ndc_file$ = "" or phys_file$ = "" then
15422           SOUND 600, .5
15424          ELSE
15426           EXIT SUB   ! cassette_data_entry
15428          END IF
15430        CASE 13    ! `return' - entry complete
15432          EXIT DO
15434        CASE 8     ! backspace - erase last character
15436          LET first_column = column
15438          ASK CURSOR line, column
15440          IF column = first_column then
15442           SOUND 600, .5
15444          ELSE
15446           SET CURSOR line, column - 1
15448           PRINT " ";
15450           LET a$ = mid$(a$, 1, len(a$) - 1)
15452           SET CURSOR line, column - 1
15454          END IF
15456          LET column = first_column
15458        CASE 32, 45, 48 to 57, 65 to 90, 97 to 122 ! spc,-,num,alph
15460          IF len(a$) = spaces then
15462           SOUND 600, .5
15464          ELSE
15465           IF len(a$) = 0 then CALL clean_field (row, column, spaces)
15468           LET b$ = chr$(key)
15469           PRINT b$;
15470           LET a$ = a$ & b$
```

```
15472          END IF
15474        CASE else
15476          SOUND 600, .5
15478        END SELECT
15480      LOOP        ! loop 9
15482      CALL response_check
15484      IF bad_response = 0 then EXIT DO    ! exit loop 7
15486      SOUND 600, .5
15490      CALL clean_field (row, column, spaces)
15493     LOOP         ! loop 7
15494     LET item = item + 1
15495     IF item = 13 then LET item = 1
15496   LOOP          ! loop 6
15498 END SUB          ! cassette_data_entry
15499 ! --------------------------------F
15500 SUB clean_field (row, column, spaces)
15510  SET CURSOR row, column
15520  FOR j = 1 to spaces
15530     PRINT " ";
15540  NEXT j
15550  SET CURSOR row, column
15598 END SUB
15599 ! --------------------------------
20000 ! -------------------------------D
20010 SUB compliance_summary_header
20020  CLEAR
20030  SET COLOR 13       ! bright magenta
20040  SET CURSOR 1, 14
20050  PRINT "COMPLIANCE REPORT"
20060  PRINT
20070  PRINT name$;
20080  SET CURSOR 3, 30
20090  PRINT "ID# "; id$
20092  PRINT "Monitor "; monitorsn$;
20094  SET CURSOR 4, 28
20096  PRINT "Record 87001";
20098 END SUB          ! compliance_summary_header
20099 ! -----------------------------------D
20100 SUB compliance_summary_calcs
20120  IF demo = 1 then EXIT SUB
20130  LET compli_sum_values(med) = 0    ! # taken
20140  LET compli_sum_values(3+med) = 0  ! # outliers
20150  LET compli_sum_values(6+med) = 0  ! daily score
20160  LET compli_sum_values(9+med) = 0
         ! cumulative score
20170  LET compli_sum_values(12+med) = 0
         ! compliance index
20198 END SUB          ! compliance_summary_calcs
20199 ! ---------------------------------D
20200 SUB compliance_summary_reports
20220  SELECT CASE med
20230  CASE 1
20240    LET cassette$ = "A"
20250    SET COLOR 10     ! bright green
20260    LET ref_row = 6
20270  CASE 2
20280    LET cassette$ = "B"
20290    SET COLOR 12     ! bright red
```

```
14000       LET temp_mon_file$(25+med) = dispq$
14010     END IF
14020   CASE 6          ! Refill
14022     IF a$ = "" then
14024       SET CURSOR row, column
14026       PRINT refil$;
14027       LET a$ = refil$
14028     END IF
14030     IF val(a$) >= 0 and val(a$) < 4 then
14040       LET refil$ = a$
14050       LET temp_mon_file$(31+med) = refil$
14060     ELSE
14070       LET bad_response = 1
14080     END IF
14090   CASE 7          ! Offset
14092     IF a$ = "" then
14094       SET CURSOR row, column
14096       PRINT start$;
14097       LET a$ = start$
14098     END IF
14100     IF val(a$) >= 0 and val(a$) < 15 then
14110       LET start$ = a$
14120       LET temp_mon_file$(28+med) = start$
14130     ELSE
14140       LET bad_response = 1
14150     END IF
14160   CASE 8          ! Alarm
14162     IF a$ = "" then
14164       SET CURSOR row, column
14166       PRINT alarm$;
14167       EXIT SUB
14168     END IF
14170     IF a$ = "Y" or a$ ="y" then
14180       LET early$ = "2"
14190       LET late$ = "2"
14200     ELSE IF a$ = "N" or a$ = "n" then
14210       LET early$ = "24"
14220       LET late$ = "24"
14230     ELSE
14240       LET bad_response = 1
14250       EXIT SUB    ! response_check
14260     END IF
14270     LET alarm$ = lcase$(a$)
14280     CALL alarm_values
14290   CASE 9          ! Unlock
14292     IF a$ = "" then
14294       SET CURSOR row, column
14296       PRINT early$;
14297       LET a$ = early$
14298     END IF
14300     IF val(a$) < 0 or val(a$) > 24 then
14310       LET bad_response = 1
14320       EXIT SUB    ! response_check
14322     ELSE IF alarm$ = "n" and a$ <> "24" then
14324       LET a$ = "24"
14326       SOUND 600, .5
14330     END IF
14340     IF val(a$) = 24 then
```

```
20300     LET ref_row = 12
20310   CASE 3
20320     LET cassette$ = "C"
20330     SET COLOR 14     ! yellow
20340     LET ref_row = 18
20345   END SELECT
20350   SET CURSOR ref_row, 1
20360   IF mon_file$(4+med) = "" then
20370     PRINT "Cassette ";cassette$;" Empty";
20380     EXIT SUB
20390   END IF
20400   PRINT drug$;
20410   SET CURSOR ref_row, 25
20420   PRINT dose$;
20430   SET CURSOR ref_row, 35
20440   PRINT form$;
20450   SET CURSOR ref_row + 1, 1
20460   PRINT mon_file$(7+med);    ! sig
20470   SET CURSOR ref_row + 1, 9
20480   PRINT "#"; mon_file$(25+med); " ";  ! # to be taken
20490   SET COLOR "white"
20500   PRINT "("; compli_sum_values(med); " taken, ";
           compli_sum_values(3+med); " outliers)";
20510   SET CURSOR ref_row + 2, 5
20520   PRINT "Cumulative Compliance Score ";
20530   SET COLOR 15       ! bright white
20540   PRINT compli_sum_values(9+med);
20550   SET COLOR "white"
20560   SET CURSOR ref_row + 3, 8
20570   PRINT "Daily Compliance Score ";
20580   SET COLOR 15       ! bright white
20590   PRINT compli_sum_values(6+med);
20600   SET COLOR "white"
20610   SET CURSOR ref_row + 4, 11
20620   PRINT "COMPLIANCE INDEX ";
20630   IF compli_sum_values(12+med) < 50 then
20640     SET COLOR "red/black/blink"
20650   ELSE
20660     SET COLOR 15      ! bright white
20670   END IF
20690   PRINT compli_sum_values(12+med);
20698 END SUB         ! compliance_summary_reports
20699 ! ---------------------------------D
20700 SUB compliance_detail_legends
20720   CLEAR
20730   SET COLOR 13       ! bright magenta
20740   SET CURSOR 1, 1
20750   PRINT "CASSETTE";
20760   SET CURSOR 8, 1
20770   PRINT "Dose#:"
20780   PRINT "Date :"
20790   PRINT "Time :"
20800   PRINT "Error:";
20810   SET CURSOR 14, 1
20820   PRINT "+,-  DOSE SELECT"
20830   PRINT "A,B,C - Cass.Sel."
20840   PRINT "P-Print  E-Exit"
```

```
20850  SET CURSOR 18, 1
20860  PRINT "Doses Taken:"
20870  PRINT "Outliers   :"
20880  SET CURSOR 21, 1
20890  PRINT "COMPLIANCE:"
20900  PRINT "  Daily Score:"
20910  PRINT "  Cumulative :"
20920  PRINT "  Index     :";
20930  ! ---- Left scale
20940  SET COLOR 9          ! bright blue
20950  SET CURSOR 1, 24
20960  PRINT "EARLY";
20970  SET CURSOR 2, 26
20980  PRINT "-20";
20990  SET CURSOR 4, 26
21000  PRINT "-16";
21010  SET CURSOR 6, 26
21020  PRINT "-12";
21030  SET CURSOR 8, 27
21040  PRINT "-8";
21050  SET CURSOR 10, 27
21060  PRINT "-4";
21070  SET CURSOR 12, 28
21080  PRINT "0";
21090  SET CURSOR 14, 27
21100  PRINT "+4";
21110  SET CURSOR 16, 27
21120  PRINT "+8";
21130  SET CURSOR 18, 26
21140  PRINT "+12";
21150  SET CURSOR 20, 26
21160  PRINT "+16";
21170  SET CURSOR 22, 26
21180  PRINT "+20";
21190  SET CURSOR 24, 25
21200  PRINT "LATE";
21298 END SUB          ! compliance_detail_legends
21299 ! --------------------------------D
21300 SUB calc_compliance_detail
21303  ! ---- medication color
21304  SELECT CASE med
21306  CASE 1
21308    LET color = 10  ! bright green
21310  CASE 2
21312    LET color = 12  ! bright red
21314  CASE 3
21316    LET color = 14  ! yellow
21318  END SELECT
21320  ! ---- first_dose
21322  FOR i = 1 to 4
21324     IF mon_file$(19+med) = mid$(mon_file$(10+med),
          1+(i-1)*4, 3) then EXIT FOR
21326  NEXT i
21328  LET first_dose = i
21330  ! ---- frequency
21332  SELECT CASE mon_file$(7+med)
21334  CASE "QD"
21336    LET freq = 1
```

```
21338  CASE "BID"
21340    LET freq = 2
21342  CASE "TID"
21344    LET freq = 3
21346  CASE "QID"
21348    LET freq = 4
21350  END SELECT
21352  ! ---- convert bytesin() to compli_detail()
21698 END SUB          ! calc_compliance_detail
21699 ! ---------------------------------D
21700 SUB display_compliance_detail
21712  ! ---- Cassette indicator
21730  SELECT CASE med
21740  CASE 1
21750    SET CURSOR 1, 11
21760    SET COLOR "black"
21762    SET BACK 10    ! bright green
21770    PRINT "A";
21780    SET CURSOR 1, 13
21790    SET COLOR 12    ! bright red
21792    SET BACK "black"
21800    PRINT "B";
21810    SET CURSOR 1, 15
21820    SET COLOR "yellow"
21830    PRINT "C";
21840  CASE 2
21850    SET CURSOR 1, 11
21860    SET COLOR 10    ! bright green
21870    PRINT "A";
21880    SET CURSOR 1, 13
21890    SET COLOR "black"
21892    SET BACK 12    ! bright red
21900    PRINT "B";
21910    SET CURSOR 1, 15
21920    SET COLOR "yellow"
21922    SET BACK "black"
21930    PRINT "C";
21940  CASE 3
21950    SET CURSOR 1, 11
21960    SET COLOR 10    ! bright green
21970    PRINT "A";
21980    SET CURSOR 1, 13
21990    SET COLOR 12    ! bright red
22000    PRINT "B";
22010    SET CURSOR 1, 15
22020    SET COLOR "black"
22022    SET BACK "yellow"
22030    PRINT "C";
22040    SET BACK "black"
22050  END SELECT
22060  ! ---- Drug
22070  SET COLOR color
22080  SET CURSOR 3, 1
22090  PRINT drug$;
22100  SET CURSOR 4, 1
22110  PRINT dose$;
22120  SET CURSOR 4, 8
```

```
22130 PRINT form$;
22140 SET CURSOR 4, 13
22150 PRINT "#"; mon_file$(25+med)    ! to be taken
22152 ! ---- SIG
22160 SET CURSOR 6, 1
22170 PRINT mon_file$(7+med);    ! sig
22192 ! ---- # Taken
22200 SET CURSOR 18, 13
22210 PRINT compli_sum_values(med);  ! # taken
22220 SET CURSOR 19, 13
22230 PRINT compli_sum_values(3+med);  ! # outliers
22232 ! ---- Compliance scores
22240 SET CURSOR 22, 15
22250 PRINT compli_sum_values(6+med);  ! daily score
22260 SET CURSOR 23, 15
22270 PRINT compli_sum_values(9+med);  !
         cumulative score
22280 SET CURSOR 24, 15
22290 PRINT compli_sum_values(12+med);  !
         compliance index
22292 ! ---- Left Border
22300 SET COLOR "red"
22310 CALL left_border (compli_detail(med),
         compli_detail(med+3))
22340 SET COLOR "yellow"
22370 CALL left_border (compli_detail(med+6),
         compli_detail(med+9))
22380 SET COLOR "green"
22410 CALL left_border (compli_detail(med+12),
         compli_detail(med+15))
22420 SET COLOR "yellow"
22450 CALL left_border (compli_detail(med+18),
         compli_detail(med+21))
22460 SET COLOR "red"
22490 CALL left_border (compli_detail(med+24),
         compli_detail(med+27))
22500 ! ---- Centerline
22510 SET CURSOR 12, 31
22520 FOR i = 1 to val(mon_file$(med+25))
22530    LET dose_day = int((i+first_dose+freq-2)/freq)
22540    IF remainder(dose_day,2) = 0 then
22550     SET COLOR "white"
22560    ELSE
22570     SET COLOR "blue"
22580    END IF
22590    PRINT chr$(219);
22600 NEXT i
22800 ! ---- Right Border
22860 SET COLOR "white"
22870 CALL right_border (compli_detail(med+30),
         compli_detail(med+33))
22880 SET COLOR 10       ! bright green
22890 CALL right_border (compli_detail(med+36),
         compli_detail(med+39))
22900 SET COLOR "white"
22910 CALL right_border (compli_detail(med+42),
         compli_detail(med+45))
22920 ! ---- `Locked' labels
```

```
22930 IF val(mon_file$(13+med)) <> 24 then
22940   SET COLOR "white"
22950   SET CURSOR 1, 74
22960   PRINT " LOCKED";
22970   SET CURSOR 24, 74
22980   PRINT " LOCKED";
22990 END IF
23000 SET COLOR 10        ! bright green
23010 SET CURSOR 12, 74
23020 PRINT " ACCESS";
23030 ! ---- Display data points
23032 LET reverse_video = 0
23040 FOR dose = 1 to compli_sum_values(med)    ! # taken
23050    CALL plot_point
23060 NEXT dose
23070 ! ---- Keyboard input & point detail
23080 LET dose = 1
23090 LET reverse_video = 1
23100 CALL plot_point
23102 CALL point_values
23110 DO
23120   SET CURSOR "off"
23130   GET KEY key
23140   SELECT CASE key
23150   CASE 101, 69, 27  ! `e' or `E' or `Esc' - Exit
23160     LET exit = 1
23170     EXIT SUB    ! display_compliance_detail
23180   CASE 112, 80      ! `p' or `P'  Print screen
23190     CALL prtsc
23200   CASE 97,65,98,66,99,67    ! `a',`A',`b',`B',`c',`C'
         cassette
23210     IF key = 97 or key = 65 then LET new_med = 1
23220     IF key = 98 or key = 66 then LET new_med = 2
23230     IF key = 99 or key = 67 then LET new_med = 3
23240     IF new_med = med then
23250      SOUND 600, .5
23260     ELSE
23270      LET med = new_med
23280      EXIT SUB  ! go display new cassette detail
23290     END IF
23300   CASE 43, 333      ! `+'  next point
23310     LET reverse_video = 0
23320     CALL plot_point
23330     LET dose = dose + 1
23340     IF dose > compli_sum_values(med) then LET dose = 1
23350     LET reverse_video = 1
23360     CALL plot_point
23370     CALL point_values
23380   CASE 45, 331      ! `-'  previous point
23390     LET reverse_video = 0
23400     CALL plot_point
23410     LET dose = dose - 1
23420     IF dose = 0 then LET dose = compli_sum_values(med)
23430     LET reverse_video = 1
23440     CALL plot_point
23450     CALL point_values
23460   CASE else
23470     SOUND 600, .5
```

```
23480     END SELECT
23490    LOOP
23498 END SUB          ! display_compliance_detail
23499 ! ------------------------------D
26000 SUB left_border (top_row, bottom_row)
26012  IF top_row = 0 then EXIT SUB
26020  FOR i = top_row to bottom_row
26030     SET CURSOR i, 30
26040     PRINT chr$(219);
26050  NEXT i
26098 END SUB          ! left_border
26099 ! ------------------------------D
26100 SUB right_border (top_row, bottom_row)
26102  IF top_row = 0 then EXIT SUB
26110  FOR i = top_row to bottom_row
26120     SET CURSOR i, 73
26130     PRINT chr$(219);
26140  NEXT i
26198 END SUB          ! right_border
26199 ! ------------------------------D
26200 SUB plot_point
26202  LET point_error = compli_detail(48+(med-1)*42+dose)
26204  SELECT CASE point_error
26206  CASE 0 to 24
26208    IF point_error > (compli_detail
          (med+21)-12)*2 + 1 then
26210       LET point_color = 4  ! red
26214    ELSE IF point_error >
          (compli_detail(med+15)-12)*2+1 then
26216       LET point_color = 14   ! yellow
26218    ELSE
26220       LET point_color = 2  ! green
26222    END IF
26224    LET point_symbol$ = "+"
26226    SET CURSOR 12+int((point_error+0.85)/2), 30+dose
26228  CASE 99
26230    LET point_color = 4  ! red
26232    LET point_symbol$ = "M"
26234    SET CURSOR 12, 30+dose
26236  CASE -24 to -0.15
26238    IF abs(point_error) > 23-compli_detail
          (med+3)*2 then
26240       LET point_color = 4  ! red
26242    ELSE IF abs(point_error) > 23-compli_detail
          (med+9)*2 then
26244       LET point_color = 14   ! yellow
26246    ELSE
26248       LET point_color = 2  ! green
26250    END IF
26252    LET point_symbol$ = "-"
26254    SET CURSOR 12-int((abs(point_error)+.85)/2), 30+dose
26256  END SELECT
26258  IF reverse_video = 1 then
26260    SET BACK point_color
26262    SET COLOR "black"
26264  ELSE
26266    SET COLOR point_color
```

```
26268    SET BACK "black"
26270   END IF
26272   PRINT point_symbol$;
26298 END SUB          ! plot_point
26299 ! ----------------------------D
26300 SUB point_values
26301   LET dose_day = int((dose + first_dose + freq - 2)/freq)
26302   LET hour_pointer = dose - ((dose_day-1)*freq)
           + (first_dose-1)
26303   ! ---- schedule with highlighted hour
26304   SET COLOR color
26305   SET BACK "black"
26307   SET CURSOR 6, 6
26308   PRINT "       ";
26309   SET CURSOR 6,6
26310   PRINT mon_file$(10+med);  ! schedule
26311   SET COLOR 15       ! bright white
26312   SET CURSOR 6, 6+(hour_pointer-1)*4
26313   PRINT mid$(mon_file$(10+med),
           1+(hour_pointer-1)*4, 3);
26314   ! ---- Dose #
26315   SET COLOR color
26316   SET CURSOR 8, 8
26317   PRINT "  ";
26318   SET CURSOR 8, 8
26319   PRINT using "##":dose;
26320   ! ---- Date
26328   LET point_year = val(mid$(mon_file$(38),7,2))
26329   LET point_month = val(mid$(mon_file$(38),1,2))
26330   LET point_day =
val(mid$(mon_file$(38),4,2))+val(mon_file$(28+med))+dose_day
26331   SELECT CASE point_month
26332   CASE 1,3,5,7,8,10,12
26333     LET month_length = 31
26334   CASE 4,6,9,11
26335     LET month_length = 30
26336   CASE 2
26337     LET month_length = 28
26338   END SELECT
26340   IF point_day > month_length then
26342     LET point_day = point_day - month_length
26344     LET point_month = point_month + 1
26346     IF point_month = 13 then
26348      LET point_month = 1
26350      LET point_year = point_year + 1
26352     END IF
26354   END IF
26356   SET CURSOR 9, 8
26358   PRINT "     ";
26360   SET CURSOR 9, 8
26362   PRINT using "##":point_month;
26364   PRINT "/";
26366   PRINT using "##":point_day;
26368   PRINT "/";
26370   PRINT using "##":point_year;
26372   ! ---- Time
26374   IF point_error <> 99 then
```

```
26375    ! ---- target hour in 24 hour time (0 to 23)
26376    LET target_hour = val(mid$(mon_file$(10+med),
          1+(hour_pointer-1)*4, 2))
26377    LET target_hour_ampm$ = ucase$(mid$(mon_file$(10+med),
          3+(hour_pointer-1)*4, 1))
26378    IF target_hour_ampm$ = "P" then
          LET target_hour = target_hour + 12
26379    IF target_hour = 12 then LET target_hour = 0
26380    IF target_hour = 24 then LET target_hour = 12
26381    ! ---- error hours (0 to 23)
26382    LET error_hour = int(abs(point_error))
26383    LET error_minutes = (abs(point_error) - error_hour)*100
26384    ! ---- calculate point_time_hour & point_time_minutes
26385    IF point_error < 0 then
26386     IF error_minutes <> 0 then
26388       LET point_time_minutes = 60 - error_minutes
26390       LET target_hour = target_hour - 1
26391       IF target_hour = -1 then LET target_hour = 23
26392     ELSE
26394       LET point_time_minutes = 0
26396     END IF
26398     LET point_time_hour = target_hour - error_hour
26399     IF point_time_hour <0 then
          LET point_time_hour = point_time_hour + 24
26420    ELSE
26422     LET point_time_minutes = error_minutes
26424     LET point_time_hour = target_hour + error_hour
26426     IF point_time_hour > 23 then
          LET point_time_hour = point_time_hour - 24
26428    END IF
26430    ! ---- convert 24 to 12 hour time
26432    SELECT CASE point_time_hour
26434    CASE 0
26436      LET point_time_hour = 12
26438      LET point_time_ampm$ = "A"
26440    CASE 1 to 11
26442      LET point_time_ampm$ = "A"
26444    CASE 12
26446      LET point_time_ampm$ = "P"
26448    CASE 13 to 23
26450      LET point_time_hour = point_time_hour - 12
26452      LET point_time_ampm$ = "P"
26454    END SELECT
26456    ! ---- print composite time
26457    SET CURSOR 10, 8
26458    PRINT "      ";
26459    SET CURSOR 10, 8
26460    PRINT using "##": point_time_hour;
26461    PRINT ":";
26462    PRINT using "%% ": point_time_minutes;
26463    PRINT point_time_ampm$;
26464   END IF
26465   ! ---- Error
26466   SET CURSOR 11, 8
26467   PRINT "       ";
26468   SET CURSOR 11, 8
26469   IF point_error = 99 then
```

```
26470    PRINT "Missed";
26471    SET CURSOR 10, 8
26472    PRINT "    ";
26473  ELSE
26474    PRINT using "##": error_hour;
26476    PRINT " h ";
26478    PRINT using "%%": error_minutes;
26480    PRINT " m";
26482    IF point_error < 0 then
26484     PRINT " Early";
26486    ELSE
26488     PRINT " Late";
26490    END IF
26492  END IF
26998 END SUB          ! point_values
26999 ! -----------------------------------------D
30000 ! --------------------------- DATA ---
30002 ! ---- demo_sn(6)
30010 DATA 57,56,55,54,53,52   ! 987654
30012 !
30015 ! ---- demo_data(118)
30016 ! ---- 50 data
30020 DATA 0,0,0,0,0,0,0,0,0,0
30030 DATA 0,0,0,0,0,0,0,0,0,0
30040 DATA 0,0,0,0,0,0,0,0,0,0
30050 DATA 0,0,0,0,0,0,0,0,0,0
30060 DATA 0,0,0,0,0,0,0,0,0,0
30062 ! ---- 62 regimen
30070 DATA 0,0,0,0,0,0,0,0,0,0
30080 DATA 0,0,0,0,0,0,0,0,0,0
30090 DATA 0,0,0,0,0,0,0,0,0,0
30100 DATA 0,0,0,0,0,0,0,0,0,0
30110 DATA 0,0,0,0,0,0,0,0,0,0
30120 DATA 0,0,0,0,0,0,0,0,0,0,0,0
30122 ! ---- 6 serial #
30125 DATA 57,56,55,54,53,52   ! 987654
30126 !
30130 ! ---- compli_sum_values(15)
30132 ! ---- (med)  # taken
30140 DATA 28,21,21
30141 ! ---- (med+3)  # outliers
30142 DATA 2,3,3
30143 ! ---- (med+6)  daily score
30144 DATA 71,63,30
30145 ! ---- (med+9)  cumulative score
30146 DATA 76,68,35
30147 ! ---- (med+12)  compliance index
30148 DATA 82,71,42
30150 !
30160 ! ---- compli_detail(174)
30170 ! ---- (med) (med+3) LB -red
30180 DATA 1,1,1,8,8,8
30190 ! ---- (med+6) (med+9) LB -yellow
30200 DATA 9,9,9,10,10,10
30210 ! ---- (med+12) (med+15) LB green
30220 DATA 11,11,11,13,13,13
30230 ! ---- (med+18) (med+21) LB +yellow
```

```
30240 DATA 14,14,14,15,15,15
30250 ! ---- (med+24) (med+27) LB +red
30260 DATA 16,16,16,24,24,24
30270 ! ---- (med+30) (med+33) RB -locked
30280 DATA 1,1,0,11,9,0
30290 ! ---- (med+36) (med+39) RB unlocked
30300 DATA 12,10,1,13,14,24
30310 ! ---- (med+42) (med+45) RB +locked
30320 DATA 14,15,0,24,24,0
30340 ! ---- (med+48)  Cassette A errors
30350 DATA 1.15, 1.30, 2.00, 1.45, -0.30, 1.30, 2.00, 1.15
30360 DATA 1.00,99.00, 1.45, 2.00, -1.00, 0.15, 1.30, 1.30
30370 DATA 1.15,-0.30, 2.00, 0.45,  1.45, 1.15, 1.30, 2.00
30380 DATA 1.30,99.00, 1.15, 1.45,  0,    0,    0,    0
30390 DATA   0,    0,    0,    0,   0,    0,    0,    0,    0,    0
30400 ! ---- (med+90)  Cassette B errors
30410 DATA  2.15, 3.45,-1.15, 0.30, 2.00,99.00,-3.30, 3.15
30420 DATA -1.00, 1.15, 1.30,-2.00,99.00,99.00, 3.45, 3.00
30430 DATA  1.00,-4.00, 2.15,-0.15, 1.45,   0,    0,    0
30440 DATA  0,    0,    0,    0,    0,    0,    0,    0
30450 DATA  0,    0,    0,    0,    0,    0,    0,    0,    0,    0
30460 ! ---- (med+132) Cassette C errors
30470 DATA  4.15,-4.00, 0.30, 8.15,99.00, 1.30,-2.00, 6.15
30480 DATA 11.45,99.00,-7.45, 3.00, 1.15,-0.45, 1.00, 8.00
30490 DATA  7.30,99.00,-5.45, 2.30, 0.45,   0,    0,    0
30500 DATA  0,    0,    0,    0,    0,    0,    0,    0
30510 DATA  0,    0,    0,    0,    0,    0,    0,    0,    0,    0
30520 ! -------------------------------------
40000 END
50000 ! ---- External functions ---------
50102 DEF mid$(text$,i,n)
50104  LET i = Max(i,1)
50106  LET mid$ = text$(i:i+n-1)
50108 END DEF
50110 ! ------
```

I claim:

1. A dispensing device, comprising:

multiple storage cartridges, each separable from a main housing, for storing a plurality of articles, of the same or different types, to be dispensed one at a time in predetermined order, said articles being supported along flexible strips stored in said cartridges;

means, separate from said storage cartridges, upon an actuation thereof, for independently dispensing articles from said storage cartridges and regardless of the positional orientation of said dispensing device;

means for supervising the dispensing of said articles including:

first memory means for storing basic dispensing operation instructions, second memory means for storing a dispensing schedule and control instructions for each said cartridge, said schedule and control instructions being specific to the type of article being dispensed from a particular cartridge, logic means for interpreting and executing said basic and specific dispensing instructions, and time keeping means for providing time and data information;

power supply means for providing power to said logic means and to said time keeping means; and a housing containing compartments for said storage cartridges, dispensing means, dispensing supervision means, and power supply means.

2. A device according to claim 1 further including means for inhibiting operation of said dispensing means other than at the times specified by said schedule.

3. A device according to claim 1 further including means for sensing and signalling to said logic means, each completed dispensing operation of said dispensing means.

4. A device according to claim 3 further including third memory means for storing data, said data including values indicative of a difference between an actual dispensing time and a scheduled dispensing time.

5. A device according to claim 4 further including communication means for transmitting said stored data from the device.

6. A device according to claim 1 further including means for alerting a user to scheduled dispensing times.

7. A device according to claim 6 wherein aid alerting means includes an audible alarm that uses said stored specific control instructions to determine the start and duration of an alert period.

8. A device according to claim 7 wherein said audible indicating means comprises an electro-mechanical buzzer.

9. A device according to claim 6 wherein said alerting means includes an alphanumeric visual indicator that uses said stored specific control instructions to determine the start, duration, and message of an alert period.

10. A device according to claim 9 wherein said visual indicating means comprises a liquid crystal display.

11. A device according to claim 1 wherein said separable storage cartridges have passageways having everywhere a width less than two article diameters.

12. A device according to claim 11 wherein said separable storage cartridges include a substantially 'U' shaped partition defining passageways having everywhere a width less than two article diameters.

13. A device according to claim 1 wherein said dispensing means comprises: ejector elements mounted for rotation about a longitudinal axis thereof and having article conforming depressions around their peripheries, said depressions being shaped so as to engage and convey individual articles arranged in said separable storage cartridge means in said predetermined order; said ejector elements, when rotated through a predetermined angle, causing one article to be dispensed and the next article in sequence to be moved into a position ready to be dispensed upon the next rotation and inaccessible to the operator.

14. A device according to claim 13 wherein said ejector elements have substantially a circular cross-sectional form with semicircular depressions, for engaging cylindrical shaped articles, evenly spaced around the peripheries of said ejector elements.

15. A device according to claim 13 wherein said ejector elements include clutch mechanisms for the selective engagement of a particular ejector by a common drive shaft.

16. A device according to claim 15 wherein said clutch mechanisms include normally extended spring loaded pins mounted on an ejector, said pins, when depressed, engaging holes in a coaxially mounted drive shaft and causing the ejector to rotate with said drive shaft until said pins reach a point, at the completion of a dispensing cycle, where they may extend and disengage said common drive shaft.

17. A device according to claim 16 wherein said pins are depressed by a pushbutton shaft and held depressed for an appropriate degree of drive shaft rotation by a cam mounted adjacent to a hub on the ejector that holds the spring loaded pins.

18. A device according to claim 17 wherein the said cam also functions to prevent ejector reverse rotation or ejector overtravel by interfering with the extended pins.

19. A device according to claim 17 wherein said pushbutton shaft includes switch means for signalling when said pushbutton has been fully depressed and fully released.

20. A device according to claim 16 wherein said drive shaft is driven manually by a user.

21. A device according to claim 16 wherein said drive shaft is driven by a gear motor under control of said logic means.

22. A device according to claim 3 wherein said sensing and signalling means comprise a switch operated by a cam on said drive shaft.

23. A device according to claim 1 wherein said article holding flexible strips ar adapted so that they can be folded into said separable storage cartridges back and forth across passageways thereof such that the articles may be closest packed.

24. A device according to claim 1 further comprising communicating means for receiving said dispensing schedule and specific dispensing instructions from a separate computer.

25. A device according to claim 1 wherein said power supply means includes a rechargeable battery.

26. A device according to claim 1 wherein said power supply means includes a connector for coupling to an external power source.

27. A device according to claim 1 wherein said housing includes a locking mechanism for preventing unauthorized access to the articles and mechanisms stored within said housing.

28. A device according to claim 27 wherein said locking mechanism comprises a solenoid controlled by said logic means.

29. A device according to claim 1 wherein said dispensing supervision means allows coordinated dispensing from the several storage cartridges such that the dispensing operations of any particular cartridge may be at least partially governed by dispensing operations of one more of the other storage cartridges.

30. A device according to claim 1 wherein said dispensing supervision means is adaptive to actual dispensing operations such that present or future dispensing decisions may be based upon actual past dispensing operations.

31. A device according to claim 1 further comprising means for providing data indicative of dispensing operations from which compliance scores can be determined.

32. A dispensing system comprising:

one or more dispensing devices, each dispensing device including multiple storage cartridges, each separable from a main housing, for storing a plurality of articles, of the same or different types, to be dispensed one at a time in predetermined order, said articles being supported along flexible strips stored in said cartridges;

means, separate from said storage cartridges, upon an actuation thereof, for independently dispensing articles from said storage cartridges and regardless of the positional orientation of said dispensing device;

dispensing supervision means including:

first memory means for storing basic dispensing operation instructions;

second memory means for storing dispensing schedule and control instructions for each said cartridge, said schedule and control instructions being specific to the type of article being dispensed from a particular cartridge;

logic means for interpreting and executing said basic and specific dispensing instructions;

time keeping means for providing time and data information;

means for communicating data to and from said dispensing device;

power supply means for providing power to said logic means, time keeping means and communicating means;

a housing containing compartments for said storage cartridges, dispensing means, dispensing supervision means, and power supply means; and a host computer system for transmitting dispensing schedules and instructions to said dispensing devices, and receiving dispensing operations data from said dispensing devices.

33. A system according to claim 32 wherein said dispensing devices further includes means for inhibiting operation of said dispensing means other than at the times specified by said schedule.

34. A system according to claim 32 wherein said host computer system is arranged to produce a compliance report based on information from said dispensing devices as to various levels of compliance with said dispensing schedules.

35. A system according to claim 32 wherein said dispensing devices further include means for sensing and signalling for said logic means, each completed dispensing operation of said dispensing means.

36. A system according to claim 35 wherein said dispensing devices further include third memory means for storing data, said data including values indicative of a difference between actual dispensing times and said dispensing schedules.

37. A system according to claim 32 wherein said dispensing devices further include means for alerting a user to scheduled dispensing times.

38. A system according to claim 37 wherein said alerting means includes an audible alarm that uses said stored specific control instructions to determine the start and duration of an alert period.

39. A system according to claim 38 wherein said audible indicating means comprises an electro-mechanical buzzer.

40. A system according to claim 37 wherein said alerting means includes an alphanumeric visual indicator that uses said stored specific control instructions to determine the start, duration, and message of an alert period.

41. A system according to claim 40 wherein said visual indicating means comprises a liquid crystal display.

42. A system according to claim 32 wherein said separable storage cartridges have passageways having everywhere a width less than two article diameters.

43. A system according to claim 42 wherein said separable storage cartridges include a substantially 'U' shaped partition defining passageways having everywhere a width less than two article diameters.

44. A system according to claim 32 wherein said dispensing means comprises: ejector elements mounted for rotation about a longitudinal axis thereof and having article conforming depressions around their peripheries, said depressions being shaped so as to engage and convey individual articles arranged in said separable storage cartridge means in said predetermined order; said ejector elements, when rotated through a predetermined angle, causing one article to be dispensed and the next article in sequence to be moved into a position ready to be dispensed upon the next rotation and inaccessible to the operator.

45. A system according to claim 44 wherein said ejector elements have substantially a circular cross-sectional form with semicircular depressions, for engaging cylindrical shaped articles, evenly spaced around the peripheries of said ejector elements.

46. A system according to claim 44 wherein said ejector elements include clutch mechanisms for the selective engagement of a particular ejector by a common drive shaft.

47. A system according to claim 46 wherein said clutch mechanisms include normally extended spring loaded pins mounted on an ejector, said pins, when depressed, engaging holes in a coaxially mounted drive shaft and causing the ejector to rotate with said drive shaft until said pins reach a point, at the completion of a dispensing cycle, where they may extend and disengage said common drive shaft.

48. A system according to claim 47 wherein said pins are depressed by a pushbutton shaft and held depressed for an appropriate degree of drive shaft rotation by a cam mounted adjacent to a hub on the ejector that holds the spring loaded pins.

49. A system according to claim 48 wherein the said cam also functions to prevent ejector reverse rotation or ejector overtravel by interfering with the extended pins.

50. A system according to claim 48 wherein said pushbutton shaft includes switch means that signal when said pushbutton has been fully depressed and fully released.

51. A system according to claim 47 wherein said drive shaft is driven manually by a user.

52. A system according to claim 47 wherein said drive shaft is driven by a gear motor under said logic means control.

53. A system according to claim 35 wherein said sensing and signalling means comprise a switch operated by a cam on said drive shaft.

54. A system according to claim 32 wherein said article holding flexible strips are adapted so that they can be folded into said separable storage cartridges back and forth across passageways thereof such that the articles may be closest packed.

55. A system according to claim 32 wherein said communicating means may receive said dispensing schedules and specific dispensing instructions from a separate computer.

56. A system according to claim 36 wherein said communication means may transmit said stored data from the dispensing device to a separate computer.

57. A system according to claim 32 wherein said power supply means includes a rechargeable battery.

58. A system according to claim 32 wherein said power supply means includes a connector for coupling to an external power source.

59. A system according to claim 32 wherein said housing includes a locking mechanism for preventing unauthorized access to the articles and mechanisms stored within said housing.

60. A system according to claim 59 wherein said locking mechanism comprises a solenoid controlled by said logic means.

61. A system according to claim 32 wherein said dispensing supervision means allows coordinated dispensing from said several storage cartridges such that the dispensing operations of any particular cartridge may be at least partially controlled by dispensing operations of one or more of the other said storage cartridges.

62. A system according to claim 32 wherein said dispensing supervision means is adaptive to actual dispensing operations such that present or future dispensing decisions may be based upon actual past dispensing operations.

63. A system according to claim 32 wherein said host computer system includes software for guiding a user in inputting said dispensing schedule and instructions for each said cartridge of a said dispensing device by means of keyboard entry of selections offered on one or more video screens generated by said computer program.

64. A system according to claim 63 which further includes a bar code reader connected to said host system computer whereby the contents of said cartridges can be identified by scanning a bar code label on the cartridge.

65. A system according to claim 63 in which said software may color code portions of said video screens in order to improve data entry efficiency and accuracy.

66. A system according to claim 63 in which said software may cause some portions of said video screens to flash in order to help insure that a user's attention is brought to said portion of said video screens.

67. A system according to claim 63 in which said software may store a record of said loading operation in a memory device that is a part of said host computer system.

68. A system according to claim 63 in which said software may print a record of said loading operation on a printer device that is a part of said host computer system.

69. A system according to claim 63 wherein said software converts said dispensing schedule and instructions into a form that is directly usable by said dispensing devices without further conversion.

70. A system according to claim 32 wherein the host computer system includes software for verifying the proper operation of said dispensing devices.

71. A system according to claim 32 wherein the host computer system includes software for guiding a user in retrieving and analyzing said dispensing operations data from said dispensing devices.

72. A system according to claim 71 wherein said software converts dispensing time error data received from said dispensing devices into dispensing time of day and date information.

73. A system according to claim 71 wherein said software computes and displays values which measure levels of compliance between scheduled dispensing times and actual dispensing times.

74. A system according to claim 73 wherein said software may color code said displayed values in order to improve user awareness and understanding.

75. A system according to claim 73 wherein said software may flash some of said values in order to help insure that a user's attention will be brought to said flashing values.

76. A system according to claim 73 in which said software may store a record of said values and other dispensing data in a memory device that is a part of said host computer system.

77. A system according to claim 73 in which said software may print a record of said values and other dispensing data on a printer device that is a part of said host computer system.

78. A system according to claim 73 wherein one measure of compliance is calculated as a ratio of the number of articles actually dispensed to the number of articles scheduled to be dispensed in the same time period.

79. A system according to claim 73 wherein one measure of compliance is calculated by counting the number of dispensing intervals when said articles are not properly dispensed and by weighting said calculation with factors that take into account how much in error are the said dispensing intervals.

80. A system according to claim 34 wherein said compliance report includes a cumulative compliance score.

81. A system according to claim 34 wherein said compliance report includes a daily compliance score.

82. A system according to claim 34 wherein said compliance report includes an overall compliance score.

83. A system according to claim 34 wherein said compliance report includes an overuse score.

84. A system according to claim 34 wherein said compliance report includes an under use score.

85. A system according to claim 34 wherein said compliance report includes a mean actual dosing interval and standard deviation.

* * * * *